(12) United States Patent
Hori et al.

(10) Patent No.: US 6,435,289 B1
(45) Date of Patent: Aug. 20, 2002

(54) APPARATUS FOR ALTERING OPERATION APPARATUS AND ACTUATOR COMBINATIONS, AND OPERATION LEVER APPARATUS

(75) Inventors: Shuuji Hori, Oyama; Naoki Ishizaki, Tochigi; Yasuhiro Sato; Masayoshi Mototani, both of Oyama, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/666,451

(22) Filed: Sep. 21, 2000

(30) Foreign Application Priority Data

Sep. 22, 1999 (JP) .......................................... 11-268988
Oct. 27, 1999 (JP) .......................................... 11-305497

(51) Int. Cl.[7] ................................................ B62D 5/06

(52) U.S. Cl. ........................ 180/6.3; 180/6.48; 180/333; 180/315; 180/6.7

(58) Field of Search ........................ 180/6.2, 6.3, 6.48, 180/6.7, 315, 321, 333; 74/471; 701/41, 69

(56) References Cited

U.S. PATENT DOCUMENTS

| | | | | |
|---|---|---|---|---|
| 3,874,468 A | * | 4/1975 | Chatterjea | 180/6.48 |
| 4,090,411 A | * | 5/1978 | Albright et al. | 74/471 X |
| 4,163,413 A | * | 8/1979 | Kennicutt | 91/521 |
| 4,541,497 A | * | 9/1985 | Riediger et al. | 180/6.48 |
| 4,789,036 A | * | 12/1988 | Haas | 180/6.48 |
| 4,837,694 A | * | 6/1989 | Narita et al. | 364/426.01 |
| 4,917,200 A | * | 4/1990 | Lucius | 180/6.2 |
| 5,529,134 A | * | 6/1996 | Yomogita | 180/6.2 |
| 5,590,041 A | * | 12/1996 | Cooper | 364/424.051 |
| 6,056,074 A | * | 5/2000 | Heal et al. | 180/6.48 |

* cited by examiner

Primary Examiner—J. J. Swann
Assistant Examiner—L. Lum
(74) Attorney, Agent, or Firm—Varndell & Varndell, PLLC

(57) ABSTRACT

The aim is to improve operability in vehicles such as skid steer loaders and to reduce the burden on the operator. It is made easy to switch between a first operation pattern wherewith only one operation apparatus of two operation apparatuses is used in driving two actuators, and a second operation pattern wherewith the two actuators are driven using both of the two operation apparatuses. It is made possible to hold operation positions, and to release held positions, whether with an operation lever apparatus that is capable of operation in only one directional component or with an operation lever apparatus that is capable of operation in two directional components in the forward and backward direction and in the left and right direction. When a change to a first combination is designated by a pattern switching lever, the first combination (first operation pattern) is switched to by switching means. This effects correspondences between operation direction signals output from one operation apparatus of two (left and right) operation apparatuses and the drive directions of left and right running actuators. It is thereby made possible to drive left and right running bodies by operating one of the operation levers (the left operation lever). When a change to a second combination is designated by the pattern switching lever, the second pattern (second operation pattern) is switched to by the switching means. Thereby correspondences are effected between the operation direction signals output from the left operation apparatus and the drive directions of the left running actuator, and correspondences are effected between the operation direction signals output from the right operation apparatus and the drive directions of the right running actuator. It is thereby made possible to drive the left and right running bodies by operating both the left and the right operation lever. When a switching valve is switched to a valve position, and the operation lever has been operated so as to tilt, the operation lever is held in that tilted position. And when the switching valve is switched to another valve position, the operation lever holding condition is released.

9 Claims, 34 Drawing Sheets

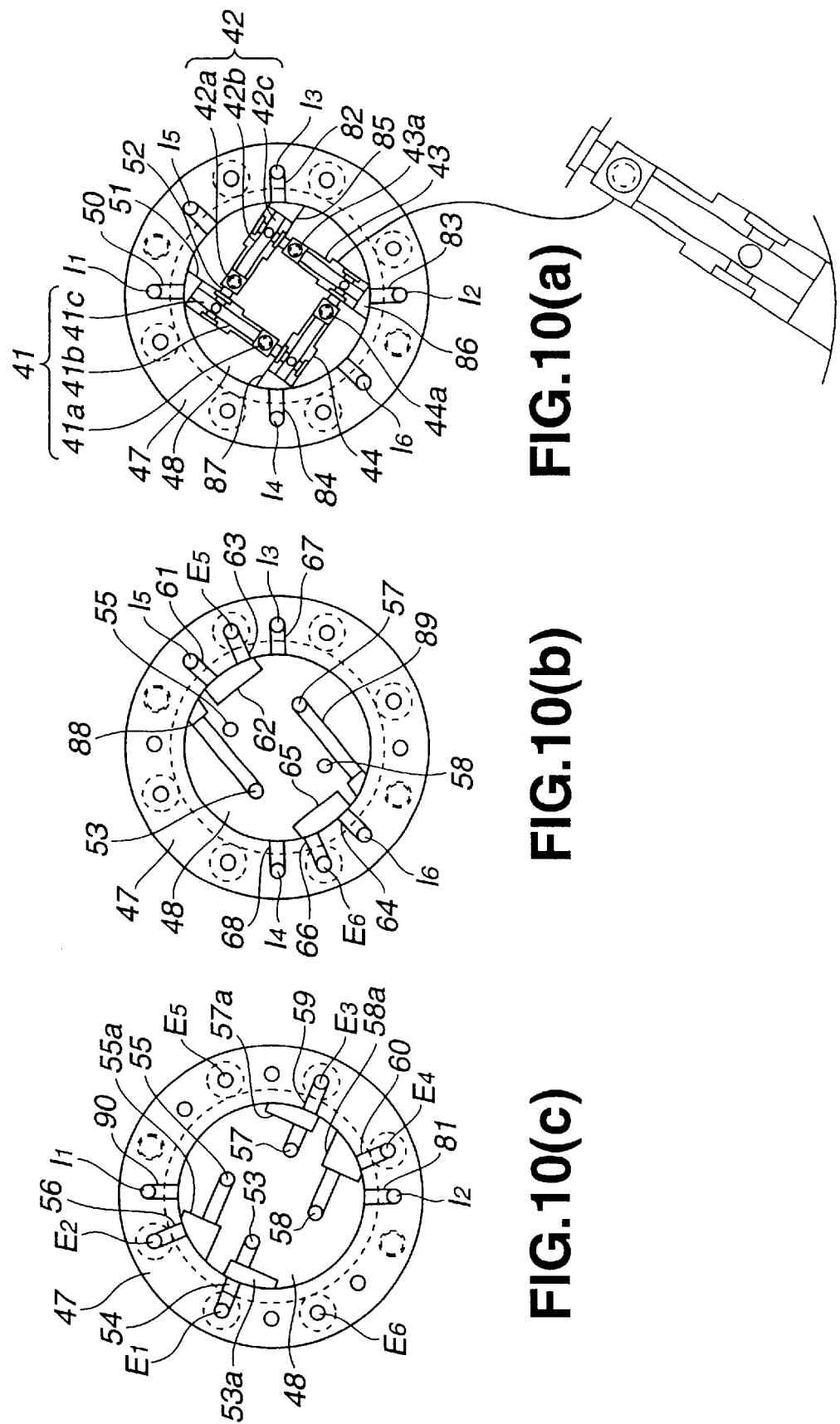

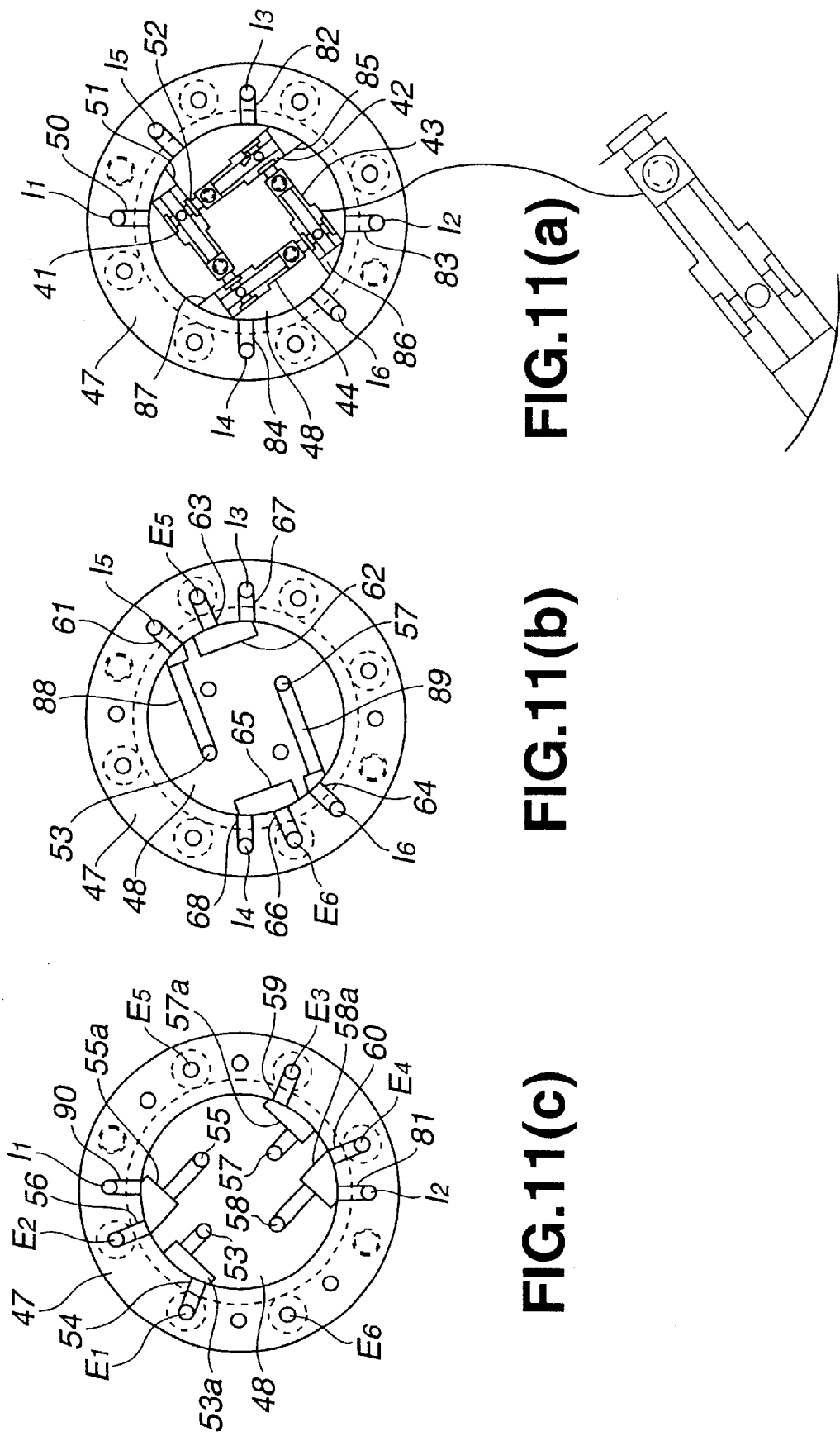

APPARATUS FOR ALTERING OPERATION APPARATUS AND ACTUATOR COMBINATIONS, AND OPERATION LEVER APPARATUS

BACKGROUND OF THE INVENTION

1. Field of the Invention

The present invention relates to a combination altering apparatus for altering combinations of corresponding relationships between operation lever operation directions and actuator drive directions. The present invention also relates to an operation lever apparatus. More specifically, the present invention relates to an operation lever apparatus that can hold an operation lever in an operation position or release that condition of holding.

2. Description of the Related Art

In hydraulic shovels in general, four working members, namely an upper revolving superstructure, a boom, an arm, and a bucket, are actuated by operating left and right operation levers deployed to the left and right of the operator's seat.

Until now, the combinations of corresponding relationships between the operation directions of the two (left and right) operation levers, on the one hand, and the actuation directions of the four working members noted above, on the other (hereinafter called operation patterns) have differed from one hydraulic shovel manufacturing company to another.

Accordingly, when an operator accustomed to the control operations of a hydraulic shovel made by company A operates hydraulics shovels manufactured by company B and company C, fatigue is increased because the operator is not accustomed to the control operations thereof. An enormous burden is also placed on the operator because he or she must perform control operations while bearing in mind the differences in operation patterns.

That being the case, inventions and models relating to;operation pattern switching for switching operation patterns in hydraulic shovels have been devised previously.

In Japanese Utility Model Application Publication No. 38935/1994 is described a model for switching hydraulic shovel operation patterns by switching hydraulic fluid paths.

In contrast therewith, the working members in a skid steer loader are comprised of a boom and a bucket. Left and right running bodies (wheels or crawlers) are actuated by two (i.e. left and right) running actuators deployed on the left and right of the vehicle body. The left and right running bodies are driven independently by hydraulic motors deployed on the left and right, respectively, of the vehicle body. The running body on the left side of the vehicle body is independently driven and the speed thereof independently changed by a drive mechanism provided exclusively for the left side. Similarly, the running, body on the right side of the vehicle body is independently driven and the speed thereof, independently changed by a drive mechanism provided exclusively for the right side. Each of these drive mechanisms is configured by a hydraulic pump and a hydraulic motor.

In a skid steer loader, four running bodies or working members consisting of a boom, a bucket, and two (left and right) running bodies are actuated by the operation of left and right operation levers deployed on the left and right of the operator's seat.

The combinations of corresponding relationships between the directions of operation of the left and right operation levers and the actuation directions of the four running bodies and working members (i.e. the operation patterns) differ according to the manufacturer of the, skid steer loader. Operation patterns are diagrammed in FIGS. 12(a), 12(b), and 12(c).

As diagrammed in FIG. 12, a left operation lever 6L and a right operation lever 6R are deployed to the left and right of an operator's seat 80.

In the operation pattern diagrammed in FIG. 12(a), the operation directions of the left operation lever 6L, the operation directions of the actuation directions of the running body on the left side (left running forward, left running back), and the actuation directions of the boom (boom up, boom down) correspond, while the operation directions of the right operation lever, the actuation directions of the running body on the right side (right running forward, right running back), and the actuation directions of the bucket (bucket dump, bucket excavation) correspond. In other words, the left and right running bodies are actuated by operations of the left and right operation levers 6L and 6R.

In the operation patterns diagrammed in FIGS. 12(b) and 12(c), the operation directions of the left operation lever 6L and the actuation directions of the left and right running bodies (forward, backward, turn right, turn left) correspond, while the operation directions of the right operation lever and the actuation directions of the boom and the bucket (boom up, boom down, bucket dump, bucket excavation) correspond. In other words, the left and right running bodies are actuated merely by the operations of the left operation lever 6L.

In the operation pattern diagrammed in FIG. 12(b), moreover, the left and right running bodies are driven to turn by a rotating operation of the left operation lever 6L, and the bucket is actuated by a rotating operation of the right operation lever 6R.

FIG. 13 is a hydraulic circuit diagram for the case where the left and right running bodies are actuated merely by operating the left operation lever 6L (cf. FIGS. 12(b), 12(c)).

As diagrammed in FIG. 13, a left operation lever device 5L comprises a left operation lever 6L, a bridge circuit 45 wherein four shuttle valves 41, 42, 43, and 44 are connected in a ring, and hydraulic lines 11, 12, 13, and 14 that connect the left operation lever 6L to the bridge circuit 45. The lines 11, 12, 13, and 14 are lines wherein hydraulic signals (pilot pressures) are generated according to operations of the left operation lever in the forward, backward, right, and left directions, respectively.

The lines 11, 12, 13, and 14 are connected to the inflow port for the shuttle valves 41 and 42, the inflow port for the shuttle valves 43 and 44, the inflow port for the shuttle valves 42 and 43, and the inflow port for the shuttle valves 44 and 41, respectively.

The outflow ports of the shuttle valves 41, 42, 43, and 44 are connected to the forward position port 32F of a control valve 32 for the right running body, the forward position port 31F of a control valve 31 for the left running body, the backward position port 32R of the control valve 32 for the right running body, and the backward position port 31R of the control valve 31 for the left running body, respectively. The volume of a hydraulic pump 33 for the left running body is changed by the left running body control valve 31, and the volume of a hydraulic pump 34 for the right running body is changed by the right running body control valve 32.

The left running body hydraulic pump 33 actuates the left running body through a hydraulic motor. When a hydraulic signal (pilot pressure) acts on the forward position port 31F of the left running body control valve 31, the volume of the left running body hydraulic pump 33 is changed on the forward side, and the left running body is actuated in the forward direction. And when a hydraulic signal acts on the backward position port 31R of the left running body control valve 31, the volume of the left running body hydraulic pump 33 is changed on the backward side, and the left running body is actuated in the backward direction. Similarly, when a hydraulic signal acts on the forward position port 32F of the right running body control valve 32, the volume of the right running body hydraulic pump 34 is changed on the forward side, and the right running body is actuated in the forward direction. And when a hydraulic signal acts on the backward position port 32R of the right running body control valve 32, the volume of the right running body hydraulic pump 34 is changed on the backward side, and the right running body is actuated in the backward direction.

Accordingly, when the left operation lever 6L is operated in the forward direction, the vehicle is made to "running forward," and when it is operated in the backward direction, the vehicle is made to "running in backward." When that operation lever 6L is operated in the right direction, the vehicle is made to "turn to the right," and when it is operated in the left direction, the vehicle is made to "turn to the left."

A right operation lever device 5R comprises a right operation lever 6R and hydraulic lines 15, 16, 17, and 18 that connect to the right operation lever 6R. The lines 15, 16, 17, and 18 are lines wherein hydraulic signals are generated in response to operations of the right operation lever 6R in the forward, backward, right, and left directions, respectively.

The lines 15, 16, 17, and 18 are connected, respectively, to the boom down position port 72a of a boom control valve 72, the boom up position port 72b of the boom control valve 72, the bucket dump position port 73a of a bucket control valve 73, and the bucket excavation position port 73b of the bucket control valve 73. To the boom control valve 72 and bucket control valve 73 is supplied hydraulic fluid from a pump 71 for the working members. The hydraulic fluid controlled by the boom control valve 72 and the bucket control valve 73 is supplied, respectively, to a boom hydraulic cylinder and a bucket hydraulic cylinder.

When a hydraulic signal (pilot pressure) acts on the boom down position port 72a of the boom control valve 72, the boom hydraulic cylinder is driven toward the boom down position, and the boom is actuated toward the down position. And when a hydraulic signal acts on the boom up position port 72b of the boom control valve 72, the boom hydraulic cylinder is driven toward the boom up position and the boom is actuated toward the up position. Similarly, when a hydraulic signal acts on the bucket dump position port 73a of the bucket control valve 73, the bucket hydraulic cylinder is driven toward the bucket dump position, and the bucket is actuated toward the dump position. And when a hydraulic signal acts on the bucket excavation position port 73b of the bucket control valve 73, the bucket hydraulic cylinder is driven toward the bucket excavation position, and the bucket is actuated toward the excavation position.

Accordingly, when the right operation lever 6R is operated in the forward direction, the boom is actuated toward the down position, whereas when it is operated to the rear, the boom is actuated to move up. When the right operation lever 6R is operated to the right, the bucket is actuated toward the dump position, and when it is operated to the left, the bucket is actuated toward the excavation position.

FIG. 14 is a hydraulic circuit diagram for the case where the left and right running bodies are actuated by operating the left and right operation levers 6L and 6R (cf FIG. 12(*a*)). The configuring elements common to FIG. 13 are not further described here.

The left operation lever 6L is connected to the left running body hydraulic pump 33 and to the boom control valve 72 by lines 91 and 92, respectively. The line 91 is a line wherein hydraulic signals are generated in response to operations of the left operation lever 6L in the forward and backward directions. The line 92 is a line wherein hydraulic signals are generated in response to operations of the left operation lever 6L to the left and right.

The right operation lever 6R is connected to the right running body hydraulic pump 34 and to the bucket control valve 73 by lines 93 and 94, respectively. The line 93 is a line wherein hydraulic signals are generated in response to operations of the right operation lever 6R in the forward and backward directions. The line 94 is a line wherein hydraulic signals are generated in response to operations of the right operation lever 6R to the left and right.

Accordingly, when the left operation lever 6L is operated in the forward direction, the vehicle "moves ahead to the left," and when it is operated to the rear, the vehicle "moves back to the left." When the left operation lever 6L is operated to the right, the boom is actuated to move down, and when operated to the left, the boom is actuated to move up. When the right operation lever 6R is operated in the forward direction, the vehicle "moves ahead to the right," and when operated to the rear, the vehicle "moves back to the right." When the right operation lever 6R is operated to the right, the bucket is actuated toward the dump position, and when operated to the left, the bucket is actuated toward the excavation position.

Thus, as described in the foregoing, for a vehicle such as a skid steer loader, there is an operation pattern (called the first operation pattern) for, actuating the left and right running bodies by operating only one operation lever (the left operation lever 6L), and an operation pattern (called the second operation pattern) for actuating the left and right running bodies by operating both the left and the right operation levers 6L and 6R.

As seen in Japanese Utility Model Application Publication No. 38935/1994, described in the foregoing, although there is prior art for switching the operation pattern for actuating working members, there is no prior art relating to switching between the first operation pattern and the second operation pattern for actuating the running bodies.

A first object of the present invention is to make it possible to switch between the first operation pattern and the second operation pattern, enhance the operability of such vehicles as skid steer loaders, and reduce the burden on the operator.

A second object of the present invention is to make it easy to switch between an operation pattern wherewith two actuators are driven by only one of two operation apparatuses and an operation pattern wherewith the two actuators are driven by operating both of the operation apparatuses.

It is noted that inventions have already been publicly disclosed that relate to an operation lever device wherewith operation signals are generated by operating a single operation lever so as to tilt, and the driving of two hydraulic actuators is controlled based on those operation signals.

In Japanese Patent Application Laid-Open No. 89515/1997, for example, an electrical operation lever apparatus is disclosed wherewith, by tilting operations with a single operation lever, the displacements in each of four pistons are output as electrical signals. The driving of two hydraulic actuators is controlled on the basis of the electrical signals output from that electrical operation lever apparatus.

In World Patent Publication No. WO 96/15374 is disclosed a hydraulic operation lever apparatus that outputs hydraulic signals.

In FIG. 26(a) is diagrammed a section of the essential parts of a hydraulic operation lever apparatus. By operating a single operation lever so that it tilts, the displacements in each of four pistons are output as hydraulic signals. In FIG. 26(b) is given a diagonal view of the configuration of a universal coupling 150 indicated in FIG. 26(a). Two hydraulic motors mounted in a hydraulic drive vehicle are drive-controlled by the operation lever apparatus diagrammed in FIG. 26. In FIGS. 27(a) and 27(b) are diagrammed the movements of the operation lever indicated in FIG. 26. A description is now given with reference to these drawings.

The operation lever apparatus 105 diagrammed in FIG. 26(a) consists mainly of a main apparatus body 107 and an operation lever 106 that is deployed so that it can be tilted in relation to the main apparatus body 107.

The operation lever 106 is attached to the main apparatus body 107 through the universal coupling 150 and a disk plate 108.

As diagrammed in FIGS. 27(a) and 27(b), four pistons 101, 102, 103, and 104 are deployed so that the piston tips (upper ends) protrude from an attachment plate 111. These pistons 101, 102, 103, and 104 are arranged so that, as viewed from the upper surface of the attachment plate 111, they are positioned at the four corners of a square. When the operation lever 106 is tilted in the F direction and the piston 104 is depressed, the vehicle moves forward. When the operation lever 106 is tilted in the B direction and the piston 102 is depressed, the vehicle moves back. When the operation lever 106 is tilted in the R direction and the piston 101 is depressed, the vehicle executes a right spin turn. And when the operation lever 106 is tilted in the L direction and the piston 103 is depressed, the vehicle executes a left spin turn. By spin turn here is meant a spin turn. This means that the vehicle turns without the center of the vehicle moving. More concretely described, this refers to a turning movement effected when the wheels or crawlers provided in the vehicle turn at the same speed in opposite directions.

FIG. 26(a) is a section looking at FIG. 27(a) from the left.

A fork-shaped bracket 112 is attached to the main apparatus body 107. As diagrammed in FIG. 26(b), the universal coupling 150 comprises the fork-shaped bracket 112, a tilting member 113, a support shaft 109, and a support shaft 110. The tilting member 113 is deployed in the fork-shaped bracket 112 by the support shaft 110. The operation lever 106 is deployed in this tilting member 113 by the support shaft 109. In other words, the operation lever 106 is attached to the main apparatus body 107 through the universal coupling 150.

The support shaft 109 in the universal coupling 150 is deployed so that the axis thereof is at right angles to the support shaft 110.

The support shaft 109 is parallel to the upper surface of the attachment plate 111 and at right angles to the surface of the drawing. This support shaft 109 supports the operation lever 106 so that it can be turned about the axis of the support shaft 109. That is, the operation lever 106 can be tilted to the left and right, in FIG. 26(a), by turning it about the axis of the support shaft 109.

The support shaft 110 is parallel to the upper surface of the attachment plate 111 and perpendicular to the support shaft 109 described above. The support shaft 110 supports the tilting member 113 in relation to the fork-shaped bracket 112 so that it can turn about the axis of the support 110. That is, the operation lever 106 can be tilted in directions that are at right angles to the drawing surface in FIG. 26(a) by turning it together with the tilting member 113 about the axis of the support shaft 110.

With the universal coupling 150 configured in this manner, the operation lever 106 can tilt in two directions that are mutually perpendicular to the main apparatus body 107.

The disk plate 108 is attached to the operation lever 106 so that the tips (upper ends) of the pistons 101, 102, 103, and 104 strike the lower surface thereof.

Accordingly, the pistons 104 and 102 are displaced in response to the direction in and amount by which the operation lever 106 is tilted. Although not shown in FIG. 26(a), the same is true of the pistons 101 and 103.

In the main apparatus body 107 are provided hydraulic signal generation means for generating hydraulic signals of sizes corresponding to the displacements in each of the four pistons 104, 102, 101, and 103. The pistons 104, 102, 101, and 103 correspond to pilot lines 114, 115, 116, and 117, respectively (cf. FIG. 27(b)).

The operation of the operation lever apparatus 105 described in the foregoing is now described.

FIG. 26(a) shows the operation lever 106 in the neutral position. It is now assumed that from this position the operation lever 106 is tilted about the axis of the support shaft 109 (to the left in the drawing). Thereupon, the piston 104 on the left side of the figure is depressed in the direction of the arrow A by the disk plate 108.

When the piston 104 is depressed, a pilot pressure Pp of a size that corresponds to the amount of tilt in the operation lever 106 is output from the pilot line 114. Similarly, the hydraulic signals indicating a pilot pressure Pp are output from the pilot lines 115, 116, and 117 when there have been displacements in the pistons 102, 101, and 103 responsive to the tilting of the operation lever 106.

In FIG. 24 and FIG. 25 are diagrammed two types of main operation patterns with respect to the relationship between the direction of tilt in the operation lever 106 and the direction of vehicle running.

FIG. 24 diagrams what is mainly an operation pattern for vehicles like skid steer loaders. The arrows in this figure indicate the directions of vehicle running corresponding to the directions of tilt in the operation lever 106.

Now let it be assumed that the operation lever 106 has been tilted in the forward (straight ahead) direction F from the neutral position, as diagrammed in FIG. 24.

At this time, only the piston 104 is displaced in the operation lever apparatus 105. Accordingly, a hydraulic signal Pp is output from the pilot line 114. In response to this hydraulic signal Pp, a hydraulic actuator (not shown) is actuated and the vehicle advances (moves straight ahead).

As diagrammed in FIG. 24, when the operation lever 106 is tilted in the back direction B, the vehicle moves backward (in a straight line). When the operation lever 106 is tilted in the right spin turn direction R, the vehicle executes a right spin turn. When the operation lever 106 is tilted in the left spin turn direction, the vehicle executes a left spin turn. When the operation lever 106 is tilted in a direction midway between the direction F and the direction R, the vehicle moves ahead while turning to the right. When the operation lever 106 is tilted in a direction midway between the direction R and the direction B, the vehicle moves back while turning to the right. When the operation lever 106 is tilted in a direction midway between the direction B and the direction L, the vehicle moves back while turning to the left. And when the operation lever 106 is tilted in a direction midway between the direction L and the direction F, the vehicle moves ahead while turning to the left.

FIG. 25 is an operation pattern mainly for vehicles such as bulldozers.

As diagrammed in FIG. 25, when the operation lever 106 is tilted in the forward direction F, the vehicle moves forward (straight ahead). When the operation lever 106 is tilted in the back direction B, the vehicle moves back (straight back). When the operation lever 106 is tilted in the right direction R, the vehicle comes to a stop. When the operation lever 106 is tilted in the left direction L the vehicle comes to a stop. When the operation lever 106 is tilted in a direction midway between the direction F and the direction R, the vehicle moves ahead while turning to the right. When the operation lever 106 is tilted in a direction midway between the direction R and the direction B, the vehicle moves back while turning to the left. When the operation lever 106 is tilted in a direction midway between the direction B and the direction L, the vehicle moves back while turning to the right. And when the operation lever 106 is tilted in a direction midway between the direction L and the direction F, the vehicle moves ahead while turning to the left.

With the conventional operation lever 106 diagrammed in FIG. 26(a), when that operation lever 106 has been operated to a prescribed operation position and released by the operator, the pistons press against the disk plate 108 due to the spring forces of return springs 143 and 144, and the operation lever 106; automatically returns to the neutral position.

The need arises here to make the vehicle continue to running as it is, even when the operation lever 106 is released. In other words, an operator performs various other operations and work besides operating the operation lever. Nevertheless, it is still necessary to hold the operation lever 106 steady even when performing other work. The operator is thus subjected to a great burden because he or she is performing a plurality of operations simultaneously. In other words, there is a need to reduce the burden falling on the operator while he or she holds the operation lever 106 in a constant operation position.

One possible way to continue making the vehicle move with the operation lever released is to maintain the tilted position of the operation lever 106.

In FIG. 28 is diagrammed an operation lever apparatus 105' that can automatically hold the operation position of the operation lever 106 constant.

The operation lever apparatus 105' diagrammed in FIG. 28 differs from the operation lever apparatus 105 diagrammed in FIG. 26. The operation lever apparatus 105' can only be operated in one of two directions, that is, either in the forward and backward direction or in the left and right direction. For example, it might be able to move only in the forward and backward direction.

In FIG. 28, the operation lever 106 is supported by a support shaft 191 so that it is free to tilt only in a direction parallel to the plane of the drawing.

In the base member 106a of the operation lever 106 is formed a sliding surface 106b having a prescribed curvature. This operation lever apparatus 105' is provided with a brake member 190 having a sliding surface of a shape corresponding to the shape of the sliding surface 106b in the base member 106a of the operation lever, described above. When the brake member 190 is pressed by a rod 192, the sliding surface of the brake member 190 and the sliding surface 106b of the operation lever base member 106a come into contact. The other configuring elements therein are configured as diagrammed in FIG. 26(a) and so are not further described here.

FIG. 28 shows the operation lever 106 in the neutral position. Let it be assumed now that the operation lever 106 is tilted away from this position in the forward direction F (on the left side in the drawing) about the axis of the support shaft 191. Thereupon, the piston 104 (on the left side in the drawing) will be depressed in the direction of the arrow A by the operation lever base member 106a.

When the piston 104 is depressed, a pilot pressure Pp having a size corresponding to the amount of tilt of the operation lever 106 is output from the pilot line 114. When that happens, a hydraulic actuator (not shown) is actuated and the vehicle moves ahead. Similarly, when the piston 102 on the opposite side has been displaced in response to the tilt of the operation lever 106, a hydraulic signal indicating a pilot pressure Pp is output from the pilot lines 115 and the vehicle moves back.

If here the operator releases the operation lever 106 which has been operated to a prescribed operation position, with the operation lever base member 106a having been turned to a prescribed turning position, the force of friction caused by the sliding resistance between the operation lever sliding surface 106b and the brake member 190 will act opposite to the restoring turning force of the return springs 143 and 144, and the operation lever base member 106a will stop in that prescribed turning position. Hence the operation lever 106 will be held in that condition wherein it has been operated to the prescribed operation position.

The same demand to reduce the burden on an operator holding an operation position arises for the operation lever apparatus 105 that is operated with two directional components, that is, in the forward and backward direction and in the left and right direction, as diagrammed in FIG. 26(a), as for the operation lever apparatus 105' operated with only one directional component as diagrammed in FIG. 28.

On the other hand, the demand also arises for releasing the holding function that holds the operation lever at the position to which it has been operated, depending on the work situation.

When the configuration has been made so that the operation lever is held in the position to which it has been operated, the following problem arises.

That is, let it be assumed that the engine stops with the operation lever still held in a tilted position. If the engine is restarted in that condition, the vehicle will suddenly take off in a direction of advance corresponding to the direction wherein the operation lever is tilted.

A third object of the present invention is to be able to hold an operation position and also be able to release a holding condition, whether with the operation lever apparatus 105' that is capable of being operated only with one directional component, or with the operation apparatus 105 that is capable of being operated with two directional components, that is, both in the forward and backward direction and in the left and right direction.

SUMMARY OF THE INVENTION

A first aspect of the present invention, for the purpose of achieving the first object stated earlier, is an apparatus for altering combinations of operation apparatuses and actuators which comprises:

two (left and right) operation apparatuses (5L, 5R) for outputting operation direction signals in operation directions; and left and right running actuators (33, 34) provided respectively for each of left and right running bodies of a vehicle, that, by driving in drive directions corresponding to the operation direction signals, drive the left and right running bodies in corresponding directions;

and which alters combinations of operation direction signals of the two operation apparatuses (5L, 5R) and drive directions of the left and right running actuators (33, 34);

wherein the apparatus for altering combinations of operation apparatuses (5L, 5R) and actuators (33, 34) is further provided with switching means (40) for switching between a first combination that causes direction signals output from one operation apparatus (5L) of the two (left and right) operation apparatuses (5L, 5R) to correspond with driving directions of the left and right running actuators, (33, 34) and a second combination that causes operation direction signals output from the left operation apparatus (5L) to correspond with drive directions of the left running actuator (33), and operation direction signals output from the right operation apparatus (5R) to correspond with drive directions of the right running actuator (34).

The first aspect of the invention is now described with reference to FIGS. 1, 2, and 5.

FIG. 5 is a diagram that diagrams the configuration of switching means 40 indicated in FIG. 1 and FIG. 2.

Based on the first aspect of the invention, when a change to the first combination is designated by a pattern switching lever 46, as diagrammed in FIG. 5, the first combination (first operation pattern S1) is switched to by the switching means 40. Thereby, as diagrammed in FIG. 1, correspondences are effected between the operation direction signals output from one operation apparatus 5L of the two (left and right) operation apparatuses 5L and 5R and the drive directions of the left and right running actuators 33 and 34. As a consequence, it becomes possible to actuate the left and right running bodies by operating only one of the operation levers (i.e. the left operation lever 6L).

When a change to the second combination is designated by the pattern switching lever 46, as diagrammed in FIG. 5, the second combination (second operation pattern S2) is switched to by the switching means 40. Thereby, as diagrammed in FIG. 2, correspondences are effected between the operation direction signals output from the operation apparatus 5L on the left side and the drive directions of the running actuator 33 on the left side, and correspondences are effected between the operation direction signals output from the operation apparatus 5R on the right side and the drive directions of the running actuator 34 on the right side. As a consequence, it becomes possible to actuate the left and right running bodies by operating both the left and the right operation levers 6L and 6R.

Based on the first aspect of the invention described above, the first operation pattern S1 and second operation pattern S2 can be switched between when actuating the running bodies, operability is enhanced in vehicles such as skid steer loaders, and the burden on the operator is reduced.

A second aspect of the invention is the apparatus according to the first aspect of the invention, wherein the operation direction signals are hydraulic signals; a bridge circuit (45) in which four shuttle valves (41, 42, 43, 44) are connected in a ring is provided; and the switching means (40) switches between the first combination that passes the operation direction hydraulic signals output from the one operation apparatus (5L) of the two (left and right) operation apparatuses (5L, 5R) through the four shuttle valves (41, 42, 43, 44) in the bridge circuit (45), and causes same to act on ports (32F, 31F, 32R, and 31R) corresponding to the drive directions of the left and right running actuators (33, 34), and the second combination that causes the operation direction signals output from the left operation apparatus (5L) to act directly on ports (31F, 31R) corresponding to the drive directions of the left running actuator (33) and causes the operation direction hydraulic signals output from the right operation apparatus (5R) to act directly on ports (32F, 32R) corresponding to the drive directions of the right running actuator (34).

The second aspect of the invention is now described with reference to FIGS. 1, 2, and 5.

Based on the second aspect of the invention, as diagrammed in FIG. 5, when a change to the first combination (first operation pattern S1) is designated by the pattern switching lever 46, as diagrammed in FIG. 1, the operation direction signals output from the one operation apparatus 5L of the two (left and right) operation apparatuses 5L and 5R pass through the four shuttle valves 41, 42, 43, and 44 in the bridge circuit 45 and act on the ports 32F, 31F, 32R, and 31R corresponding to the drive directions of the left and right running actuators 33 and 34. Thereby the first combination (first operation pattern S1) is switched to.

When, on the other hand, the second combination (second operation pattern S2) is changed to by the pattern switching lever 46, as diagrammed in FIG. 5, the operation direction signals output from the left operation apparatus 5L, as diagrammed in FIG. 2, act directly on the ports 31F and 31R corresponding to the drive directions of the left running actuator 33, without passing through the four shuttle valves 41, 42, 43, and 44 in the bridge circuit 45. The operation direction signals output from the right operation apparatus 5R act directly on the ports 32F and 32R corresponding to the drive directions of the right running actuator, without passing through the four shuttle valves 41, 42, 43, and 44 in the bridge circuit 45. Thereby the second combination (second operation pattern) is switched to.

Based on the second aspect of the invention, the same benefits are realized as with the first invention. In addition, as based on the second invention, in a hydraulic circuit wherewith actuators are actuated by pilot hydraulic signals output from an operation apparatus, a first operation pattern S1 and second operation pattern S2 can easily be switched between merely by switching the pilot hydraulic signal paths.

A third aspect of the invention is the apparatus according to either the first or second aspect of the invention, further comprising two actuators for work machines; wherein: the switching means (40) switch between the first combination that causes operation direction signals output from one operation apparatus (5L) of the two (left and right) operation apparatuses (5L, 5R) to correspond with drive directions of the left and right running actuators (33, 34) and causes operation direction signals output from other one of the operation apparatuses (5R) to correspond with drive directions of the two actuators for work machines, and the second combination that causes operation direction signals output from the left operation apparatus (5L) to correspond with drive directions of the left running actuator (33) and with drive directions of one of the actuators for working machines, and causes operation direction signals output from the right operation apparatus (5R) to correspond with drive directions of the right running actuator (34) and with drive directions of other one of the actuators for working machines.

The third aspect of the invention is now described with reference to FIGS. 1, 2, and 5.

Based on the third aspect of the invention, as diagrammed in FIG. 5, when a change to the first combination (first operation pattern S1) is designated by the pattern switching lever 46, as diagrammed in FIG. 1, correspondences are effected between the operation direction signals output from the one operation apparatus 5L of the two (left and right) operation apparatuses 5L and 5R and the drive directions of the left and right running actuators 33 and 34, and correspondences are effected between the operation direction signals output from the other operation apparatus 5R and the drive directions of the two actuators for work machines. As a consequence, the left and right running bodies can be actuated by operating only the one operation lever (left operation lever 6L), and the two working members (boom and bucket) can be actuated by operating only the other operation lever (right operation lever 6R).

As diagrammed in FIG. 5, furthermore, when the second combination (second operation pattern S2) is changed to by the pattern switching lever 46, as diagrammed in FIG. 2, correspondences are effected between the operation direction signals output from the left operation apparatus 5L, on the one hand, and the drive directions of the running actuator 33 on the left side and the drive directions of one of the actuators for working machines, on the other, while correspondences are also effected between the operation direction signals output from the right operation apparatus 5R, on the one hand, and the drive directions of the running actuator 34 on the right side and the drive directions of the other actuator for work machine, on the other. As a consequence, it becomes possible to actuate the left and right running bodies by operating both the left and the right operation levers 6L and 6R, to actuate one of the working members (the boom) by operating the left operation lever 6L, and to actuate the other working member (the bucket) by operating the right operation lever 6R.

Based on the third aspect of the invention, the same benefits are obtained as with the first and second inventions. Based on the third invention, furthermore, a first operation pattern S1 and second operation pattern S2 can easily be changed between, even when using working members in addition to running bodies.

A fourth aspect of the invention, for the purpose of achieving the second object stated earlier, is an apparatus for altering combinations of operation apparatuses and actuators which comprises:

two operation apparatuses (5L, 5R) for outputting operation direction signals in operation directions as hydraulic signals; and two actuators (33, 34) that drive in drive directions corresponding to the operation direction signals;

and which alters combinations of operation direction signals of the two operation apparatuses (5L, 5R) and drive directions of the two actuators (33, 34);

wherein the apparatus for altering combinations of operation apparatuses and actuators is further provided with switching means (40) for switching between a first combination that passes operation direction hydraulic signals output from one (51) of the two operation apparatuses (5L, 5R) through a bridge circuit (45) in which four shuttle valves (41, 42, 43, 44) are connected in a ring, and causes those signals to act on ports (32F, 31F, 32R, 31R) corresponding to the drive directions of the two actuators (33, 34), and a second combination that causes operation direction hydraulic signals output from one (5L) of the operation apparatuses to act directly on ports (31F, 31R) corresponding to drive directions of one of the actuators, and causes operation direction hydraulic signals output from other one (5R) of the operation apparatuses to act directly on ports (32F, 32R) corresponding to drive directions of other one (34) of the actuators.

The fourth aspect of the invention is now described with reference to FIGS. 1, 2, and 5.

Based on the fourth aspect of the invention, as diagrammed in FIG. 5, when a change to the first combination is designated by the pattern switching lever 46, the first combination (first operation pattern S1) is switched to by the switching means 40. Thereby, as diagrammed in FIG. 1, the operation direction signals output from one operation apparatus 5L of the two operation apparatuses 5L and 5R pass through the four shuttle valves 41, 42, 43, and 44 in the bridge circuit 45, and act on the ports 32F, 31F, 32R, and 31R corresponding to the drive directions of the two actuators 33 and 34. Thereby, the first combination (first operation pattern S1) is switched to. As a consequence, it becomes possible to drive two actuators by operating only one operation apparatus (the left operation lever 6L).

When the second combination is changed to by the pattern switching lever 46, as diagrammed in FIG. 5, the second combination (second operation pattern S2) is switched to by the switching means 40. Thereby, as diagrammed in FIG. 2, the operation direction signals output from one operation apparatus 5L act directly on the ports 31F and 31R corresponding to the drive directions of the one actuator 33, without passing through the four shuttle valves 41, 42, 43, and 44 in the bridge circuit 45. The operation direction signals output from the other operation apparatus 5R act directly on the ports 32F and 32R corresponding to the drive directions of the other actuator 34, without passing through the four shuttle valves 41, 42, 43, and 44 in the bridge circuit 45. Thereby the second combination (second operation pattern S2) is switched to. As a consequence, it becomes possible to drive two actuators by operating the two operation apparatuses (the left and right operation levers 6L and 6R).

As based on the fourth aspect of the invention, described in the foregoing, switching can easily be done between a first operation pattern for driving two actuators with only one operation apparatus of two operation apparatuses, and a second operation pattern for driving the two actuators by operating both of the two operation apparatuses.

A fifth aspect of the invention is the apparatus according to the fourth aspect of the invention, wherein: the switching means (40) comprises:

input ports (I1, I2, I3, I4) for inputting operation direction hydraulic signals output from the one of the operation apparatuses (5L);

output ports (E1, E2, E3, E4) that are connected to ports (32F, 31F, 32R, 31R) corresponding to the drive directions of the two actuators (33, 34); and a piston (48) having a first position in which the input port (I1) is caused to communicate with the output ports (E1, E2) through the shuttle valves (41, 42) in the bridge circuit (45), and a second position in which the input port (I1) is caused to communicate directly with the output ports (E2).

The fifth aspect of the invention is now described with reference to FIGS. 1, 2, 5, and 6.

Based on the fifth aspect of the invention, as diagrammed in FIG. 6, in response to the change to the first combination (first operation pattern S1) being designated by the pattern switching lever 46, the relative position of the piston 48 with respect to a body 47 is changed to the first position. Thereby, as diagrammed in FIG. 5, the input port I1 is connected to the output ports E1 and E2 through the shuttle valves 41 and 42 in the bridge circuit 45. The same is true of the other input ports I2 to I4. Thus the first combination (first operation pattern S1) is switched to.

As diagrammed in FIG. 6, moreover, in response to the change to the second combination (second operation pattern S2) by the pattern switching lever 46, the relative position of the piston 48 with respect to the body 47 is changed to the second position. Thereby, the input port I1 is connected directly to the output port E2 without passing through the four shuttle valves 41, 42, 43, and 44 in the bridge circuit 45. The same is true of the other input ports I2, I3, and I4. Thus the second combination (second operation pattern S2) is switched to.

Based on the fifth aspect of the invention, the same benefits are gained as with the fourth aspect of the invention. As based on the fifth aspect of the invention, furthermore, switching can be performed with the simple operation of changing the relative position of the piston 48 with respect to the body 47.

A sixth aspect of the invention is the apparatus according to the fifth aspect of the invention, wherein the piston 48 is cylindrical in shape, and the rotational position thereof in relation to the body 47 changes in response to a rotating operation.

The sixth aspect of the invention is now described with reference to FIG. 6.

Based on the sixth aspect of the invention, the rotational position of the cylindrical piston 48 changes in relation to the body 47 in response to rotational operations of the pattern switching lever 46. Thus the switching means 40 are changed between a first position and a second position, and switching is effected between the first combination (first operation pattern S1) and the second combination (second operation pattern S2).

Based on the sixth aspect of the invention, the same benefits are gained as with the fourth and fifth aspect of the inventions. Based on the sixth aspect of the invention, furthermore, switching can be effected merely by performing the simpler operation of rotating the piston 48. The structure of the switching means 40 can also be simplified.

A seventh aspect of the invention is the apparatus according to either the fifth or sixth aspect of the invention, wherein the input ports (I1, I2, I3, and I4) and the output ports (E1, E2, E3, and E4) are deployed on one (47) of the body (47) and the piston (48), and the other (the piston 48) is actuated so that it assumes either the first position or the second position.

The seventh aspect of the invention is now described with reference to FIG. 6.

Based on the seventh aspect of the invention, the input ports I1, I2, I3, and I4 and the output ports E1, E2, E3, and E4 are deployed either on the side of the body 47 or on the side of the piston 48 (on the side of the body 47, for example). The other side (the piston 48) is then actuated (rotationally actuated) so that it assumes either the first position or the second position. Therefore, the problem of the lines (hydraulic lines 11, 12, 13, and 14, etc.) that are connected to the input ports I1, I2, I3, and I4 and the output ports E1, E2, E3, and E4 becoming twisted does not occur even if the piston 48 is actuated. Based on the seventh aspect of the invention, the same benefits are realized as with the fourth, fifth, and sixth aspect of the inventions.

An eighth aspect of the invention, for the purpose of realizing the third object, is an operation lever apparatus comprising:

an operation lever (106) capable of being operated so as to tilt;

drive signal generation means (120, 119, 121, 118) for generating drive signals according to the direction and amount of tilt in the operation lever (106) and outputting the same to actuators;

holding means (122, 174) for holding the operation lever (106) in a certain tilted position when the operation lever (106) has been operated so to tilt; and hold release means (122, 174) for releasing hold conditions effected by the hold means.

The eighth aspect of the invention is now described with reference to FIG. 32 which is a specific example thereof.

Based on the eighth aspect of the invention, when the operation lever 106 is operated so as to tilt, that operation lever 106 is held in a tilted operation position for one directional component, either the component for the forward and backward directions F and B, or the component for the left and right directions L and R. In concrete terms, hydraulic fluid discharged from an operation lever pump 122 acts on a piston 174. As a consequence, a pressing force is generated at the piston 174 and the piston 174 is pushed against a support shaft 152 by a sliding member 148c. As a result, the operation lever 106 is held in the tilted position.

As diagrammed in FIG. 24 and FIG. 25, when the operation lever 106 has been operated in a direction midway between the forward direction F and the right direction R, causing the vehicle to effect a "forward turn to the right," and the operation lever 106 is then released, that operation lever 106 will be held in the tilted position in the forward direction F component. As a consequence, the vehicle will continue moving in the "forward" direction while maintaining the current speed of running.

Then, when a holding force release lever 176 is operated to the switch position 177b, hydraulic fluid will cease being discharged from the operation lever pump 122 that has the engine for its drive source. As a consequence, the hydraulic fluid discharged from the operation lever pump 122 will cease acting on the piston 174. As a consequence of that, the pressing force will cease being generated at the piston 174, and the condition wherein the piston 174 is pushed against the support shaft 152 via the sliding member 148c is released. As a result, the holding force on the operation lever 106 is released, and the operation lever 106 is returned to the neutral position from the tilted position.

Thus, as based on this eighth aspect of the invention, the operation lever can be held in a tilted position, and the condition wherein the operation lever is held in a tilted position can be released according to the job situation.

A ninth aspect of the invention is the apparatus according to the eighth aspect of the invention, wherein the hold release means (122, 174) releases the holding force acting on the operation lever (106) in response to the drive source (132) for the actuator being stopped driving.

The ninth aspect of the invention is now described with reference to FIG. 32 which shows a specific example thereof.

When the drive of a drive source such as an engine stops, hydraulic fluid will cease being discharged from the operation lever pump 122 that is driven by that engine or other drive source. When this happens, hydraulic fluid discharged from the operation lever pump 122 no longer acts on the piston 174. As a consequence, the pressing force will no longer be generated at the piston 174, and the condition wherein the piston 174 is pressed against the support shaft 152 by the sliding member 148c will be released. As a result, the holding force on the operation lever 106 will be released, and the operation lever 106 will be returned to the neutral position from the tilted position.

Based on the ninth aspect of the invention, the operation lever holding condition can be released without fail by the stopping of the engine or other drive source, wherefore safety is dramatically enhanced. That is, even if the engine is stopped with the operation lever held in a tilted position, the operation lever will be automatically restored to the neutral position when the engine is restarted. As a consequence, the vehicle will not suddenly begin moving as a result of restarting the engine. In other words, it is therewith possible to avoid situations where the vehicle suddenly begins moving in a direction of advance according to the direction the operation lever was tilted in when the engine was stopped the previous time.

A tenth aspect of the invention is the apparatus according to the eighth aspect of the invention, wherein: the holding means (122 and 174) and the hold release means (122 and 177) comprise:

a hydraulic pump (122) driven by the actuator drive source (132); and a pushing member (174) that is pushed against the operation lever (106) by a pushing force responsive to the pressure of the hydraulic fluid discharged from the hydraulic pump (122);

and wherein the pushing member (174) is pushed against the operation lever (106) with a pushing force responsive to the pressure of the hydraulic fluid discharged from the hydraulic pump (122), and the operation lever (106) is held in a tilted position, when the drive source (132) is driving; and, when the drive source (132) has stopped driving, the condition where the pushing member (174) is being pushed against the operation lever (106) is released, and the condition where the operation lever (106) is held is released.

The tenth aspect of the invention is now described with reference to FIG. 31, which is a specific example.

Based on the tenth aspect of the invention, when the engine or other drive source is driving, hydraulic fluid is discharged from the operation lever pump 122. As a consequence, the hydraulic fluid discharged from the operation lever pump 122 acts on the piston 174. When the operation lever 106 is operated so that it tilts, and the support shaft 152 is turned, the piston 174 is pressed against the support shaft 152 by the sliding member 148 with a pushing force responsive to the pressure of the hydraulic fluid. Therefore the support shaft 152 stops in the turned position and the operation lever 106 is held in a tilted position.

As diagrammed in FIG. 24 and FIG. 25, when the operation lever 106 is operated in a direction midway between the forward direction F and the right direction R, the vehicle is made to effect a "forward turn to the right," and the operation lever 106 is then released, the operation lever 106 will be held in a tilted position in the forward direction F component. The vehicle will therefore continue moving in the "forward" direction while maintaining the current speed of running.

When, on the other hand, the engine or other drive source stops driving, the hydraulic fluid will no longer be discharged from the operation lever pump 122. As a consequence, the hydraulic fluid discharged from the operation lever pump 122 will no longer act on the piston 174. As a consequence of that, the pushing force will no longer be generated at the piston 174, and the condition wherein the piston 174 is pushed against the operation lever 106 by the sliding member 148c will be released. As a result, the holding force on the operation lever 106 will be released and the operation lever 106 will be restored to the neutral position from the tilted position.

Thus, as based on this tenth aspect of the invention, the operation lever can be held in a tilted position, and the condition wherein the operation lever is held in a tilted position can be released in response to the stopping of the drive of an engine or other drive source. The operation lever holding condition can be released without fail by the stopping of the engine or other drive source, wherefore safety is dramatically enhanced. That is, even if the engine is stopped with the operation lever held in a tilted position, the operation lever will be automatically restored to the neutral position when the engine is restarted. As a consequence, the vehicle will not suddenly begin moving as a result of restarting the engine. In other words it is therewith possible to avoid situations where the vehicle suddenly begins moving in a direction of advance according to the direction the operation lever was tilted in when the engine was stopped the previous time.

An eleventh aspect of the invention is the apparatus according to the eighth aspect of the invention, further comprising holding force adjustment means (189) for adjusting the magnitude of the holding force acting on the operation lever (106).

The eleventh aspect of the invention is now described with reference to FIG. 35.

Based on the eleventh aspect of the invention, the same benefits are realized as with the eighth aspect of the invention.

Based on the eleventh aspect of the invention, furthermore, the size of the holding force acting on the operation lever 106 is adjusted by the holding force adjustment means 189.

Thus, as based on this eleventh aspect of the invention, the size of the holding force acting on the operation lever 106 can be adjusted according to the job situation or the operating strength of the operator.

A twelfth aspect of the invention is the apparatus according to the eighth aspect of the invention, wherein the drive signal generation means (120, 119, 121, 118) are drive signal generation means (120, 119, 121, 118) that generate drive signals for causing the vehicle to move in a direction of running that is according to the direction in which the operation lever (106) is tilted and at a speed of running that is according to the amount by which the operation lever (106) is tilted, and output those signals to running actuators (135, 137).

The twelfth aspect of the invention is described with reference to FIG. 22.

Based on the twelfth aspect of the invention, the same benefits are realized as with the eighth aspect of the invention.

Based on the twelfth aspect of the invention, when the operation lever 106 is operated, drive signals for causing the vehicle to move in a direction of running that accords with the direction the operation lever 106 is tilted in and at a speed of running that accords with the amount of that tilt in the operation lever 106 are generated and output to the running actuators 135 and 137.

Specifically, correspondences are effected with either of two types of running actuator 135 and 137 (either the actuator 135 or the actuator 137) and the drive direction thereof (either the forward direction or backward direction), on the one hand, and four pistons 101, 102, 103, and 104 in the operation lever apparatus 105, on the other.

Then, when drive signals are generated for each of the four pistons 101, 102, 103, and 104 by the drive signal generation means 120, 119, 121, and 118, the running actuator corresponding to the piston at which that drive signal is being generated is driven in a corresponding drive direction, by a drive amount that accords with that drive signal. That is, when a drive signal is generated by the piston 101, the running actuator 135 corresponding to that piston 101 where that drive signal is being generated is driven in the corresponding drive direction (forward direction) by a drive amount that accords with that drive signal. When a drive signal is generated by the piston 102, the running actuator 137 corresponding to that piston 102 where that drive signal is being generated is driven in the corresponding drive direction (backward direction) by a drive amount that accords with that drive signal. When a drive signal is generated by the piston 103, the running actuator 135 corresponding to that piston 103 where that drive signal is being generated is driven in the corresponding drive direction (backward direction) by a drive amount that accords with that drive signal. And when a drive signal is generated by the piston 104, the running actuator 137 corresponding to that piston 104 where that drive signal is being generated is driven in the corresponding drive direction (forward direction) by a drive amount that accords with that drive signal.

Then the operation lever 106 is held by that operation lever 106 in a tilted position in one of the directional components, either in the forward and backward direction component F and B, or in the left and right direction component L and R. As a result, a condition is maintained wherein the running actuator corresponding to one directional component is driven in the corresponding drive direction.

Thus, as based on the twelfth aspect of the invention, as diagrammed specifically in FIG. 24, when the operation lever 106 is operated in a direction midway between the forward direction F and the right direction R, the vehicle is made to effect a "forward turn to the right," and the operation lever 106 is then released, that operation lever 106 is held in a tilted position in the forward direction F component. As a consequence, the vehicle runs in the "forward" direction while maintaining the current speed of running.

BRIEF DESCRIPTION OF THE DRAWINGS

FIGS. 10(*a*), 10(*b*) and 10(*c*) are diagrams representing conditions when the first operation pattern is switched to;

FIGS. 11(*a*), 11(*b*), and 11(*c*) are diagrams representing the A section, B section, and C section in FIG. 8, respectively, being diagrams that represent conditions when the second operation pattern is switched to;

DESCRIPTION OF THE PREFERRED EMBODIMENTS

Figure 1:
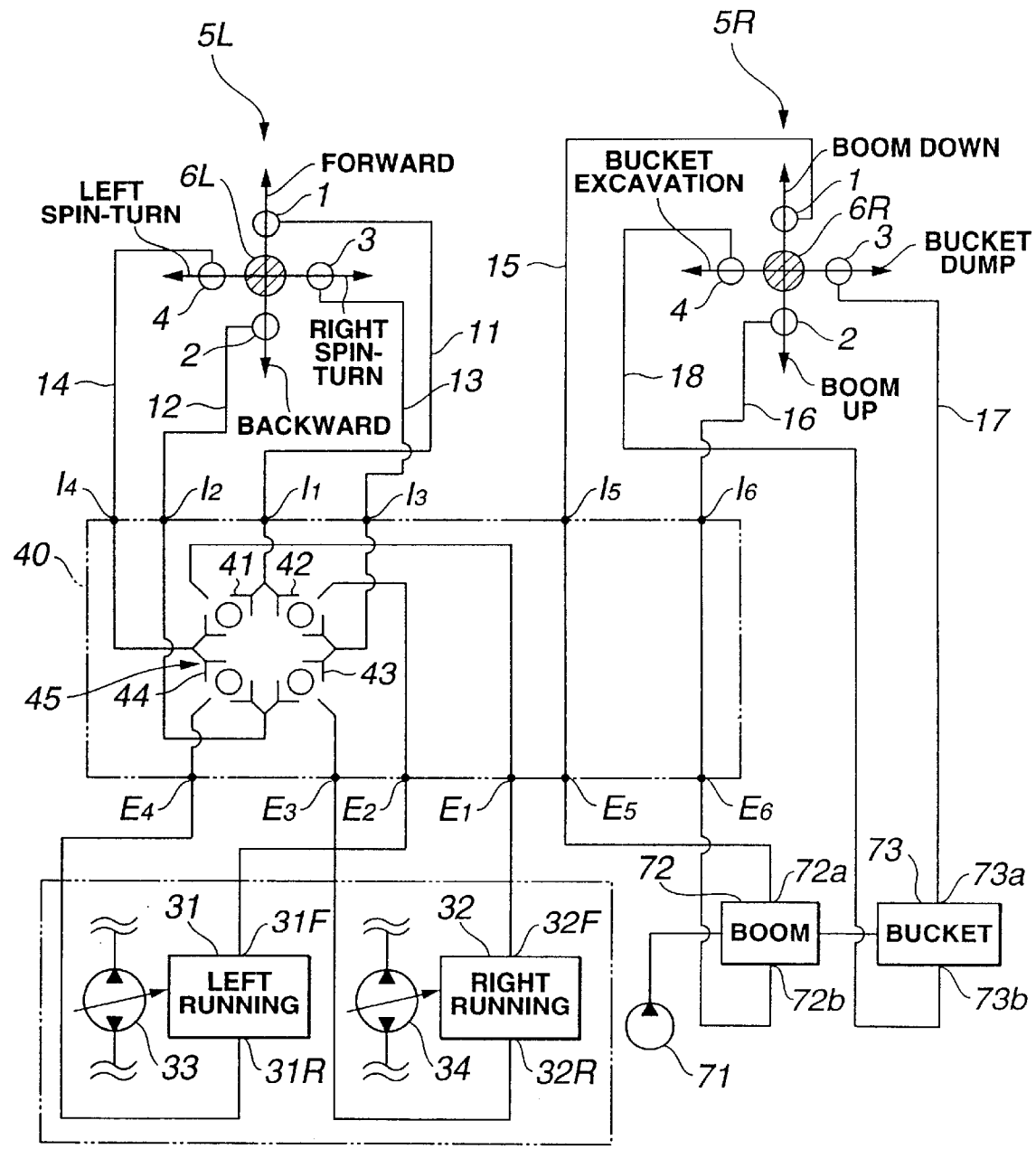
FIG. 1 is a diagram of a hydraulic circuit when switched to a first operation pattern.

Embodiment aspects of apparatus for altering combinations of operation apparatuses and actuators relating to the present invention are now described with reference to the drawings. In these embodiment aspects, cases are assumed wherein operation patterns are altered in vehicles such as skid steer loaders. The present invention is not limited to applications in vehicles, however, but can be applied to any drive machines where switching is involved between a first operation pattern wherewith two actuators are driven by only one of two operation apparatuses, and a second operation pattern wherewith the two actuators are driven by operating both of two operation apparatuses.

In a vehicle such as a skid steer loader, working members are configured by a boom and a bucket. A left running-body (left crawler) 36 and a right running body (right crawler) 38 are deployed to the left and right of the vehicle as diagrammed in FIG. 4. The left and right running bodies 36 and 38 are driven by two (left and right) running body hydraulic motors 35 and 37 deployed on the left and right of the vehicle body, respectively. The running bodies 36 and 38 may be wheels instead of crawlers. Assumed here is an HST (hydro static transmission or static hydraulic drive) vehicle. The left and right running bodies 36 and 38 are driven independently by hydraulic motors 35 and 37 deployed to the left and right of the vehicle body, respectively. The running body 36 on the left side of the vehicle body is independently driven, and the speed thereof is independently changed, by a drive mechanism deployed exclusively for that purpose on the left. Similarly, the running body 38 on the right side of the vehicle body is independently driven, and the speed thereof is independently changed, by a drive mechanism deployed exclusively for that purpose on the right. The left drive mechanism is configured by a left running body hydraulic pump 33 and a left running body hydraulic motor 35, while the right drive mechanism is configured by a right running body hydraulic pump 34 and a right running body hydraulic motor 37.

Figure 12A:
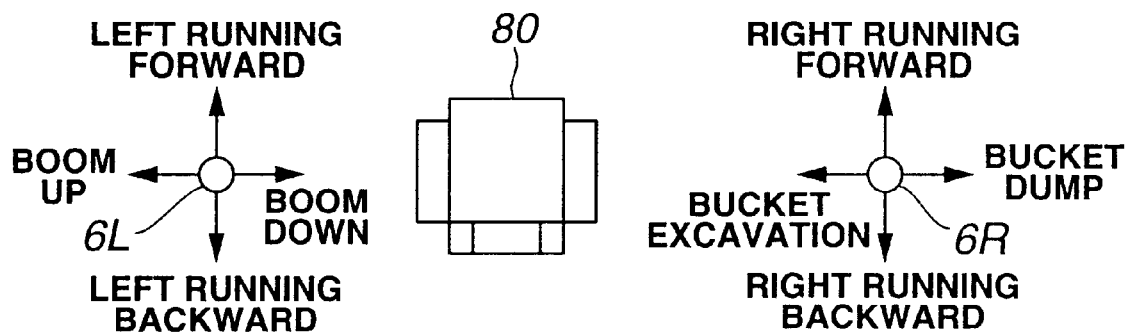
FIGS. 12(*a*), 12(*b*), and 12(*c*) are diagrams used in describing operation patterns for a skid steer loader.
Figure 12B:
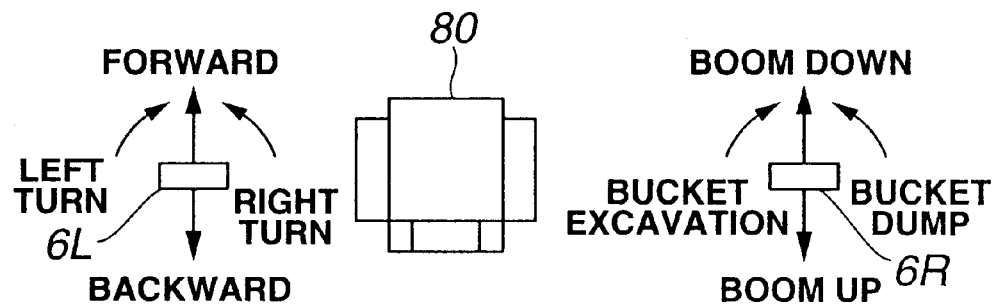
Figure 12C:
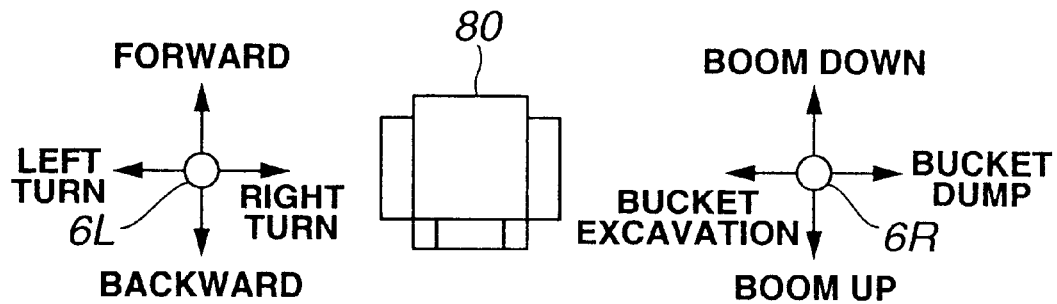
Figure 13:
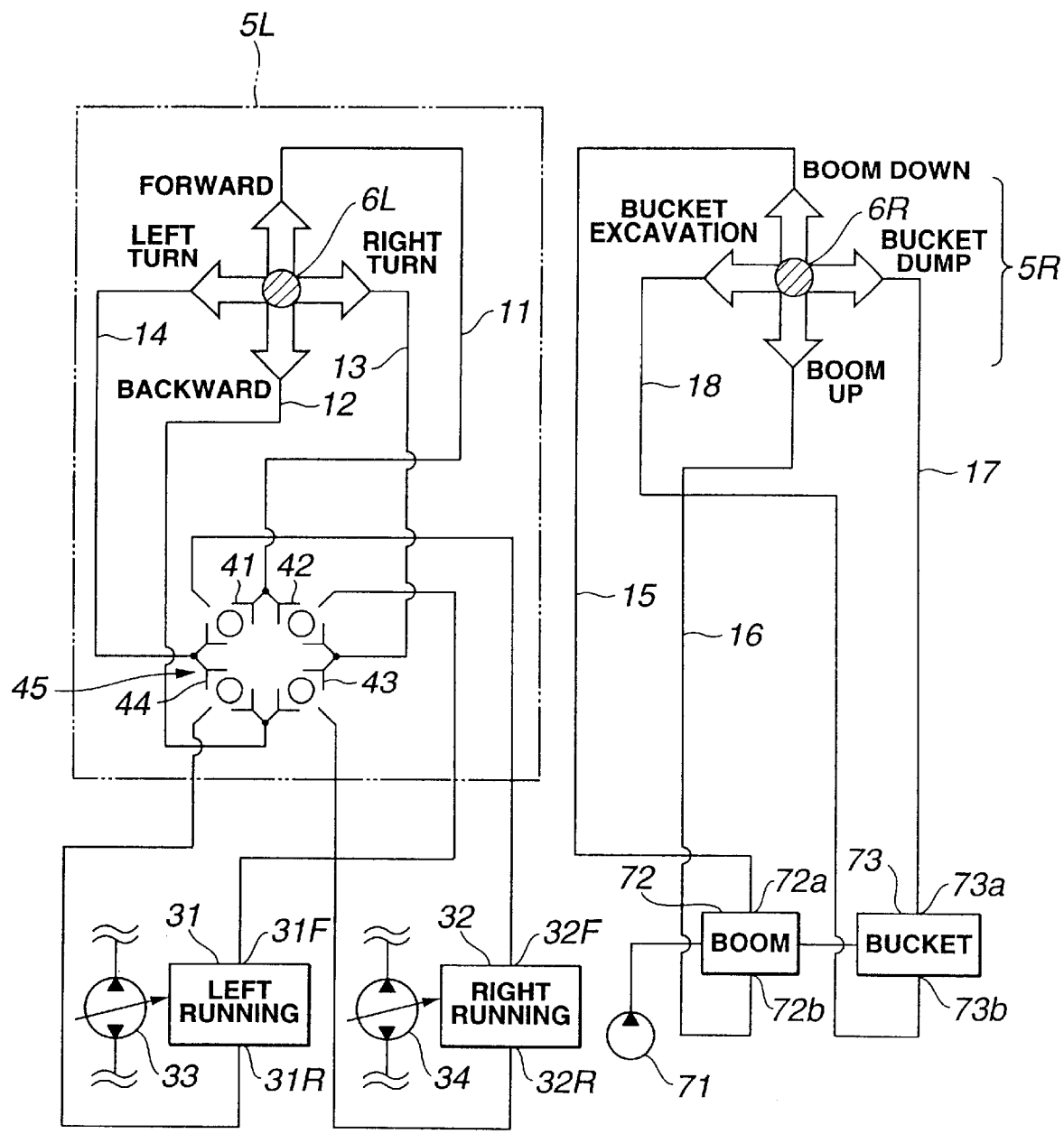
FIG. 13 is a diagram of a hydraulic circuit for a conventional operation lever and actuator.
Figure 14:
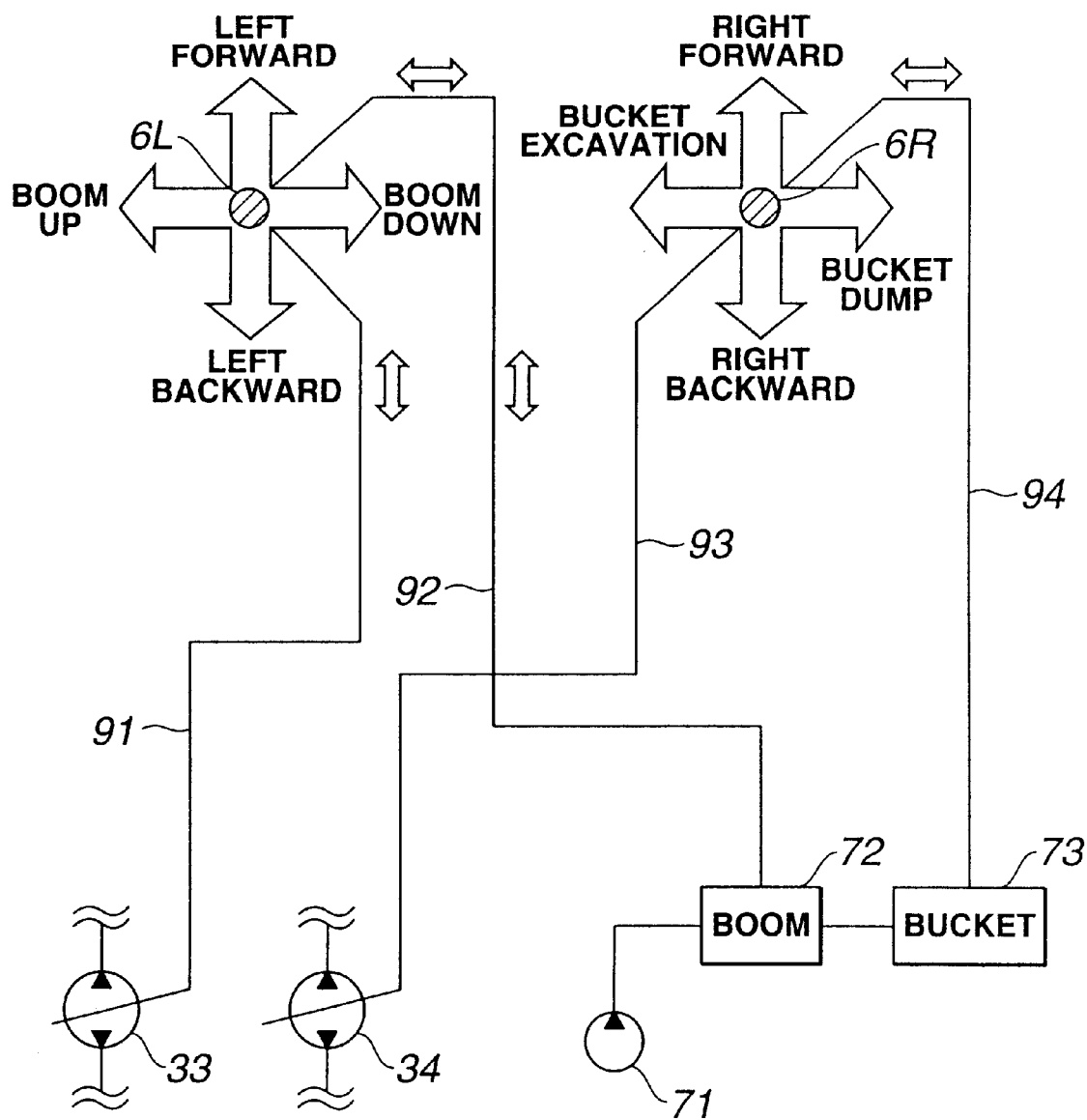
FIG. 14 is a diagram for a hydraulic circuit for a conventional operation lever and actuator.

In a vehicle such as a skid steer loader, four running bodies and working members made up of a boom, a bucket, and two (left and right) running bodies 36 and 38, as diagrammed in FIGS. 12(a) and 12(c), are driven by operations of left and right operation levers 6L and 6R deployed on the left and right of the operator's seat 80.

The combinations of corresponding relationships (operation patterns) between the operation directions of the two (left and right) operation levers 6L and 6R, on the one hand, and the actuation directions of the four running bodies and working members, on the other, differ according to the company manufacturing the skid steer loader. In this embodiment aspect, a description is given of an apparatus for switching between a first operation pattern S1, diagrammed in FIG. 12(c), and a second operation pattern S2, diagrammed in FIG. 12(a).

Figure 2:
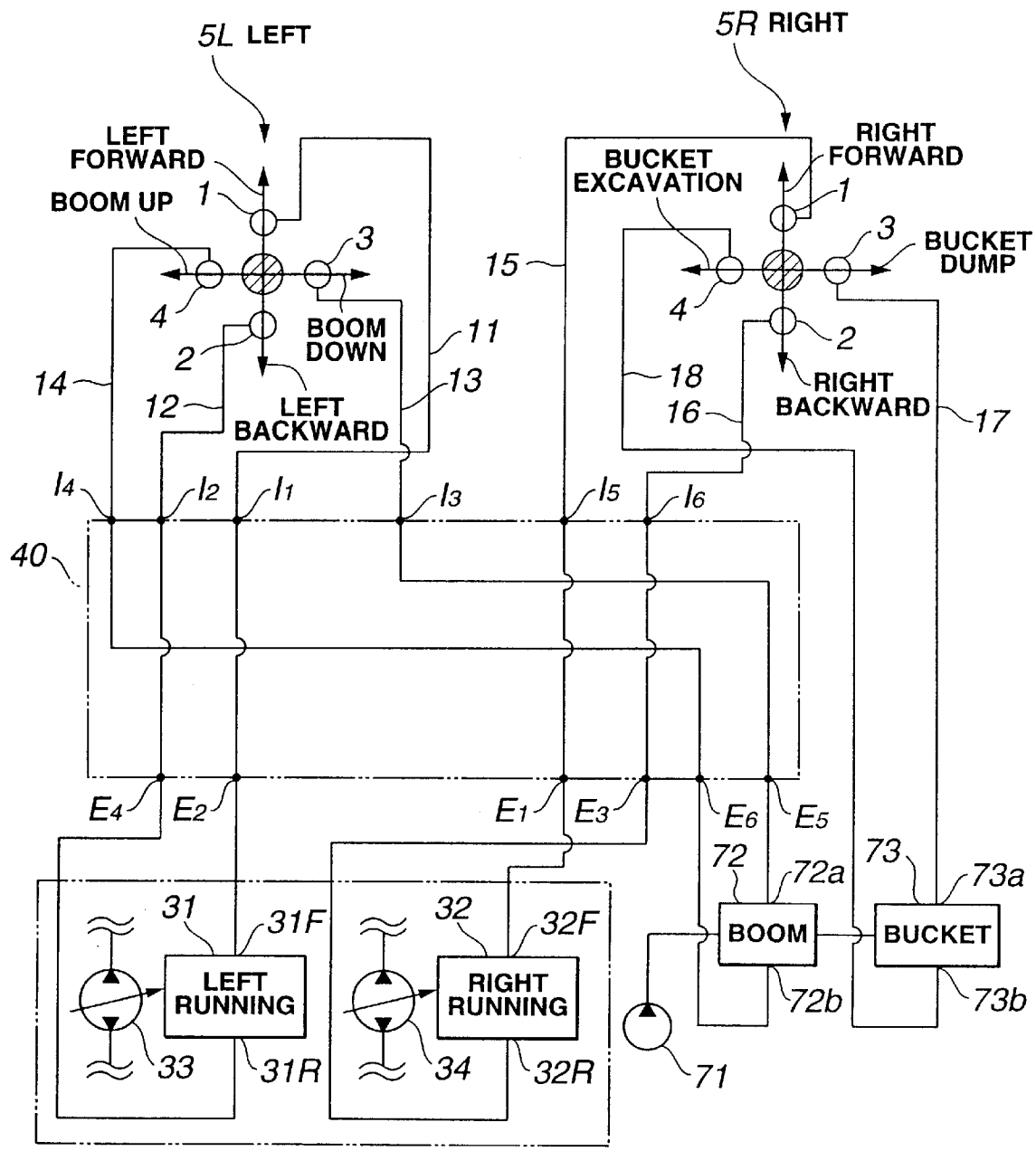
FIG. 2 is a diagram of a hydraulic circuit when switched to a second operation pattern.

FIG. 1 represents a hydraulic circuit when the first operation pattern S1, wherewith the left and right running bodies 36 and 38 are driven by operating only the left operation lever 6L, is switched to. FIG. 2 represents a hydraulic circuit when the second operation pattern S2, wherewith the left and right running bodies 36 and 38 are driven by operating both the left and right operation levers 6L and 6R, is switched to.

FIG. 3 is a diagram for describing the configuration of the main parts of the operation lever apparatus 5L diagrammed in FIG. 2.

The operation lever apparatuses 5L and 5R diagrammed in FIG. 1 and FIG. 2 are first described. The structures of the left and right operation lever apparatuses 5L and 5R are the same, so the left operation lever apparatus 5L is described representatively.

Figure 3A:
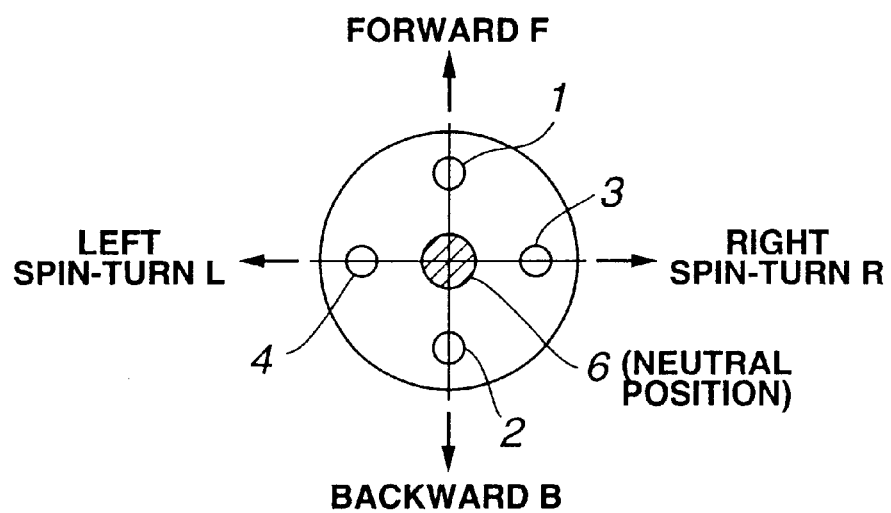
FIGS. 3(*a*) and 3(*b*) are diagrams for describing vehicle movements made to correspond with operation lever tilt directions.
Figure 3B:
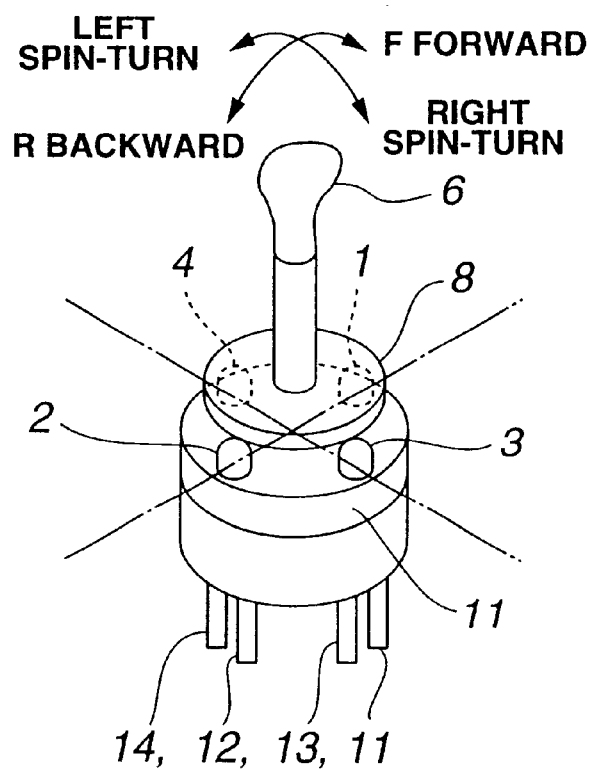

As diagrammed in FIGS. 3(a) and 3(b), the left operation lever apparatus 5L comprises a main apparatus body 9, and a left operation lever 6L deployed so that it can be tilted in relation to the main apparatus body 9. The left operation lever 6L is attached to the main apparatus body 9 by a universal coupling and a disk plate 8. Four pistons 1, 2, 3, and 4 are deployed so that the piston tips protrude from the main apparatus body 9. The pistons 1, 2, 3, and 4 are deployed so that, as seen from the upper surface of the main apparatus body 9, they are positioned at the four corners of a square.

When the left operation lever 6L is tilted in the forward direction, in the drawing in FIG. 3(a), piston 1 is depressed. When piston 1 is depressed, a pilot pressure (hydraulic signal) is output to a pilot line 11. The pilot pressure output from the pilot line 11 attains a size that corresponds with the amount by which the left operation lever 6L is tilted.

Similarly, when the left operation lever 6L is tilted in the backward direction, in the drawing in FIG. 3(a), piston 2 is depressed. When piston 2 is depressed, a pilot pressure that corresponds to the amount of lever tilt is output to a pilot line 12. Similarly, when the left operation lever 6L is tilted in the right direction, in the drawing in FIG. 3(a), piston 3 is depressed. When piston 3 is depressed, a pilot pressure that corresponds to the amount of lever tilt is output to a pilot line 13. And, similarly, when the left operation lever 6L is tilted in the left direction, in the drawing in FIG. 3(a), piston 4 is depressed. When piston 4 is depressed, a pilot pressure that corresponds to the amount of lever tilt is output to a pilot line 14.

The situation is similar for the right operation lever apparatus 5R. Pistons 1, 2, 3, and 4 are depressed in response to operations of the right operation lever 6R in the forward, backward, right, and left directions, respectively, whereupon pilot pressures that correspond to the amounts of lever tilt are output to pilot lines 15, 16, 17, and 18, respectively.

As diagrammed in FIG. 1 and FIG. 2, the pilot lines 11, 12, 13, and 14 for the left operation lever apparatus 5L are connected, respectively, to input ports I1, I2, I3, and I4 in a pattern switching valve 40.

The pilot lines 15 and 16 for the right operation lever apparatus 5R are connected, respectively, to input ports I5 and I6 in the pattern switching valve 40.

The pilot lines 17 and 18 for the right operation lever apparatus 5R are connected directly to a bucket dump position pilot port 73a and to a bucket excavation position pilot port 73b in a bucket control valve 73, respectively.

The output ports E1, E2, E3, and E4 in the pattern switching valve 40 are connected to a forward position pilot port 32F in a right running body control valve 32, a forward position pilot port 31F in a left running body control valve 31, a backward position pilot port 32R in the right running body control valve 32, and a backward position pilot port 31R in the left running body control valve 31.

The output ports E5 and E6 of the pattern switching valve 40 are connected to the boom down position pilot port 72*a* and boom up position pilot port 72*b,* respectively, of the boom control valve 72.

To the boom control valve 72 and bucket control valve 73, respectively, is supplied hydraulic fluid discharged from the working member pump 71. With the boom control valve 72 and bucket control valve 73, the direction of the discharged hydraulic fluid supplied from the working member pump 71 is controlled. The flow volume of that discharged hydraulic fluid is also controlled. The hydraulic fluid portions controlled by the boom control valve 72 and the bucket control valve 73 are supplied, respectively, to a boom hydraulic cylinder and bucket hydraulic cylinder that are not shown in the drawings.

When a pilot pressure (hydraulic signal) acts via the output port E5 on the boom down position pilot port 72*a* of the boom control valve 72, the boom hydraulic cylinder is driven to the boom down position, and in response thereto the boom is actuated toward the down position. And when a pilot pressure acts on the boom up position pilot port 72*b* of the boom control valve 72 via the output port E6, the boom hydraulic cylinder is driven toward the boom up position and, in response thereto, the boom is actuated toward the up position. Similarly, when a pilot pressure acts via the pilot line 17 on the bucket dump position pilot port 73*a* of the bucket control valve 73, the bucket hydraulic cylinder is driven toward the bucket dump position, and in response thereto the bucket is actuated toward the dump position. And when a pilot pressure acts via the pilot line 18 on the bucket excavation position pilot port 73*b* of the bucket control valve 73, the bucket hydraulic cylinder is driven toward the bucket excavation position and, in response thereto, the bucket is actuated toward the excavation position.

In this embodiment aspect, furthermore, the operation lever apparatuses 5L and 5R are configured so that pilot pressures are output by operating the operation levers so that they tilt. However, the configuration may also be made such that pilot pressures are output by operating the operation levers (knobs) diagrammed in FIG. 12(*b*) so that they turn.

Next, the configuration of the running body drive unit 30 diagrammed in FIG. 1 and FIG. 2 is described with reference to FIG. 4.

Figure 4:
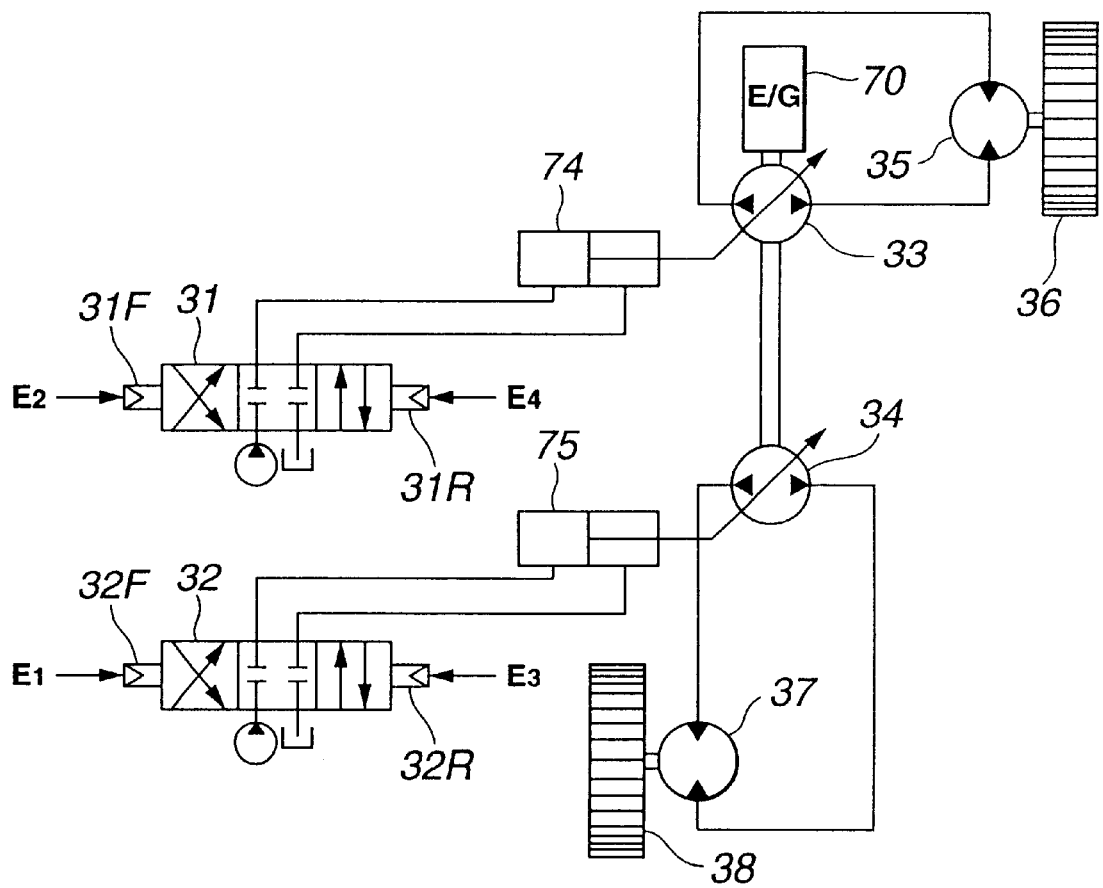
FIG. 4 is a diagram of a hydraulic circuit for the running body driver units diagrammed in FIG. 1 and FIG. 2.

FIG. 4 is a hydraulic circuit diagram representing the configuration of the running body drive unit 30 diagrammed in FIG. 1 and FIG. 2.

To the left running body control valve 31 is supplied hydraulic fluid discharged from a hydraulic pump 39. With the left running body control valve 31, the direction of the discharged hydraulic fluid supplied from the hydraulic pump 39 is controlled, and the flow volume of that discharged hydraulic fluid is also controlled, according to pilot pressures acting on pilot ports. The hydraulic fluid controlled by the left running body control valve 31 is supplied to a left pump volume drive hydraulic cylinder 74. When that left pump volume drive hydraulic cylinder 74 is driven, the volume of the left running body hydraulic pump 33 is changed.

Similarly, to the right running body control valve 32 is supplied hydraulic fluid discharged from a hydraulic pump 39. With the right running body control valve 32, the direction of the discharged hydraulic fluid supplied from the hydraulic pump 39 is controlled, and the flow volume of that discharged hydraulic fluid is also controlled, according to pilot pressures acting on pilot ports. The hydraulic fluid controlled by the right running body control valve 32 is supplied to a right pump volume drive hydraulic cylinder 75. When that right pump volume drive hydraulic cylinder 75 is driven, the volume of the right running body hydraulic pump 34 is changed.

The left running body (left crawler) 36 is actuated by the left running body hydraulic motor 35 being driven. That is, the left running body hydraulic motor 35 is an actuator that actuates the left running body 36 in two directions of movement, namely forward and backward. The left running body hydraulic pump 33 is driven by an engine 70. Hydraulic discharge ports in the left running body hydraulic pump 33 are connected by hydraulic lines to hydraulic inflow ports in the left running body hydraulic motor 35.

Similarly, the right running body (right crawler) 38 is actuated by the right running body hydraulic motor 37 being driven. That is, the right running body hydraulic motor 37 is an actuator that actuates the right running body 38 in two directions of movement, namely forward and backward. The right running body hydraulic pump 34 is driven by the engine 70. Hydraulic discharge ports in the right running body hydraulic pump 34 are connected by hydraulic lines to hydraulic inflow ports in the left running body hydraulic motor 37.

Thus, when a pilot pressure (hydraulic signal) acts via the output port E2 on the forward position pilot port 31F of the left running body controller 31, the volume of the left running body hydraulic pump 33 is changed to the forward position and, in response thereto, the left running body 36 is actuated in the forward direction F. And when a pilot pressure acts via the output port E4 on the backward position pilot port 31R of the left running body control valve 31, the volume of the left running body hydraulic pump 33 is changed to the backward position and, in response thereto, the left running body 36 is actuated in the backward direction R. Similarly, when a pilot pressure acts via the output port E1 on the forward position pilot port 32F of the right running body controller 32, the volume of the right running body hydraulic pump 34 is changed to the forward position and, in response thereto, the right running body 38 is actuated in the forward direction F. And when a pilot pressure acts via the output port E3 on the backward position pilot port 32R of the left running body control valve 32, the volume of the right running body hydraulic pump 34 is changed to the backward position and, in response thereto, the right running body 38 is actuated in the backward direction R.

Next, the configuration of the pattern switching valve 40 diagrammed in FIG. 1 and FIG. 2 is described with reference to FIG. 5.

Figure 5:
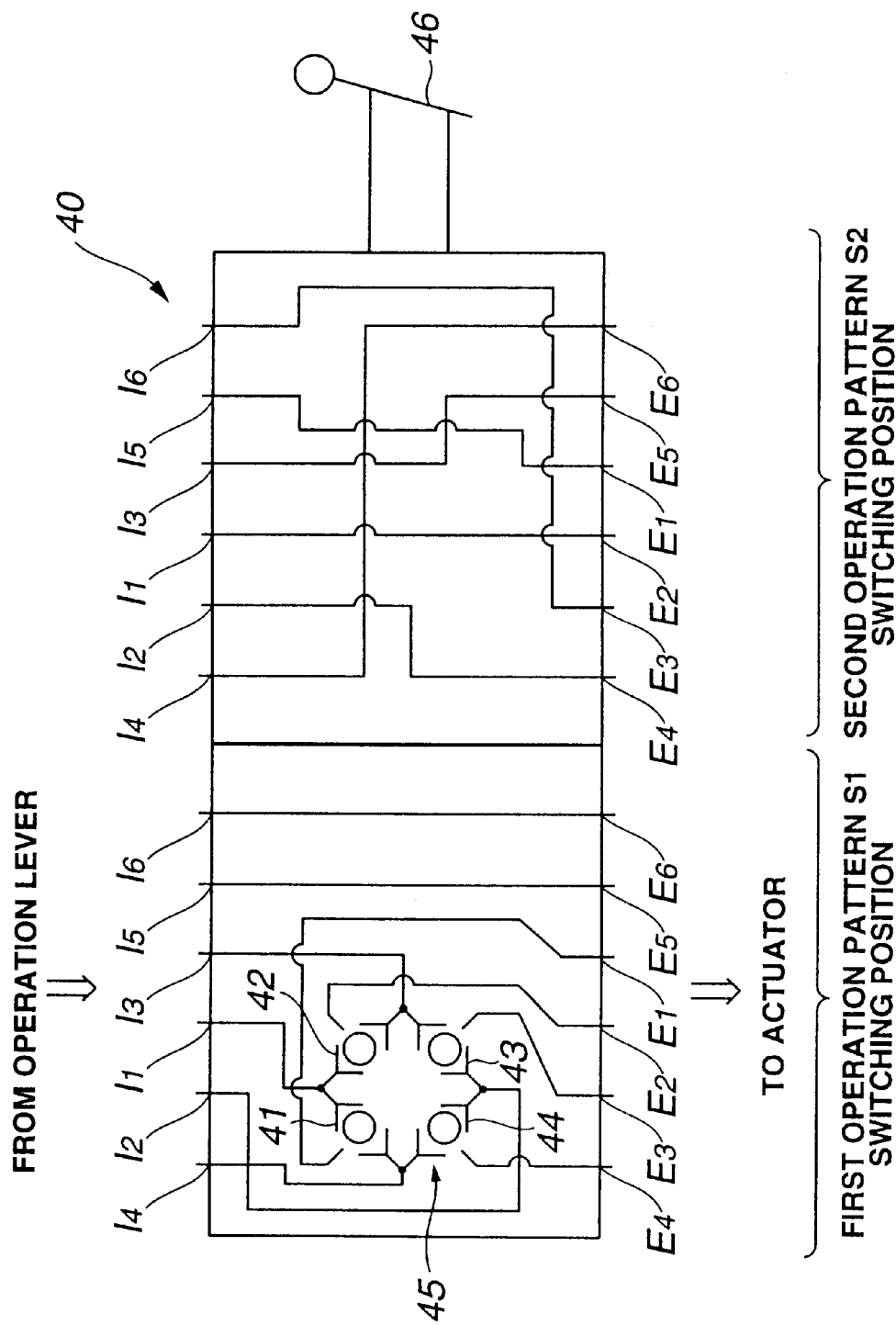
FIG. 5 is a diagram of the structure of the pattern switching valve diagrammed in FIG. 1 and FIG. 2.

FIG. 5 is a diagram that conceptually represents the structure of the pattern switching valve 40 diagrammed in FIG. 1 and FIG. 2.

As diagrammed in FIG. 5, the pattern switching valve 40 is structured so that the valve position can be switched between two positions by operating a pattern switching lever 46. In this pattern switching valve 40 is provided a bridge circuit 45 wherein four shuttle valves 41, 42, 43, and 44 are connected in a ring. Also provided in this pattern switching valve 40 are input ports I1 to I6 and output ports E1 to E6.

When the pattern switching lever 46 is operated and the pattern switching valve 40 is positioned at a first operation pattern S1, on the left side in the drawing, the input port I1 is connected to the outflow ports of the shuttle valves 41 and 42, the input port I2 is connected to the outflow ports of the shuttle valves 43 and 44, the input port I3 is connected to the inflow ports of the shuttle valves 42 and 43, and the inflow port I4 is connected to the inflow ports of the shuttle valves 44 and 41. Also, the outflow port of the shuttle valve 41 is connected to the output port E1, the outflow port of the shuttle valve 42 is connected to the output port E2, the outflow port of the shaven 43 is connected to the output port E3, and the outflow port of the shuttle valve 44 is connected to the output port E4. In addition, the input port I5 is connected to the output port E5, and the input port I6 is connected to the output port E6.

In contrast therewith, when the pattern switching lever 46 is operated and the pattern switching valve 40 is put in the second operation pattern S2 switch position, on the right side in the drawing, the input port I1 is connected to the output port E2. Simultaneously therewith, the input port I2 is connected to the output port E4, the input port I3 to the output port E5, the input port I4 to the output port E6, the input port I5 to the output port E1, and the input port I6 to the output port E3.

In this embodiment aspect, furthermore, the configuration is made such that the valve position of the pattern switching valve 40 is switched in response to operations of the pattern switching lever 46. However, this embodiment aspect is not limited to lever operations, and any designation means may be used, such as switch operations or button operations, so long as they are means that designate modifications of the operation pattern. Nor is the pattern switching valve 40 limited to cases where actuation is effected in response to manual operations, and actuation may also be effected in response to electrical signals or hydraulic signals, etc. For example, an electrical signal may be generated in response to a switching switch being operated, and the valve position switched by applying that electrical signal to the pattern switching valve 40.

The operations of the combination altering apparatus described in the foregoing are now described.

As diagrammed in FIG. 5, when the pattern switching lever 46 is operated to a position corresponding to the first operation pattern S1, the valve position in the pattern switching valve 40 is positioned at the first operation pattern S1 switch position. The hydraulic circuit then in effect is diagrammed in FIG. 1.

Specifically, pilot lines 11, 12, 13, and 14 connected to the left operation lever apparatus 5L are connected to the inflow ports of shuttle valves 41 and 42, shuttle valves 43 and 44, shuttle valves 42 and 43, and shuttle valves 44 and 41, respectively. Also, the outflow ports of the shuttle valves 41, 42, 43, and 44 are connected to the pilot ports 32F, 31F, 32R, and 31R, respectively, of the left and right driver control valves 31 and 32. Thus it becomes possible to drive the left and right running bodies 36 and 38 by operating only the left operation lever 6L.

More specifically, when the left operation lever 6L is operated in the forward direction, only the piston 1 is depressed. Accordingly, a pilot pressure is generated only in the pilot line 11. That pilot pressure acts on the forward position pilot ports 32F and 31F of the left and right running body control valves 31 and 32, via the input port I1 of the pattern switching valve 40, the inflow ports of the two shuttle valves 41 and 42, the outflow ports of the shuttle valves 41 and 42, and the output ports E1 and E2 of the pattern switching valve 40. As a result, the left and right running bodies 36 and 38 are actuated at the same speed in the forward direction F.

When the left operation lever 6L is operated in the back direction, only the piston 2 is depressed. Accordingly, a pilot pressure is generated only in the pilot line 12. That pilot pressure acts on the backward position pilot ports 32R and 31R in the left and right running body control valves 31 and 32, via the input port I2 of the pattern switching valve 40, the inflow ports of the two shuttle valves 43 and 44, the outflow ports of the shuttle valves 43 and 44, and the output ports E3 and E4 of the pattern switching valve 40. As a result, the left and right running bodies 36 and 38 are actuated at the same speed in the backward direction R.

When the left operation lever 6L is operated in the right direction, only the piston 3 is depressed. Accordingly, a pilot pressure is generated only in the pilot line 13. That pilot pressure acts both on the forward position pilot port 31F of the left running body control valve 31 and on the backward position pilot port 32R of the right running body control valve 32, via the input port I3 of the pattern switching valve 40, the inflow ports of the two shuttle valves 42 and 43, the outflow ports of the shuttle valves 42 and 43, and the output ports E2 and E3 of the pattern switching valve 40. As a result, the left and right running bodies 36 and 38 are actuated, at the same speed, in the forward direction F and in the backward direction R, respectively. This movement is generally called a right spin turn or right spin turn.

When the left operation lever 6L is operated in the left direction, only the piston 4 is depressed. Accordingly, a pilot pressure is generated only in the pilot line 14. That pilot pressure acts both on the backward position pilot port 31R of the left running body control valve 31 and on the forward position pilot port 32F of the right running body control valve 32, via the input port I4 of the pattern switching valve 40, the inflow ports of the two shuttle valves 44 and 41, the outflow ports of the shuttle valves 44 and 41, and the output ports E4 and E1 of the pattern switching valve 40. As a result, the left and right running bodies 36 and 38 are actuated, at the same speed, in the backward direction R and in the forward direction F, respectively. This movement is generally called a left spin turn or left spin turn.

A description is given next of operating the left operation lever 6L in the right forward diagonal direction, that is, in a direction between the forward direction and right direction.

By tilting the left operation lever 6L, the piston 1 and piston 3 of the left operation lever apparatus 5L are depressed. The pilot pressure generated by the piston 1 acts on the shuttle valves 41 and 42 via the line 11. The pilot pressure generated by the piston 3 acts on the shuttle valves 42 and 43 via the line 13. Thereupon, the shuttle valve 42 outputs the higher of the two pressures on the line 11 and the line 13. The pilot pressure so output acts on the forward position pilot port 31F of the left running body control valve 31. Thereby, the left running body hydraulic pump 33 has its volume controlled toward the forward direction, and the left running body advances.

The shuttle valve 41 outputs the pilot pressure on the line 11 to the forward position pilot port 32F of the right running body control valve 32.

The shuttle valve 43 outputs the pilot pressure on the line 13 to the forward position pilot port 32R of the right running body control valve 32.

At this time, in the right running body control valve, a pilot pressure acts both forward and backward. Accordingly, the volume of the right running body hydraulic pump is controlled to the forward direction, or to stop, or in the backward direction, depending on the pressure differential between lines 11 and 13.

The speed of the left running body 36 at this time is determined by the higher of the two pressures on the lines 11 and 13. The speed of the right running body 38, meanwhile, is determined by the pressure differential between lines 11 and 13. Accordingly, the speed of the left running body 36 will always be greater. Thus the vehicle will effect a turning movement ahead and to the right. The size of the turn will be determined by the pressure differential between the lines 11 and 13, which is to say, by the direction in which the left operation lever 6L is tilted.

In this embodiment aspect, furthermore, when a lever is pushed over at a 45° angle to the front right, the output pressure on the lines 11 and 13 is made the same. Due to this fact, when a lever is pushed over at a 45° angle diagonally ahead and to the right, the right running body 38 stops, and only the left running body 36 advances.

When the left operation lever 6L is tilted diagonally to the front left, by a similar action, the vehicle makes a turning movement ahead and to the left.

When the left operation lever 6L is tilted diagonally to the back right, by a similar action, the vehicle makes a turning movement to the right rear, and when it is tilted diagonally to the left in the left direction, the vehicle makes a turning movement to the right rear.

The pilot lines 15, 16, 17, and 18 that are connected to the right operation lever apparatus 5R are connected, respectively, to the pilot ports 72a, 72b, 73a, and 73b of the boom control valve 72 and the bucket control valve 73. Thus it becomes possible to actuate the boom and the bucket merely by operating the right operation lever 6R.

When, on the other hand, the right operation lever 6R is operated in the forward direction, the pilot pressure generated on the pilot line 15 acts on the boom down position pilot port 72a of the boom control valve 72, via the input port I5 and the output port E5 of the pattern switching valve 40. As a consequence, the boom is actuated toward the down position.

When the right operation lever 6R is operated in the backward direction, the pilot pressure generated on the pilot line 16 acts on the boom up position pilot port 72b of the boom control valve 72, via the input port I6 and the output port E6 of the pattern switching valve 40. As a consequence, the boom is actuated toward the up position.

When the right operation lever 6R is operated in the right direction, the pilot pressure generated on the pilot line 17 acts on the bucket down position pilot port 73a of the bucket control valve 73. As a consequence, the bucket is actuated toward the dump position.

And when the right operation lever 6R is operated in the left direction, the pilot pressure generated on the pilot line 18 acts on the bucket excavation position pilot port 73b of the bucket control valve 73. As a consequence, the bucket is actuated toward the excavation position.

A description is given next for the case where the pattern switching lever 46 is operated to a position corresponding to the second operation pattern S2, as diagrammed in FIG. 5.

When this is the case, the valve position in the pattern switching valve 40 is positioned at the second operation pattern S2 switch position. The hydraulic circuit in this condition is diagrammed in FIG. 2.

More specifically, the pilot lines 11, 12, 13, and 14 that are connected to the left operation lever apparatus 5L are connected to the pilot ports 31F and 31R of the left running body control valve 31 and to the pilot ports 72a and 72b of the boom control valve 72, respectively, without passing through the bridge circuit 45. It therefore becomes possible to actuate the left running body 36 and the boom by operating the left operation lever 6L.

The pilot lines 15, 16, 17, and 18 that are connected to the right operation lever apparatus 5R, meanwhile, are connected to the pilot ports 32F and 32R of the right running body control valve 32 and to the pilot ports 73a and 73b of the bucket control valve 73, respectively. It therefore becomes possible to actuate the right running body and the bucket by operating the right operation lever 6R.

More specifically, when the left operation lever 6L is operated in the forward direction, the pilot pressure generated on the pilot line 11 acts on the forward position pilot port 31F of the left running body control valve 31, via the input port I1 and output port E2 of the pattern switching valve 40. As a consequence, the left running body 36 is actuated in the forward direction F and the vehicle moves ahead to the left.

When the left operation lever 6L is operated in the back direction, the pilot pressure generated on the pilot line 12 acts on the backward position pilot port 31R of the left running body control valve 31, via the input port I2 and output port E4 of the pattern switching valve 40. As a consequence, the left running body 36 is actuated in the backward direction R, and the vehicle moves back and to the left.

When the left operation lever 6L is operated in the right direction, the pilot pressure generated on the pilot line 13 acts on the boom down position pilot port 72a of the boom control valve 72, via the input port I3 and output port E5 of the pattern switching valve 40. As a consequence, the boom is actuated toward the down position.

And when the left operation lever 6L is operated in the left direction, the pilot pressure generated on the pilot line 14 acts on the boom up position pilot port 72b of the boom control valve 72, via the input port I4 and the output port E6 of the pattern switching valve 40. As a consequence, the boom is actuated toward the up position.

When, on the other hand, the right operation lever 6R is operated in the forward direction, the pilot pressure generated on the pilot line 15 acts on the forward position pilot port 32F of the right running body control valve 32, via the input port I5 and the output port E1 of the pattern switching valve 40. As a consequence, the right running body 38 is actuated in the forward direction F and the vehicle moves ahead and to the right.

When the right operation lever 6R is operated in the back direction, the pilot pressure generated on the pilot line 16 acts on the backward position pilot port 32R of the right running body control valve 32, via the input port I6 and the output port E3 of the pattern switching valve 40. As a consequence, the right running body 38 is actuated in the backward direction R, and the vehicle moves back and to the right.

When the right operation lever 6R is operated in the right direction, the pilot pressure generated on the pilot line 17 acts on the bucket down position pilot port 73a of the bucket control valve 73. As a consequence, the bucket is actuated toward the down position.

And when the right operation lever 6R is operated in the left direction, the pilot pressure generated on the pilot line 18 acts on the bucket excavation position pilot port 73b of the bucket control valve 73. As a consequence, the bucket is actuated toward the excavation position.

As described in the foregoing, when the second operation pattern S2 is switched to, the vehicle can be made to move ahead and back, to effect forward turns to the left and right, to effect backing turns to the left and right, and to effect spin turns to the left and right, by operations of both the left and right operation levers 6L and 6R.

Based on this embodiment aspect, as described in the foregoing, a first operation pattern S1 and second operation pattern S2 can be switched between when actuating running bodies 36 and 38, the operability of vehicles such as skid steer loaders is enhanced, and the burdens on the operator are reduced.

A specific configuration example of the pattern switching valve 40 is now described with reference to FIGS. 6 to 11.

Figure 6:
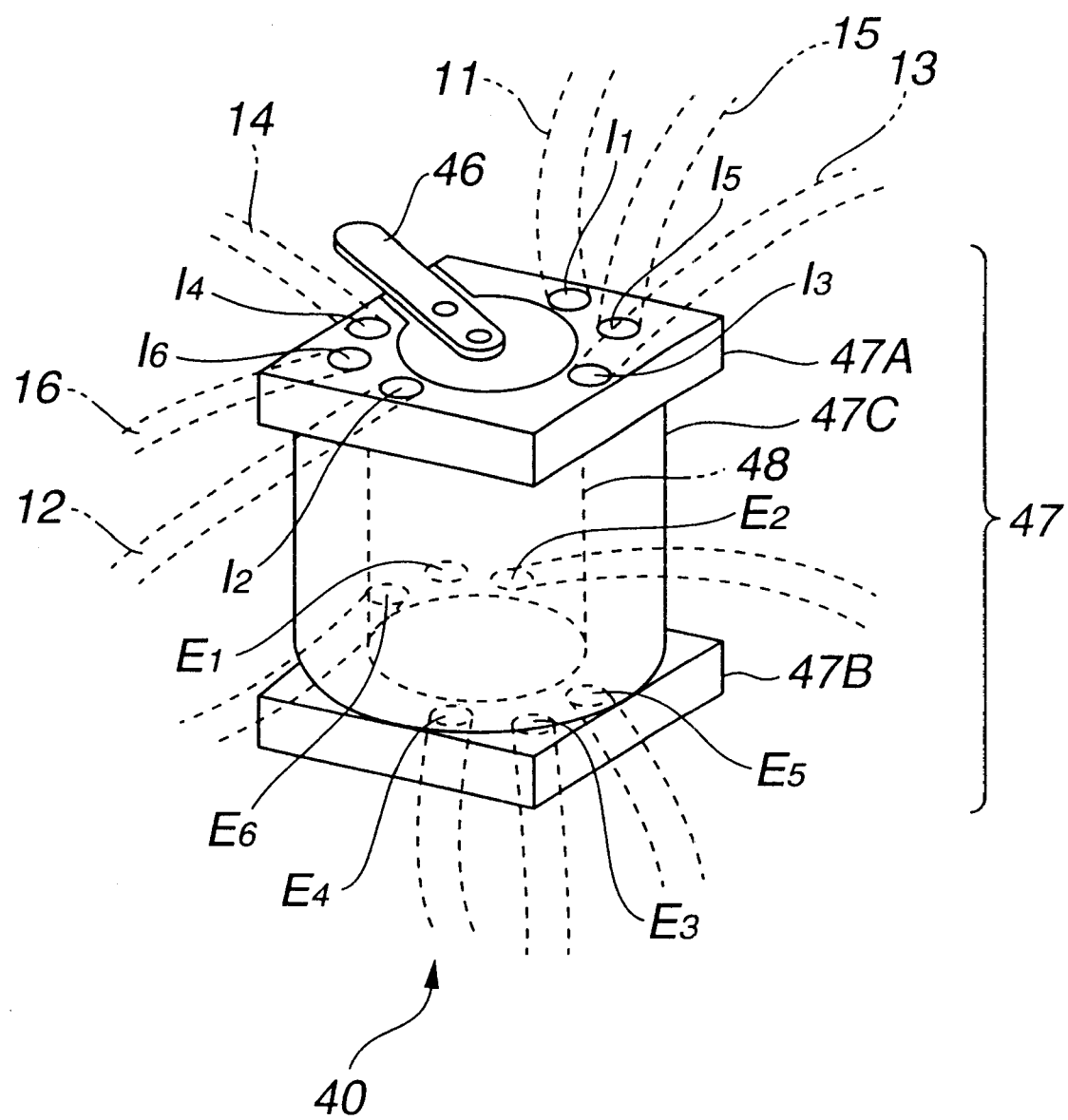
FIG. 6 is a diagonal view of a specific example configuration of the pattern switching valve diagrammed in FIG. 5.

FIG. 6 is a diagonal view of the pattern switching valve 40.

As diagrammed in FIG. 6, the pattern switching valve 40 consists mainly of a cylindrical piston 48 to which is attached a pattern switching lever 46, and a body 47. The body 47 functions as a cylinder that accommodates the piston 48 so that the piston 48 can slide freely therein. The body 47 comprises three configuring parts, namely an upper body part 47A, middle body part 47C, and lower body part 47B.

Figure 7:
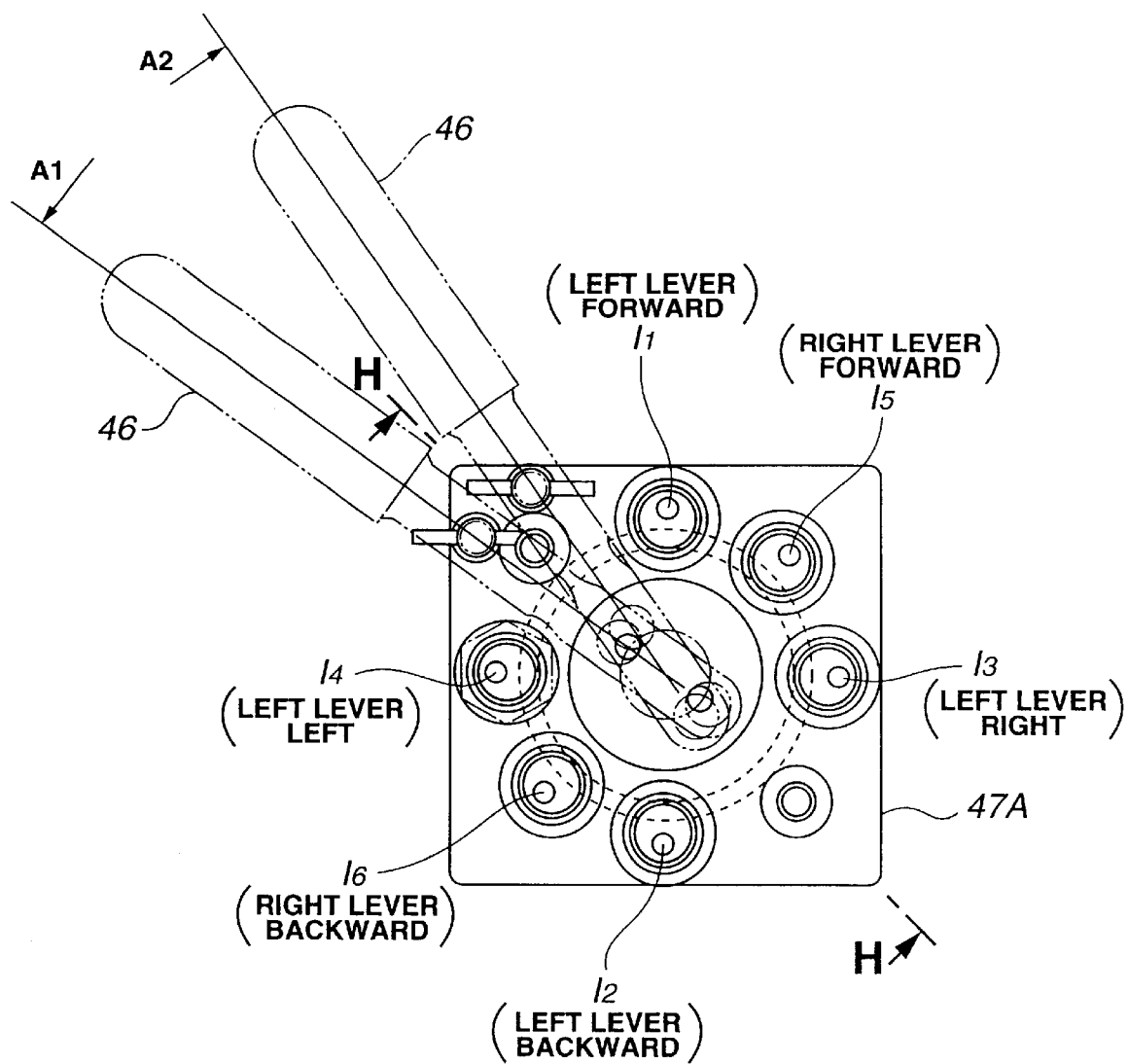
FIG. 7 is a diagram of the upper surface of the pattern switching valve diagrammed in FIG. 6.
Figure 8:
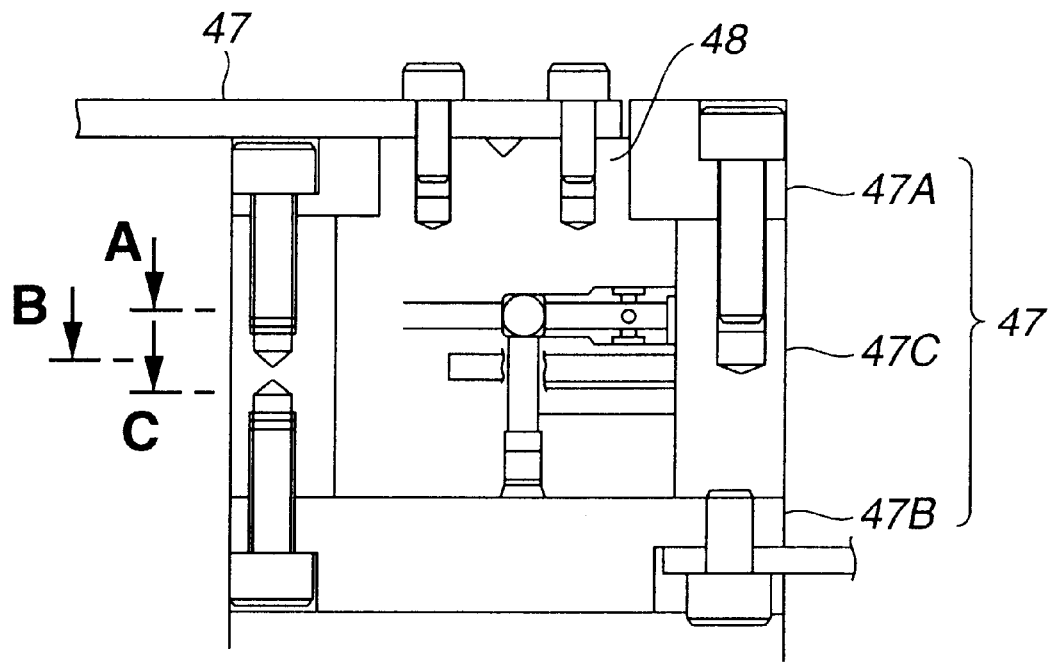
FIG. 8 is a cross-sectional view showing the H-H section in FIG. 7.

In FIG. 8 is diagrammed the H-H section in FIG. 7.

As diagrammed in FIG. 8, the upper body part 47A, middle body part 47C, and lower body part 47B are mutually linked by bolts. The pattern switching lever 46 is secured by bolts to the piston 48. Inside the piston 48 is deployed a bridge circuit 45 wherein four shuttle valves 41, 42, 43, and 44 are connected in a ring.

FIG. 7 is an upper surface diagram of the pattern switching valve 40.

As diagrammed in FIG. 7, input ports I1, I2, I3, I4, I5, and I6 are formed in the upper body part 47A. The pattern switching lever 46 can be operated in the left direction, as indicated by the arrow A1 in the diagram, and in the opposite direction, that is, the right direction, as indicated by the arrow A2 in the diagram. When the pattern switching lever 46 is operated in the A1 direction, the relative rotational position of the piston 48 with respect to the body 47 is altered, and the first operation pattern S1 switch position is switched to, as diagrammed in FIG. 5. When the pattern switching lever 46 is operated in the A2 direction, on the other hand, the relative rotational position of the piston 48 with respect to the body 47 is altered, and the second operation pattern S2 switch position is switched to, as diagrammed in FIG. 5.

Figure 9:
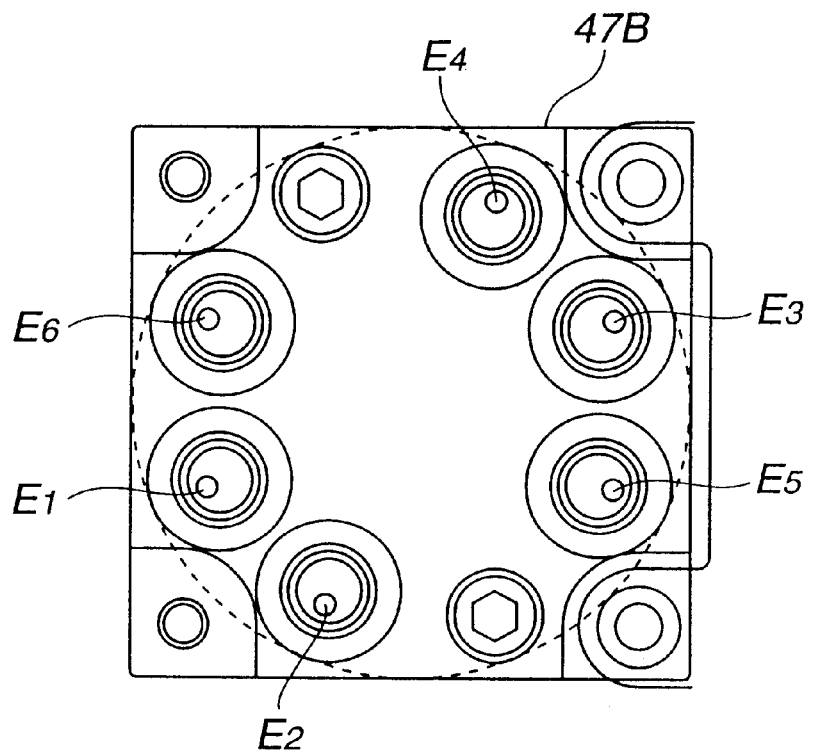
FIG. 9 is a bottom view corresponding to the upper surface view given in FIG. 7, being a diagram represented by subjecting FIG. 7 to a third-angle projection.

FIG. 9 is a bottom view corresponding to the upper surface view of FIG. 7, being a diagram represented by subjecting FIG. 7 to a third-angle projection.

As diagrammed in FIG. 9, output ports E1, E2, E3, E4, E5, and E6 are formed in the lower body part 47B.

FIG. 10(a) is a diagram representing the A-A section in FIG. 8, FIG. 10(b) is a diagram representing the B-B section in FIG. 8, and FIG. 10(c) is a diagram representing the C-C section in FIG. 8. The sections diagrammed in FIG. 10 are for the case where the first operation pattern S1 has been switched to.

In the A-A section, as diagrammed in FIG. 10(a), the input ports I1, I2, I3, and I4 communicate respectively to the outer wall surface of the piston 48 through the lines 50, 83, 82, and 84. An inflow port 51 for the shuttle valves 41 and 42, inflow port 85 for the shuttle valves 42 and 43, inflow port 86 for the shuttle valves 41 and 42, and inflow port 87 for the shuttle valves 44 and 41 are also formed, respectively, in the outer wall surface of the piston.

The shuttle valve 41 is configured by a ball 41a and a support member 41b for supporting the ball 41a with a hydraulic fluid line 41c formed in the interior thereof. The hydraulic fluid line 41c inside the shuttle valve 41 communicates via a line 52 with a ball 42a in an adjacent shuttle valve 42. The other shuttle valves 42, 43, and 44 are configured in the same manner.

An outflow port 53 for the shuttle valve 41 is formed in the lower surface of the ball 41a of the shuttle valve 41. The outflow port 53 is formed facing downward from the lower surface of the ball 41a to the C section in the middle body part 47C. Hydraulic fluid flows out to the outflow port 53 in association with the action of the ball 41a. Outflow ports 55, 57, and 58 are formed in the same manner in the lower surfaces of the balls of the other shuttle valves 42, 43, and 44.

In the B-B section, as diagrammed in FIG. 10(b), the input port I5, output port E5, and input port I3 that are adjacent along the outer circumference of the body 47 communicate with the outer wall surface of the piston 48 via lines 61, 63, and 67, respectively. Meanwhile, in the outer wall surface of the piston 48, a cutout 62 is formed, of such width as to connect two adjacent input/output ports of the input port I5, output port E5, and input port I3 noted above.

Similarly, the input port I6, output port E6, and input port I4 that are adjacent on the body 47 side are connected to the outer wall surface of the piston 48 via the lines 64, 66, and 68, respectively. In the outer wall surface of the piston 48, a cutout 65 is formed, of such width as to connect adjacent input/output ports of the input port I6, output port E6, and input port I4 noted above. The outflow port 53 of the shuttle valve 41 is connected to the inner wall surface of the body 47 by a line 88. Similarly, the outflow port 57 of the shuttle valve 43 is connected to the inner wall surface of the body 47 by a line 89.

In the C-C section, as diagrammed in FIG. 10(c), the input port I1 and output port E2 that are adjacent along the circumference of the body 47 are not connected, respectively, to the outer wall surface of the piston 48 by the lines 90 and 56. In the outer wall surface of the piston 48, meanwhile, a cutout 55a is formed of such width as to connect those ports, namely the input port I1 and the output port E2. This cutout 55a is connected to the outflow port 55 of the shuttle valve 42.

Similarly, the input port I2 and output port E4 that are adjacent on the body 47 side are not connected to the outer wall surface of the piston 48 by the lines 81 and 60, respectively. In the outer wall surface of the piston 48, a cutout 58a is formed of such width as to connect those ports, namely the input port I2 and the output port E4. This cutout 58a is connected to the outflow port 58 of the shuttle valve 44.

The output port E1 on the body 47 side is connected to the outer wall surface of the piston 48 by a line 54. Meanwhile, a cutout 53a connecting to the line 54 is formed at a position in opposition to the outer wall surface of the piston 48. This cutout 53a is connected to the outflow port 53 of the shuttle valve 41. Similarly, the output port E3 on the body 47 side is connected to the outer wall surface of the piston 48 by a line 59. Meanwhile, a cutout 57a that connects to the line 59 is formed at a position in opposition to the outer wall surface of the piston 48. This cutout 57a is connected to the outflow port 57 of the shuttle valve 43.

The operation of the pattern switching valve 40 described in the foregoing is now described.

When the pattern switching lever 46 is operated in the A1 direction, the relative rotational position of the piston 48 with respect to the body 47 is altered, and the first operation pattern S1 switch position indicated in FIG. 10 is switched to.

If at this time the left operation lever 6L is operated in the forward direction, the pilot hydraulic fluid output from the pilot line 11 is made to flow into the input port I1 of the pattern switching valve 40. Thus the pilot hydraulic fluid is made to flow into the inflow port 51 for the shuttle valves 41 and 42 on the piston 48 side via the line 50 on the body 47 side. Thus the ball 41a in the shuttle valve 41 will be actuated by the hydraulic fluid that has passed through the hydraulic line 41c inside the shuttle valve 41. Also, the ball 42a in the shuttle valve 42 will be actuated by the hydraulic fluid that has passed both through the hydraulic line 41c inside the shuttle valve 41 and through the line 52. Thus pilot hydraulic fluid will be made to flow out to the outflow ports 53 and 55 of the shuttle valves 41 and 42 (cf. FIG. 10(a)).

The pilot hydraulic fluid that has been made to flow out to the outflow port 53 of the shuttle valve 41 is made to flow into the line 54 on the body 47 side via the cutout 53a on the piston 48 side. Thus the pilot hydraulic fluid passes through the line 54 and is made to flow out from the output port E1. The pilot hydraulic fluid that was made to flow out to the outflow port 55 of the shuttle valve 42 is made to flow into the line 56 on the body 47 side via the cutout 55a on the piston 48 side. Thus the pilot hydraulic fluid passes through the line 56 and is made to flow out from the output port E2 (cf FIG. 10(c)).

The pilot hydraulic fluid portions that were made to flow out from the output ports E1 and E2 of the pattern switching valve 40 are applied to the forward position pilot ports 32F and 31F, respectively, of the left and right running body control valves 31 and 32. As a result, the left and right running bodies 36 and 38 are actuated at the same speed in the forward direction F and the vehicle moves ahead (straight ahead).

When the left operation lever 6L is operated in the back direction, the pilot hydraulic fluid output from the pilot line 12 is made to flow into the input port I2 of the pattern switching valve 40. Thus the pilot hydraulic fluid is made to flow into the inflow port 86 for the shuttle valves 43 and 44 on the piston 48 side via the line 83 on the body 47 side. As a result, the balls 43a and 44a in the shuttle valves 43 and 44 are actuated in the same way. Thus the pilot hydraulic fluid is made to flow out to the outflow ports 57 and 58 of the shuttle valves 43 and 44 (cf FIG. 10(a)).

The pilot hydraulic fluid made to flow out to the outflow port 57 of the shuttle valve 43 is made to flow into the line 59 on the body 47 side via the cutout 57a on the piston 48 side. Thus the pilot hydraulic fluid passes through the line 59 and is made to flow out from the output port E3. The pilot hydraulic fluid made to flow out to the outflow port 58 of the shuttle valve 44 is made to flow into the line 60 on the body 47 side via the cutout 58a on the piston 48 side. Thus the pilot hydraulic fluid passes through the line 60 and is made to flow out from the output port E4 (cf. FIG. 10(c)).

The pilot hydraulic fluid portions made to flow out from the output ports E3 and E4 of the pattern switching valve 40 are applied, respectively, to the backward position pilot ports 32R and 31R of the left and right running body control valves 31 and 32. As a result, the running bodies 36 and 38 are actuated at the same speed in the backward direction R and the vehicle moves in backward (straight back).

When the left operation lever 6L is operated in the right direction, the pilot hydraulic fluid output from the pilot line 13 is made to flow into the input port I3 of the pattern switching valve 40. Thus the pilot hydraulic fluid is made to flow into the inflow port 85 for the shuttle valves 42 and 43 on the piston 48 side via the line 82 on the body 47 side. As a result, the balls 42a and 43a in the shuttle valves 42 and 43 are actuated in the same manner. Thus pilot hydraulic fluid is made to flow out to the outflow ports 55 and 57 of the shuttle valves 42 and 43 (cf. FIG. 10(a)).

The pilot hydraulic fluid made to flow out to the outflow port 55 of the shuttle valve 42 is made to flow into the line 56 on the body 47 side via the cutout 55a on the piston 48 side. Thus the pilot hydraulic fluid passes through the line 56 and is made to flow out from the output port E2. The pilot hydraulic fluid made to flow out to the outflow port 57 of the shuttle valve 43 is made to flow into the line 59 on the body 47 side via the cutout 57a on the piston 48 side. Thus the pilot hydraulic fluid passes through the line 59 and is made to flow out from the output port E3 (cf FIG. 10(c)).

The pilot hydraulic fluid portions made to flow out from the output ports E2 and E3 of the pattern switching valve 40 are applied, respectively, to the forward position pilot port 31F of the left running body control valve 31 and the backward position pilot port 32R of the right running body control valve 32. As a result, the left and right running bodies 36 and 38 are actuated, at the same speed, in the forward direction F and in the backward direction R, respectively, and the vehicle makes a right turn (right spin turn).

When the left operation lever 6L is operated in the left direction, the pilot hydraulic fluid output from the pilot line 14 is made to flow into the input port I4 on the pattern switching valve 40. Thus the pilot hydraulic fluid is made to flow into the inflow port 87 for the shuttle valves 44 and 41 on the piston 48 side via the line 84 on the body 47 side. As a result, the balls 44a and 41a in the shuttle valves 44 and 41 are actuated in the same way. Thus the pilot hydraulic fluid is made to flow out to the outflow ports 58 and 53 of the shuttle valves 44 and 41 (cf FIG. 10(a)).

The pilot hydraulic fluid made to flow out to the outflow port 58 of the shuttle valve 44 is made to flow into the line 60 on the body 47 side via the cutout 58a on the piston 48 side. Thus the pilot hydraulic fluid passes through the line 60 and is made to flow out from the output port E4. The pilot hydraulic fluid made to flow out to the outflow port 53 of the shuttle valve 41 is made to flow into the line 54 on the body 47 side via the cutout 53a on the piston 48 side. Thus the pilot hydraulic fluid passes through the line 54 and is made to flow out from the output port E1 (cf FIG. 10(c)).

The pilot hydraulic fluid portions made to flow out from the output ports E4 and E1 of the pattern switching valve 40 are applied, respectively, to the backward position pilot port 31R of the left running body control valve 31 and to the forward position pilot port 31F of the right running body control valve 32. As a result, the left and right running bodies 36 and 38 are actuated, at the same speed, in the backward direction R and in the forward direction F, respectively, and the vehicle makes a left turn (left spin turn).

When, on the other hand, the right operation lever 6R is operated in the forward direction, the pilot hydraulic fluid output from the pilot line 15 is made to flow into the input port I5 of the pattern switching valve 40. Thus the pilot hydraulic fluid is made to flow into the line 63 on the body 47 side via the cutout 62 on the piston 48 side. Thus the pilot hydraulic fluid passes through the line 63 and is made to flow out from the output port E5 (cf FIG. 10(b)).

The pilot pressure made to flow out from the output port E5 of the pattern switching valve 40 is applied to the boom down position pilot port 72a of the boom control valve 72. As a result, the boom is actuated toward the down position.

When the right operation lever 6R is operated in the back direction, the pilot hydraulic fluid output from the pilot line 16 is made to flow into the input port I6 of the pattern switching valve 40. Thus the pilot hydraulic fluid is made to flow into the line 66 on the body 47 side via the line 64 on the body 47 side and the cutout 65 on the piston 48 side. Thus the pilot hydraulic fluid passes through the line 66 and is made to flow out from the output port E6 (cf FIG. 10(b)).

The pilot hydraulic fluid made to flow out from the output port E6 of the pattern switching valve 40 is applied to the boom up position pilot port 72b of the boom control valve 72. As a result, the boom is actuated toward the up position.

The action when the right operation lever 6R is operated in the right and left directions is the same as described with FIG. 1 and so is not described further here.

A description is given next for the case where the pattern switching lever 46 is operated in the A2 direction.

In FIG. 11(a) is diagrammed the A-A section in FIG. 8, in FIG. 11(b) the B-B section in FIG. 8, and in FIG. 11(c) the C-C section in FIG. 8. The sections diagrammed in FIG. 11 are for the case where the second operation pattern S2 has been switched to.

When the pattern switching lever 46 is operated in the A2 direction, the relative rotational position of the piston 48 with respect to the body 47 is altered, and the second operation pattern S2 switch position indicated in FIG. 11 is switched to. When that is the case, as diagrammed in FIG. 11(a), the input ports I1 to I4 of the pattern switching valve 40 are in positions where they do not communicate with the shuttle valves 41 to 44.

When the left operation lever 6L is operated in the forward direction, the pilot hydraulic fluid output from the pilot line 11 is made to flow into the input port I1 of the pattern switching valve 40. Thus the pilot hydraulic fluid is made to flow into the line 56 on the body 47 side via the line 90 on the body 47 side and the cutout 55a on the piston 48 side. Thus the pilot hydraulic fluid passes through the line 56 and is made to flow out from the output port E2 (cf FIG. 11(c)).

The pilot hydraulic fluid made to flow out from the output port E2 of the pattern switching valve 40 acts on the forward position pilot port 31F of the left running body control valve 31. As a result, the left running body 36 is actuated in the forward direction F, and the vehicle moves forward to the left.

When the left operation lever 6L is operated in the back direction, the pilot hydraulic fluid output from the pilot line 12 is made to flow into the input port I2 of the pattern switching valve 40. Thus the pilot hydraulic fluid is made to flow into the line 60 on the body 47 side via the line 81 on the body 47 side and the cutout 58a on the piston 48 side. Thus the pilot hydraulic fluid passes through the line 60 and is made to flow out from the output port E4 (cf FIG. 11(c)).

The pilot hydraulic fluid made to flow out from the output port E4 of the pattern switching valve 40 acts on the backward position pilot port 31R of the left running body control valve 31. As a result, the left running body 36 is actuated in the backward direction R and the vehicle moves back and to the left.

When the left operation lever 6L is operated in the right direction, the pilot hydraulic fluid output from the pilot line 13 is made to flow into the input port I3 of the pattern switching valve 40. Thus the pilot hydraulic fluid is made to flow into the line 63 on the body 47 side via the line 67 on the body 47 side and the cutout 62 on the piston 48 side.

Thus the pilot hydraulic fluid passes through the line 63 and is made to flow out from the output port E5 (cf. FIG. 11(b)).

The pilot hydraulic fluid made to flow out from the output port E5 of the pattern switching valve 40 is applied to the boom down position pilot port 72a of the boom control valve 72. As a result, the boom is actuated toward the down position.

When the left operation lever 6L is operated in the left direction, the pilot hydraulic fluid output from the pilot line 14 is made to flow into the input port I4 of the pattern switching valve 40. Thus the pilot hydraulic fluid is made to flow into the line 66 on the body 47 side via the cutout 64 on the piston 48 side. Thus the pilot hydraulic fluid passes through the line 66 and is made to flow out from the output port E6 (cf FIG. 11(b)).

The pilot hydraulic fluid made to flow out from the output port E6 of the pattern switching valve 40 is applied to the boom up position pilot port 72b of the boom control valve 72. As a result, the boom is actuated toward the up position.

When, on the other hand, the right operation lever 6R is operated in the forward direction, the pilot hydraulic fluid output from the pilot line 15 is made to flow into the input port I5 of the pattern switching valve 40. Thus the pilot hydraulic fluid is made to flow into the line 54 on the body 47 side via the line 88 on the piston 48 side and the cutout 53a on the piston 48 side. Thus the pilot hydraulic fluid passes through the line 54 and is made to flow out from the output port E1 (cf FIGS. 11(b) and 11(c)).

The pilot hydraulic fluid made to flow out from the output port E1 of the pattern switching valve 40 acts on the forward position pilot port 32F of the right running body control valve 32. As a result, the right running body 38 is actuated in the forward direction F and the vehicle moves ahead and to the right.

When the right operation lever 6R is operated in the back direction, the pilot hydraulic fluid output from the pilot line 16 is made to flow into the input port I6 of the pattern switching valve 40. Thus the pilot hydraulic fluid is made to flow into the line 59 on the body 47 side via the line 64 on the body 47 side, the line 89 on the piston 48 side, and the cutout 57 on the piston 48 side. Thus the pilot hydraulic fluid passes through the line 59 and is made to flow out from the output port E3 (cf. FIGS. 11(b) and 11(c)).

The pilot hydraulic fluid made to flow from the output port E3 of the pattern switching valve 40 acts on the backward position pilot port 32R of the right running body control valve 32. As a result, the right running body 38 is actuated in the backward direction R and the vehicle moves back and to the right.

The action induced by operating the right operation lever 6R in the right and left directions is the same as was described with FIG. 2 and so is not described further here.

Based on the pattern switching valve 40 diagrammed in FIGS. 6 to 11 and described in the foregoing, switching can be done between a first operation pattern S1 and a second operation pattern S2 merely by the simple operation of altering the relative position of the piston 48 with respect to the body 47.

The piston 48 is not limited to a cylindrical shape, moreover, and may be made any shape so long as the relative position with respect to the body 47 can be altered.

If the piston 48 is made cylindrical, then switching the operation pattern can be done with only the simpler operation of rotating the piston 48. The structure of the pattern switching valve 40 can also be simplified.

Based on the pattern switching valve 40 diagrammed in FIGS. 6 to 11, furthermore, input ports I1, I2, I3, I4, I5, and I6, and output ports E1, E2, E3, E4, E5, and E6 are deployed on the body 47 side, and the piston 48 side is rotationally actuated. Therefore, the problem of the lines (hydraulic lines 11, 12, 13, and 14, etc.) that are connected to the input ports I1 to I6 and to the output ports E1 to E6 becoming twisted does not occur even if the piston 48 is rotationally actuated.

The present invention may also be configured such that the input ports I1 to I6 and the output ports E1 to E6 are deployed on the piston 48 side and the body 47 side is rotationally actuated.

The configuration may also be such that the input ports I1 to I6 are deployed on the body 47 side and the output ports E1 to E6 are deployed on the piston 48 side. Or the input ports I1 to I6 may be deployed on the piston 48 side and the output ports E1 to E6 deployed on the body 47 side.

In the present invention, the lines 17 and 18 are connected directly to the bucket 73. This may be configured as a valve so that the relative position is not changed when the pattern switching valve 40 is switched.

Embodiment aspects of the operation lever apparatus relating to the present invention are now described. In these embodiment aspects, it is assumed that an actuator drive apparatus is mounted in the vehicle and that vehicle running is drive-controlled by operating an operation lever.

Figure 15A:
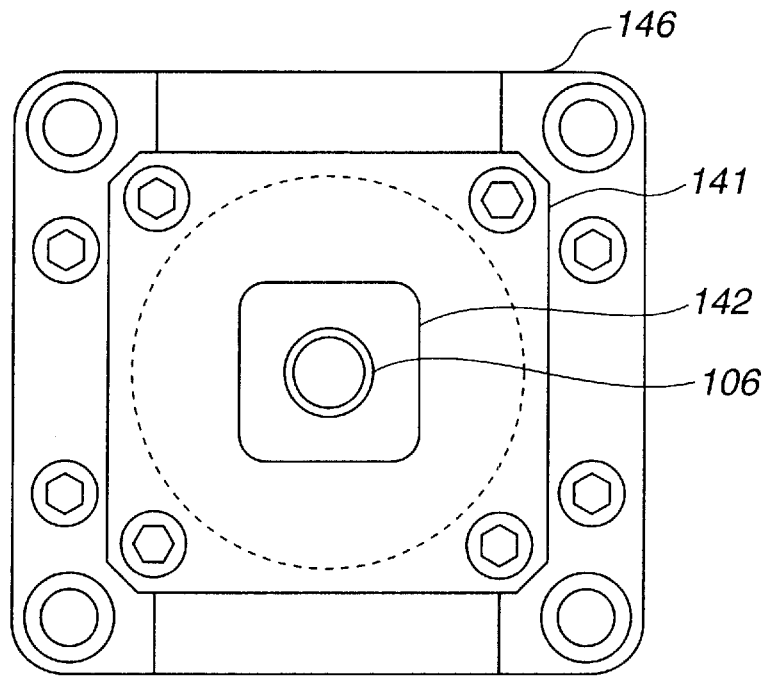
FIGS. 15(*a*) and 15(*b*) are configuration diagrams for an operation lever apparatus in a first embodiment aspect.
Figure 15B:
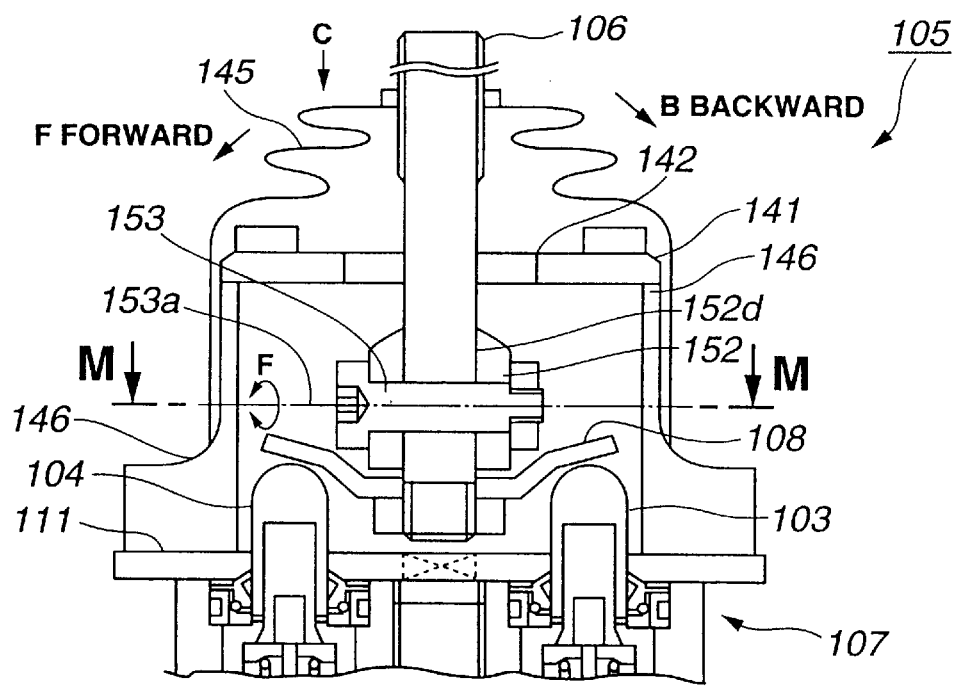
Figure 16A:
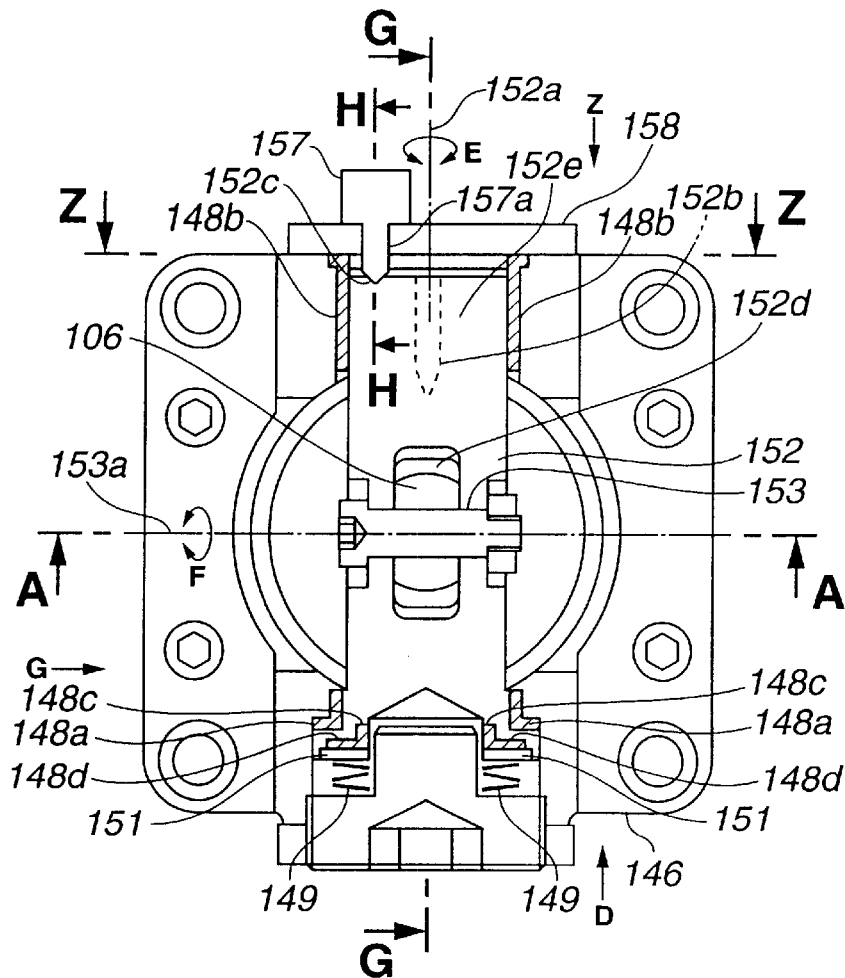
FIGS. 16(*a*), 16(*b*), and 16(*c*) are configuration diagrams for the operation lever apparatus in the first embodiment aspect.
Figure 16C:
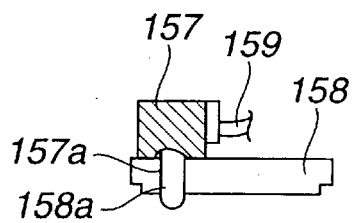
Figure 16B:
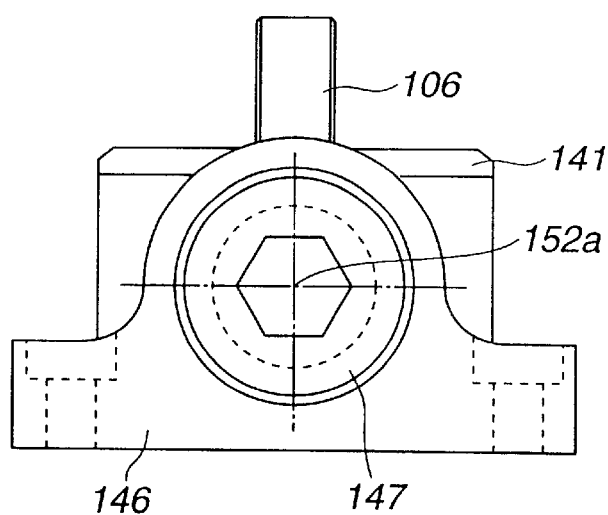

The configuration of an operation lever apparatus 105 in a first embodiment aspect is diagrammed in FIGS. 15, 16, and 17. FIG. 15(*a*) is an upper surface diagram which looks at FIG. 15(*b*) from the direction of the arrow C. FIG. 15(*b*) is a diagram of the A-A section in FIG. 16(*a*). FIG. 15(*b*) is a section that looks to FIG. 21(*a*) from the left.

As diagrammed in FIG. 15, the operation lever apparatus 105 is configured mainly of a main apparatus body 107 and an operation lever 106. The operation lever 106 can be tilted in relation to the main apparatus body 107. The operation lever 106 is attached to the main apparatus body 107 via support shafts 152 and 153 acting as a universal coupling, and a disk plate 108.

Figures 26A, 26B:
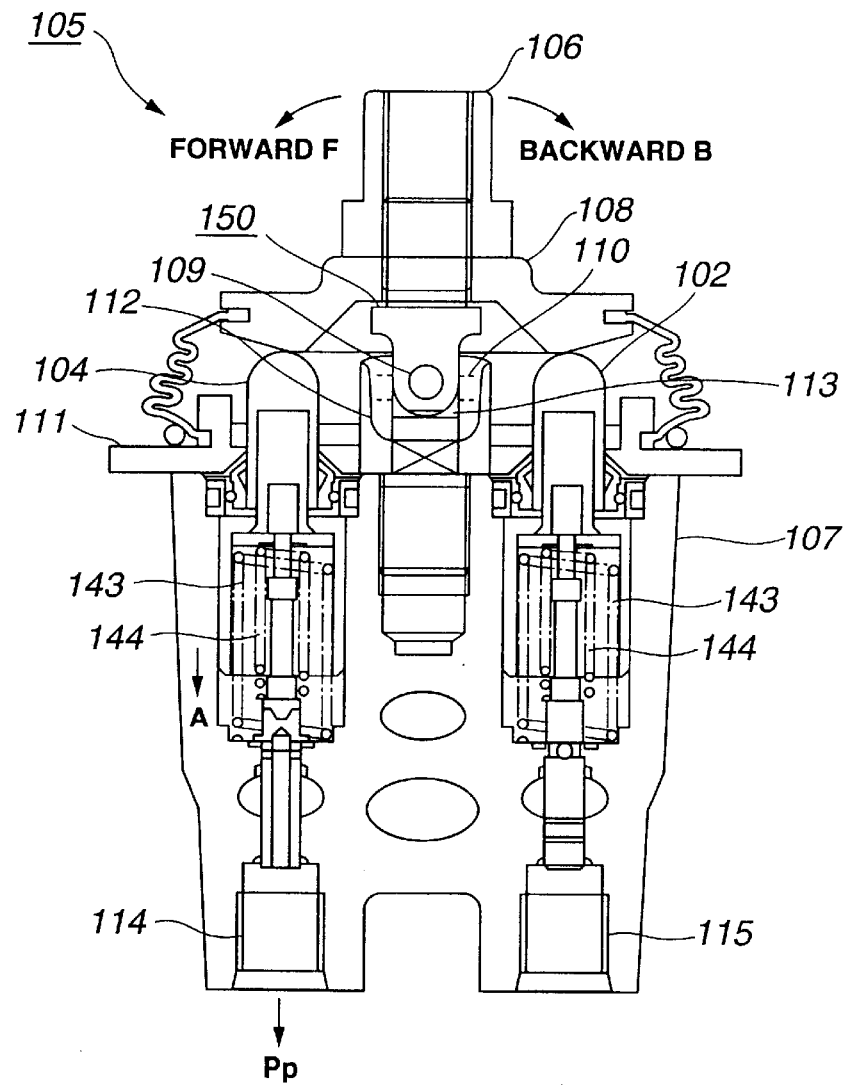
FIG. 26(*a*) is a cross-sectional view representing the configuration of a conventional operation lever apparatus, while FIG. 26(*b*) is a diagonal view of the configuration of the universal coupling diagrammed in FIG. 26(*a*)

What is different from the operation lever apparatus 105 diagrammed in FIG. 26 is that the support shaft 152 that is the axis of turning in the forward and backward direction is made to produce a sliding resistance. The configurational differences are described below.

Figure 21A:
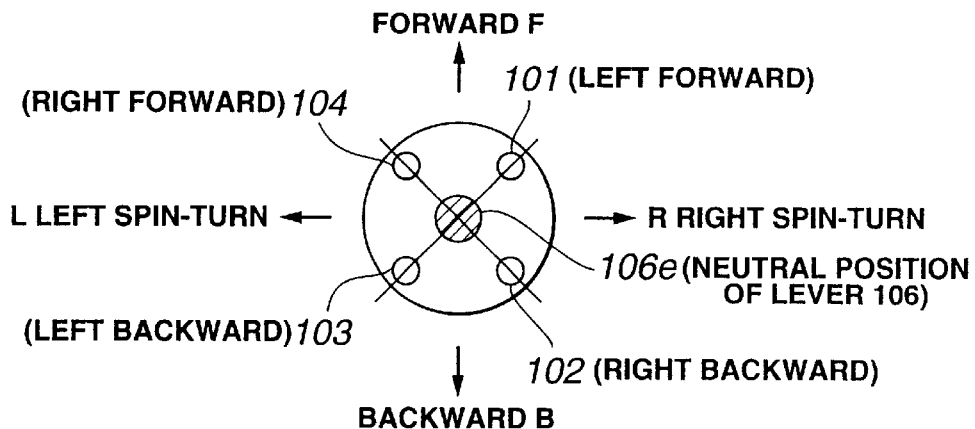
FIGS. 21(*a*) and 21(*b*) are diagrams for describing operation lever movements.
Figure 21B:
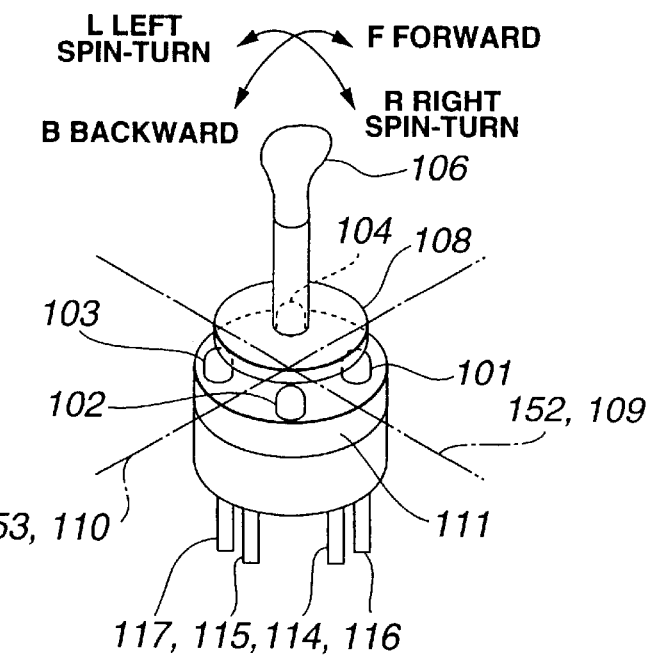
Figure 27A:
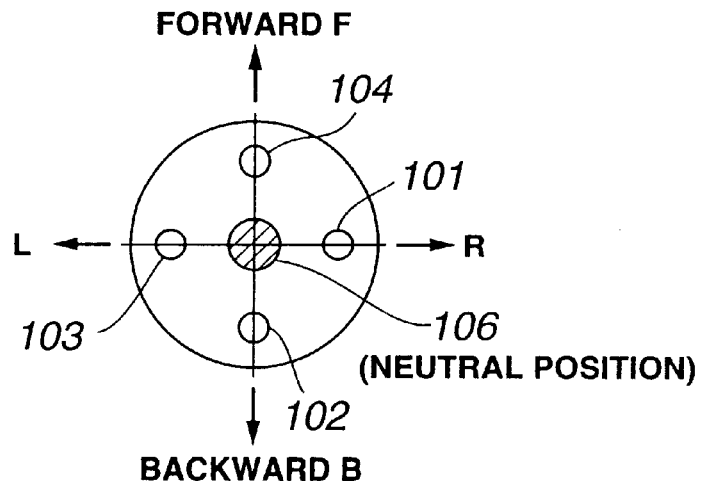
FIGS. 27(*a*) and 27(*b*) are diagrams for describing the movements of a conventional operation lever.
Figure 27B:
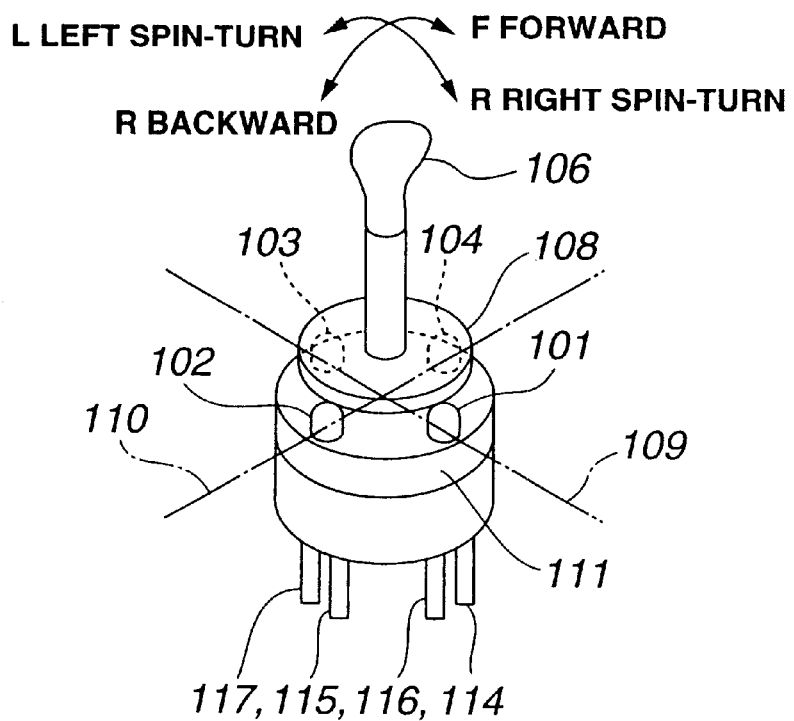

FIGS. 21(*a*) and 21(*b*) for this embodiment aspect correspond to FIG. 27(*a*) and 27(*b*) for the prior art.

Four pistons 101, 102, 103, and 104 are deployed so that the piston tips (upper ends) protrude from an attachment plate 111. The pistons 101, 102, 103, and 104 are arranged so that they are shifted by a 45° angle in relation to the support shafts 152 and 153 that correspond to the support shafts 109 and 110 diagrammed in FIG. 27(*b*), as seen from a lever fulcrum 106. It is to be noted that the quadrangle formed by the pistons 101, 102, 103, and 104 need not be a perfect square. Piston 101 is deployed at the upper right position, piston 102 at the lower right position, piston 103 at the lower left position, and piston 104 at the upper left position.

A casing 146 is attached to the attachment plate 111 of the main apparatus body 107, as diagrammed in FIG. 15. Inside this casing 146 are deployed the disk plate 108 and the support shafts 152 and 153.

At the upper end of the casing 146 is provided a guide member 141 for restricting the tilting of the operation lever 106. In the guide member 141 is formed a square guide 142.

The operation lever 106 communicates with the guide 142 of the guide member 141. A lever shaft between the disk plate 108 and the knob of the operation lever 106 is able to strike the guide 142. Thus by tilting the operation lever 106 in the forward direction F, for example, causing it to strike the guide 142, and moving the operation lever 106 along the guide 142, an operation feeling of the lever tip moving exactly laterally can be elicited.

Figure 20:
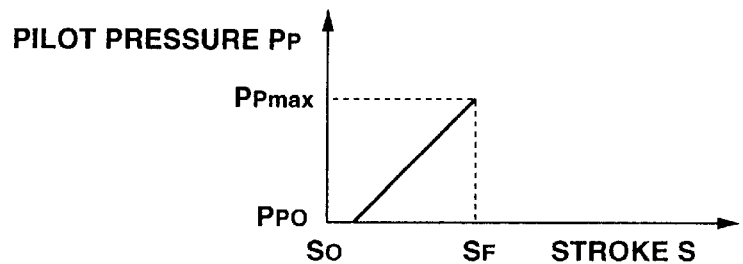
FIG. 20 is a diagram representing the relationship between operation lever stroke and hydraulic signals.

When the operation lever 106 has been tilted until it strikes the guide 142, a displacement signal Ppmax for the maximum output Ppmax is output from the operation lever 105, as diagrammed in FIG. 20.

Furthermore, a cover 145 diagrammed in FIG. 15(*b*) is attached so as to cover the guide 142 so that dust and other foreign matter do not penetrate into the interior of the casing 146 from the outside, via the guide 142.

FIG. 16(*a*) is a diagram of the M-M section in FIG. 15(*b*). FIG. 16(*b*) is a side elevation looking at FIG. 16(*b*) from the direction of the arrow D. And FIG. 16(*c*) is a diagram of the H-H section in FIG. 16(*a*).

In the casing 146, as diagrammed in FIG. 16(*a*), are deployed sliding members 148*a* and 148*b* in a configuration such that they cover portions of the cylindrical surface 152*e* on the outer circumference of the support shaft 152 that is roughly shaped as a round column. The support shaft 152 is a forward and backward directional component turning shaft that turns in response to the tilting of the operation lever 106 in the forward and backward directional component F and B. The support shaft 152 is deployed in the casing 146 so that it can freely turn about a turning center that is the center axis 152*a* thereof. Accordingly, when the operation lever 106 is tilted in the forward and backward component F and B and the support shaft 152 turns about the center axis 152*a* thereof as the center of turning, as indicated by the arrow E (forward and backward direction F and B), a sliding resistance is generated between the sliding surface of the sliding member 148 and the outer circumferential surface of the support shaft that is in contact with that sliding surface. The friction force resulting from that sliding resistance is applied to the operation lever 106. The friction force applied to the operation lever 106 acts in a direction opposite to that of the restoring turning forces produced by the return springs 143 and 144 which are applied to the same operation lever 106, whereupon the operation lever 106 stops at a prescribed tilted position. Thus the operation lever 106 is held in that prescribed tilted position.

An opening 152*d* is formed in the center of the support shaft 152. The operation lever 106 is passed through this opening 152*d*. Thus the operation lever 106 will have its movement about the center axis 152*a* restricted and will also be able to move about an axis that is perpendicular to the center axis 152*a*.

In the support shaft 152 is deployed a support shaft 153, perpendicular to the support shaft 152, so that it can freely turn about the center axis 153*a* as a center of turning. The support shaft 153 supports the operation lever 106. Thus the support shaft 153 functions as a left and right directional component turning axis that turns in response to tilting of the operation lever 106 in the left and right directional component L and R.

One end of a coil spring 149 comes up against one end surface of the support shaft 152 through the sliding member 148*c* and a shim 151. The spring used here may be of some type other than the coil spring 149. The other end of the spring 149 comes up against an adjustment bolt 147 provided in the casing 146. Accordingly, when the head of the adjustment bolt 147 is turned and the screwing position thereof in relation to the casing 146 is adjusted, the spring force applied to the sliding member 148c by the spring 149 is varied. Thus the force wherewith the sliding member 148c presses against the support shaft 152 varies. As a consequence, the sliding resistance produced between the sliding surface 148d of the sliding member 148c and the outer circumferential surface of the support shaft 152 in contact with that sliding surface 148d also varies. Thus the holding force wherewith the operation lever 106 is held in a tilted position also varies.

In the end surface of the support shaft 152 opposite the end surface on the side acted on by the spring 149 is formed a slot 152c for detecting the neutral position. To the casing 146, meanwhile, a side plate 158 is attached, which side plate 158 is provided with a neutral position detection switch 157 as neutral position signal generation means. In that neutral position detection switch 157 is provided a rod 157a that can freely extend and retract via a spring or the like.

As diagrammed in FIG. 16(c), the rod 157a is inserted into a hole 158a in the side plate 158. When the operation lever 106 is positioned in the neutral position, the tip of the rod 157a of the neutral position detection switch 157 slides into the slot 152c formed in the support shaft 152.

When the operation lever 106 is positioned in the neutral position, and the tip of the rod 157a of the neutral position detection switch 157 is mated in the slot 152c formed in the support shaft 152, the rod 157a extends. When the rod 157a extends, an electrical signal indicating that the operation lever 106 is in the neutral position is output over an electrical signal line 159 from the neutral position detection switch 157.

Figure 17A:
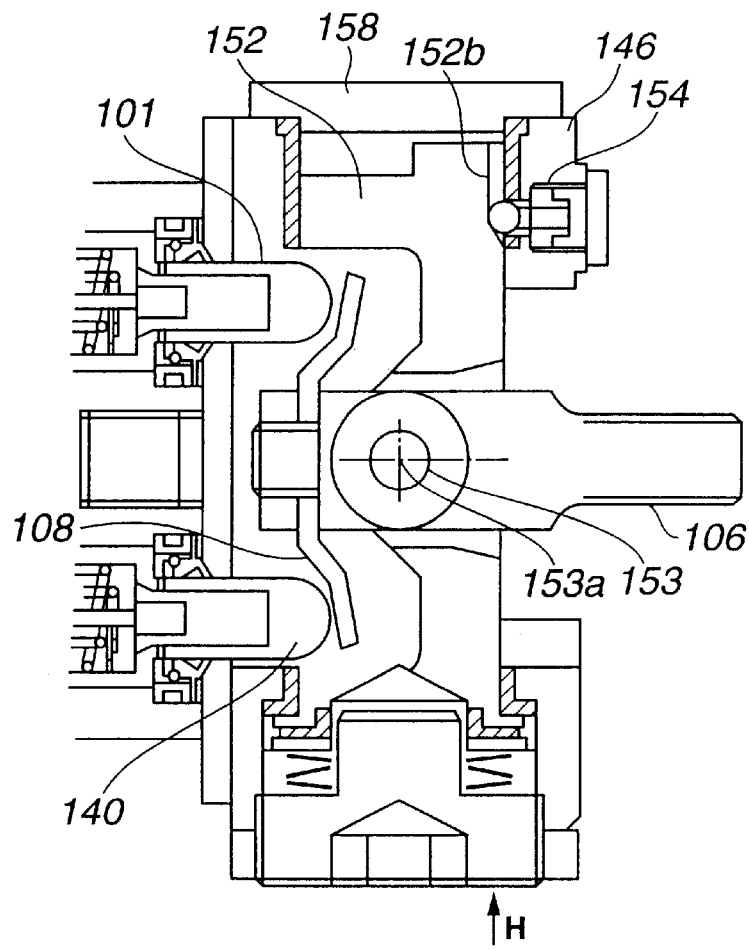
FIGS. 17(*a*) and 17(*b*) are configuration diagrams for the operation lever apparatus in the first embodiment aspect.
Figure 17B:
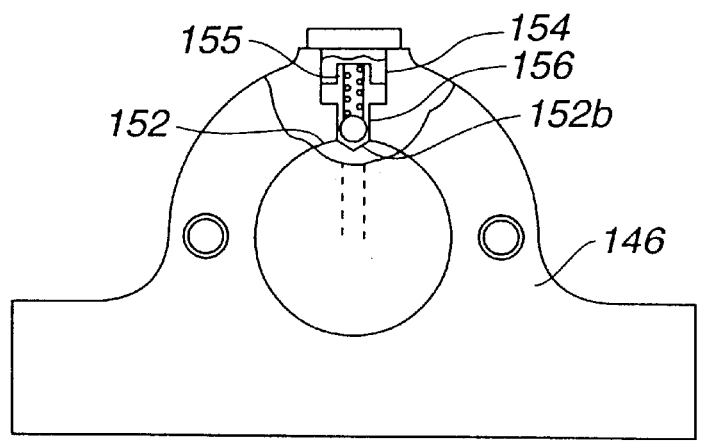

FIG. 17(a) is a diagram of the G-G section in FIG. 16(a). FIG. 17(b) is a diagram of a view of FIG. 16(a) looking from the direction of the arrow Z.

In the cylindrical surface 152e of the support shaft 152 is formed a slot 152b for sensing the neutral position, as diagrammed in FIG. 17(b). Meanwhile, a neutral position sensing mechanism 154 is deployed as operation force-varying means in the casing 146. In this neutral position sensing mechanism 154 is deployed a ball 156 that comes up against the cylindrical surface 152e of the support shaft 152. This ball 156 is pushed against the cylindrical surface 152e by the spring force of a spring 155.

When the operation lever 106 is positioned in the neutral position, the spring 155 extends, the ball 156 is pushed by the spring force, and the ball 156 slides into the slot 152b. When the operation lever 106 is operated to a position other than the neutral position, the spring 155 contracts, and the ball 156 slide out from the slot 152b. Therefore, in order to operate the operation lever 106 from the neutral position to a position other than the neutral position, it is necessary to move the operation lever 106, applying an operating force strong enough to cause the spring 155 to contract. Thus, when the operation lever 106 is operated to the neutral position, the operator can be made to sense that "the operation lever 106 is positioned in the neutral position."

As diagrammed in FIG. 21, the tips (upper ends) of the pistons 101, 102, 103, and 104 strike the lower surface of the disk plate 108 to which the operation lever 106 is attached. When the operation lever 106 is tilted, the disk plate 108 tilts in a tilting direction that corresponds to the tilting direction of the operation lever 106, and tilts by an amount of tilting that corresponds to the amount by which the operation lever 106 is tilted. Of the pistons 101, 102, 103, and 104, one or more pistons corresponding to the direction in which the disk plate 108 is tilted will be displaced, by an amount of displacement corresponding to the amount by which the disk plate 108 is tilted.

Accordingly, the pistons 101, 102, 103, and 104 will be displaced according to the direction in which and amount by which the operation lever 106 is tilted.

In the main apparatus body 107, furthermore, are deployed hydraulic signal generation means for generating hydraulic signals of sizes corresponding to piston displacement, for each of the four pistons 104, 102, 101, and 103, as in a conventional operation lever apparatus 105. The pistons 104, 102, 101, and 103 correspond, respectively, to the pilot lines 114, 115, 116, and 117 (cf. FIG. 21(b)).

The operation of the operation lever apparatus 105 described in the foregoing is now described.

In FIGS. 15, 16, and 17, the operation lever 106 is in the neutral position. Let it be assumed now that the operation lever 106 is operated from that condition so as to tilt in any tilting direction.

When the operation lever 106 is operated so as to tilt, the support shaft 152 will turn about the axis 152a, as indicated by the arrow E, by an amount of turning that corresponds to the forward and backward direction F or B component in the tilt direction. And the support shaft 153 will turn about the axis 153a, as indicated by the arrow F, by an amount of turning that corresponds to the left and right direction L or R component in the tilt direction.

Let it be assumed that the operator now releases his or her hand from the operation lever 106. The friction forces of the sliding members 148a, 148b, and 148c will act in directions opposite to the restoring turning forces of the return springs 143 and 144, wherefore the support shaft 152 will stop at the point in time where release occurred.

Meanwhile, at the point in time where the operation lever 106 was released by the operator's hand, the support shaft 153 will turn due to the restoring turning force of the return springs 143 and 144.

Thus, at the point in time where the operator released the operation lever 106, the forward and backward direction F or B component in the direction of tilt will be held in the tilted position in effect at the point in time of operator release, and the left and right direction L or R component in the direction of tilt will be restored to the neutral position. Consequently, the piston for the forward and backward direction F or B component will remain displaced, and the hydraulic signal output will be held. Meanwhile, the displacement of the piston for the left and right direction L or R component will return to 0, and the hydraulic signal will become 0.

Let it next be assumed that the operator has operated the operation lever 106 by hand to restore the forward and backward direction F or B component in the direction of tilt to the neutral position. At that time, the tip of the rod 157a of the neutral position detection switch 157 will slide into the slot 152c formed in the support shaft 152. Thus the rod 157a will extend. When the rod 157a extends, an electrical signal indicating that the operation lever 106 is in the neutral position is output from the neutral position detection switch 157 over the electrical signal line 159. The spring 155 in the neutral position sensing mechanism 154 will also extend, the ball 156 will be pushed by the spring 155, and that ball 156 will slide into the slot 152b formed in the support shaft 152. When the operation lever 106 is operated from the neutral position to a position other than the neutral position, it is necessary to move the operation lever 106 by applying a force of operation sufficient to cause the spring 155 to contract. Therefore the operator can sense that the operation lever 106 "has been positioned in the neutral position."

A first embodiment aspect for the operation lever apparatus has been described in the foregoing.

Figure 18A:
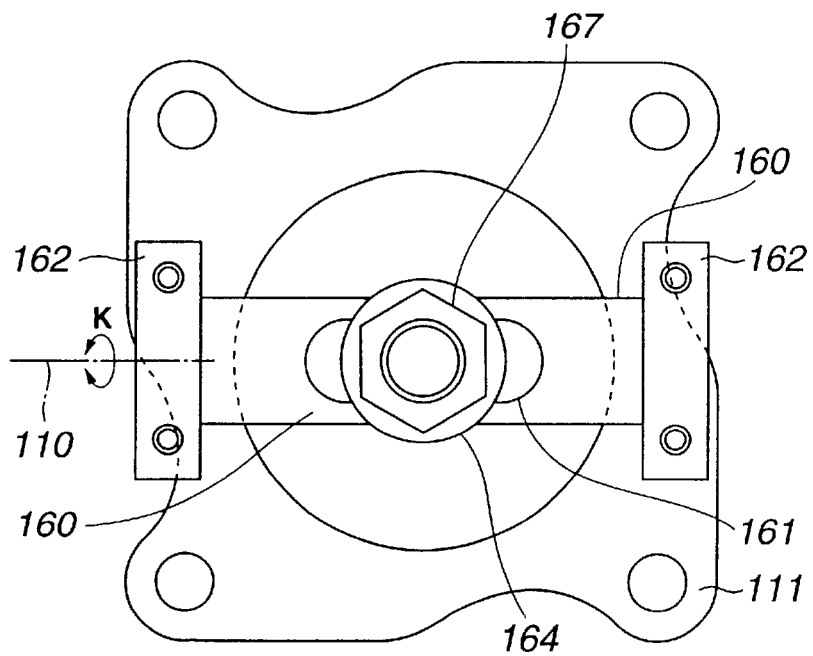
FIGS. 18(*a*) and 18(*b*) are configuration diagrams for an operation lever apparatus in a second embodiment aspect.
Figure 18B:
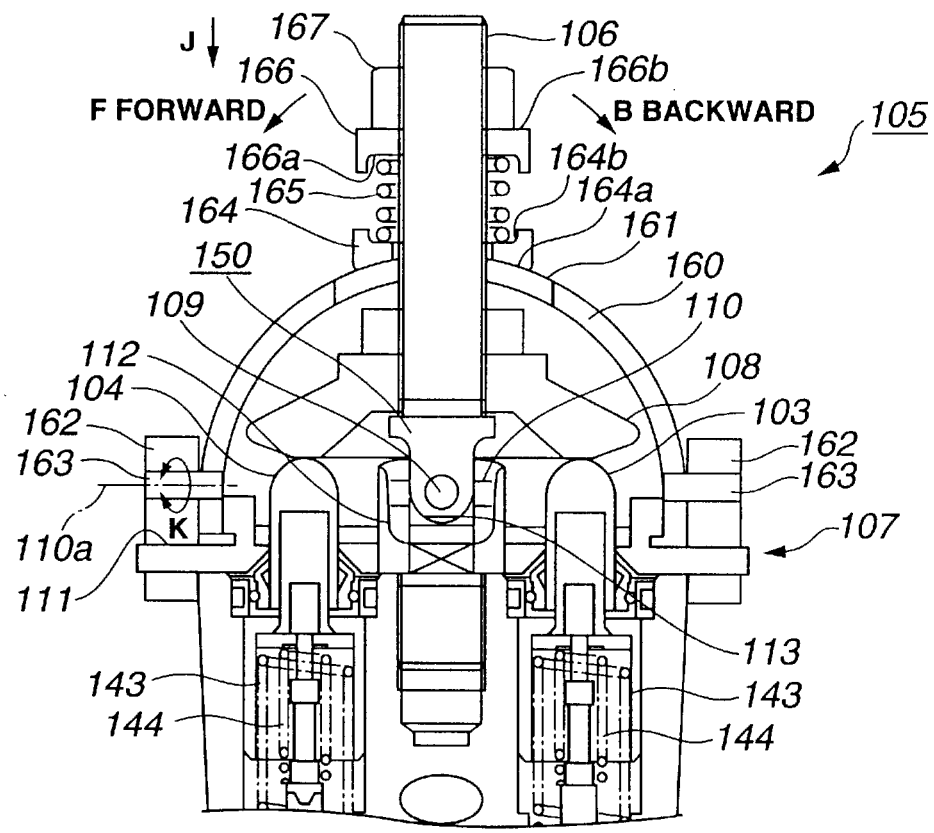

Next, a second embodiment aspect for the operation lever apparatus is described, with reference to FIG. 18 and FIG. 19. FIG. 18 is a diagram of the configuration of the operation lever apparatus in the second embodiment aspect.

FIG. 18(*a*) is an upper surface diagram looking at FIG. 18(*b*) from the direction of the arrow J. FIG. 18(*b*) is a diagram of a section corresponding to FIG. 15(*b*) for the first embodiment aspect.

As diagrammed in FIG. 18, the operation lever apparatus 105 is configured mainly by a main apparatus body 107 and an operation lever 106. The operation lever 106 can be tilted in relation to the main apparatus body 107: The operation lever 106 is attached to the main apparatus body 107 by a universal coupling 150 and a disk plate 108.

What is different from the operation lever 105 diagrammed in FIG. 26 is that a sliding resistance is produced when the operation lever 106 is operated with a forward and backward direction F or R component.

Concerning the fact of the angle by which the operation lever 106 is attached to the attachment plate 111 of the main apparatus body 107 being modified, this is the same as was described in conjunction with FIGS. 21(*a*) and 21(*b*), and so is not further described here. FIG. 18(*b*) is a section looking at FIG. 21(*a*) from the left.

The configurational differences are described below. Support members 162 are attached to both ends, respectively, of the attachment plate 111 of the main apparatus body 107. These two support members 162 are attached along the center axis 110*a* of a support shaft 110. Pins 163 are inserted into the two support members 162, respectively, so that they can freely turn. The pins 163 are able to turn about a center of turning that is the center axis 110*a* of the support shaft 110.

A bow-shaped member 160 is made by forming plate material into a bow shape. To either end of the bow-shaped member 160 are secured pins 163, respectively. Thus the bow-shaped member 160 is able to swing about a center of turning that is the center axis 110*a* of the support shaft 110, in a direction perpendicular to the plane of the diagram, as indicated by the arrow K.

In the upper segment of the bow-shaped member 160 is formed an oval opening 161, with the long dimension thereof aligned in the longitudinal dimension of the bow-shaped member 160.

The operation lever 106 is passed through that opening 161. The operation lever 106 can swing in relation to the bow-shaped member 160, along the longitudinal dimension of the bow-shaped member 160. That is, the operation lever 106 can move about the center axis of the support shaft 109 that is perpendicular to the center axis 110*a*. On the other hand, however, the operation lever 106 cannot swing in relation to the bow-shaped member 160 in a direction perpendicular to the longitudinal dimension of the bow-shaped member 160. That is, the operation lever 106 has its motion about the center axis 110*a* corner restricted by the opening 161.

A sliding member 164 is attached to the operation lever 106. The sliding member 164 is screwed to the operation lever 106. A sliding surface 164a of the sliding member 164 makes contact with the sliding surface 160*a* of the bow-shaped member 160.

Accordingly, when the operation lever 106 moves along the longitudinal dimension of the opening 161, and swings relatively with respect to the bow-shaped member 160, a sliding resistance is produced between the sliding surface 164*a* of the sliding member 164 and the sliding surface 160*a* of the bow-shaped member 160 that is in contact with that sliding surface 164*a*. The friction force caused by that sliding resistance is applied to the operation lever 106 via the sliding member 164. This friction force applied to the operation lever 106 acts on the opposite side as does the restoring turning forces produced by the return springs 143 and 144 acting on the operation lever 106, wherefore the operation lever 106 stops at a prescribed tilted position. Thus the operation lever 106 is held in that prescribed tilted position.

One end of a spring 165 comes up against the seating surface 164*a* at the opposite end of the sliding member 164 from the sliding surface 164*a*. The other end of this spring 165 comes up against a spring seat 166 that is screwed to the operation lever 106. The surface 166*b* of the spring seat 166 opposite the surface 166*a* against which the spring 165 comes up against in turn comes up against a nut 167 that is screwed to the operation lever 106. This nut 167 functions as a lock nut for securing the spring seat 166 to the operation lever 106. Accordingly, when the head of the nut 167 is turned, the secured state of the spring seat 166 is released. Thus the position wherein the spring seat 166 is screwed to the operation lever 106 can be adjusted. When the position wherein the spring seat 166 is screwed is adjusted, the spring 165 extends or contracts according to the adjustment position, and the spring force exerted on the sliding member 164 by the spring 165 changes. Thus the pressing force by which the sliding member 164 presses against the bow-shaped member 160 also changes. As a consequence, the sliding resistance produced between the sliding surface 164*a* of the sliding member 164 and the sliding surface 160*a* of the bow-shaped member 160 also changes. Thus the holding force by which the operation lever 106 is held in a tilted position also changes.

As diagrammed in FIG. 21, the tips (upper ends) of the pistons 101, 102, 103, and 104 strike the lower surface of the disk plate 108 to which the operation lever 106 is attached. When the operation lever 106 is tilted, the disk plate 108 also tilts, in a direction of tilt corresponding to the direction in which the operation lever 106 is tilted, and by an amount of tilt corresponding to the amount by which the operation lever 106 is tilted. Of the pistons 101, 102, 103, and 104, the piston or pistons corresponding to the direction in which the disk plate 108 tilts will be displaced, by an amount of displacement corresponding to the amount by which the disk plate 108 is tilted.

Accordingly, the pistons 101, 102, 103, and 104 are displaced according to the direction in which and amount by which the operation lever 106 is tilted.

In the main apparatus body 107 are provided hydraulic signal generation means for generating hydraulic signals of sizes corresponding to the displacements in each of the four pistons 104, 101, 102, and 103. The pistons 104, 102, 101, and 103 correspond to pilot lines 114, 115, 116, and 117, respectively (cf FIG. 21(*b*)).

The operation of the operation lever apparatus 105 described in the foregoing is now described.

Figure 19A:
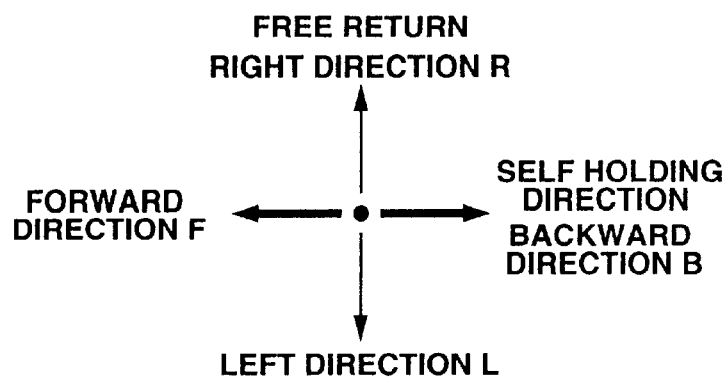
FIGS. 19(*a*) and 19(*b*) are diagrams for describing conditions wherein the operation lever diagrammed in FIG. 18 is operated.
Figure 19B:
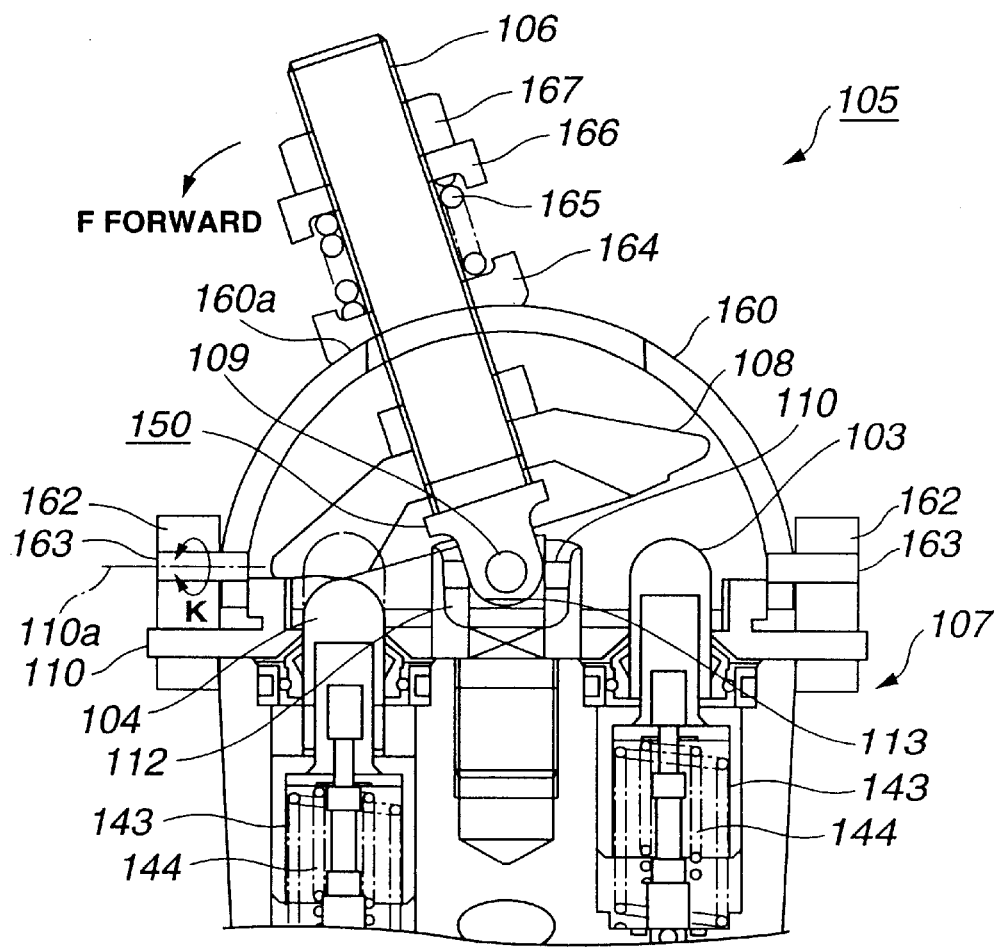

FIG. 18(*b*) shows the operation lever 106 in the neutral position. It is now assumed that from this position the operation lever 106 is tilted in any direction of tilt. This condition is diagrammed in FIG. 19(*b*). FIG. 19(*b*) is a diagram that diagrams the components in the tilting directions of the operation lever 106. The tilt directions parallel to the plane of the diagram in FIG. 19(b) correspond to the forward and backward direction F and B component in FIG. 19(a). The tilt directions perpendicular to the plane of the diagram in FIG. 19(b) correspond to the left and right direction L and R component in FIG. 19(a).

When the operation lever 106 is operated so as to tilt, the operation lever 106 swings along the opening 161 in the bow-shaped member 160, with the amount of such swing corresponding to the forward and backward direction F or B component in the tilt direction (the forward direction F component in FIG. 19(b)). The operation lever 106 will also swing about the center axis 110a, as indicated by the arrow K, with the bow-shaped member 160 becoming integral with the operation lever 106, by an amount of swing that corresponds with the left and right direction L or R component in the direction of swing.

Let it be assumed now that the operator has released his or her hold on the operation lever 106. The friction force caused by the sliding member 164 acts on the opposite side from the restoring turning force of the return springs 143 and 144, wherefore the sliding member 164 will stop on the bow-shaped member 160 at the point in time where the operators hold was released.

Meanwhile, at the point in time where the operator took his or hand from the operation lever 106, the bow-shaped member 160 will turn about the center axis 110a due to the restoring turning forces of the return springs 143 and 144.

Therefore, at the point in time where the operator took his or her hand from the operation lever 106, the forward and backward direction F or B component in the tilt direction will be held in the tilted position in effect at the point in time when release occurred, and the left and right direction L or R component in the tilt direction will be restored to the neutral position. As a consequence, the displacement in the piston for the forward and backward direction F or B component will be kept as it is, and output of the hydraulic signal will be held. Meanwhile, the displacement in the piston for the left and right direction L or R component will return to 0, and the hydraulic signal output will become 0.

A second embodiment aspect for the operation lever apparatus has been described in the foregoing.

Next, cases are described wherein actuators mounted in vehicles are actuated by the operation lever apparatus.

Figure 22A:
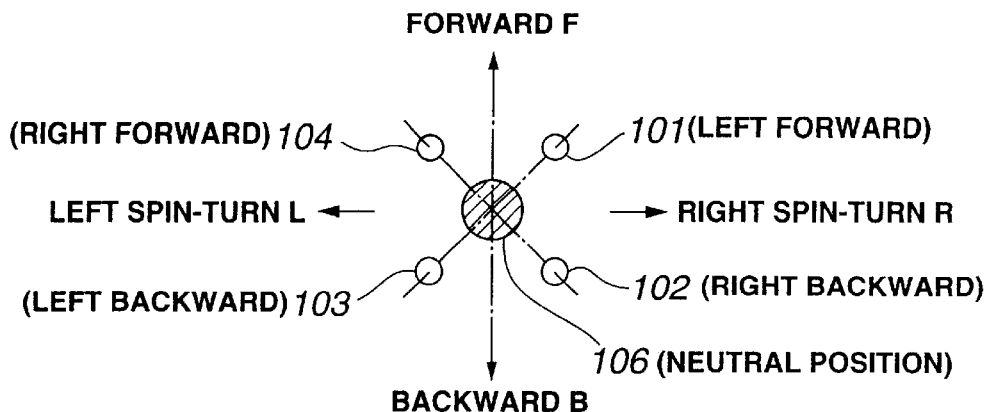
FIGS. 22(*a*) and 22(*b*) are diagrams of a hydraulic circuit in a vehicle carrying an operation lever apparatus relating to the present invention.
Figure 22B:
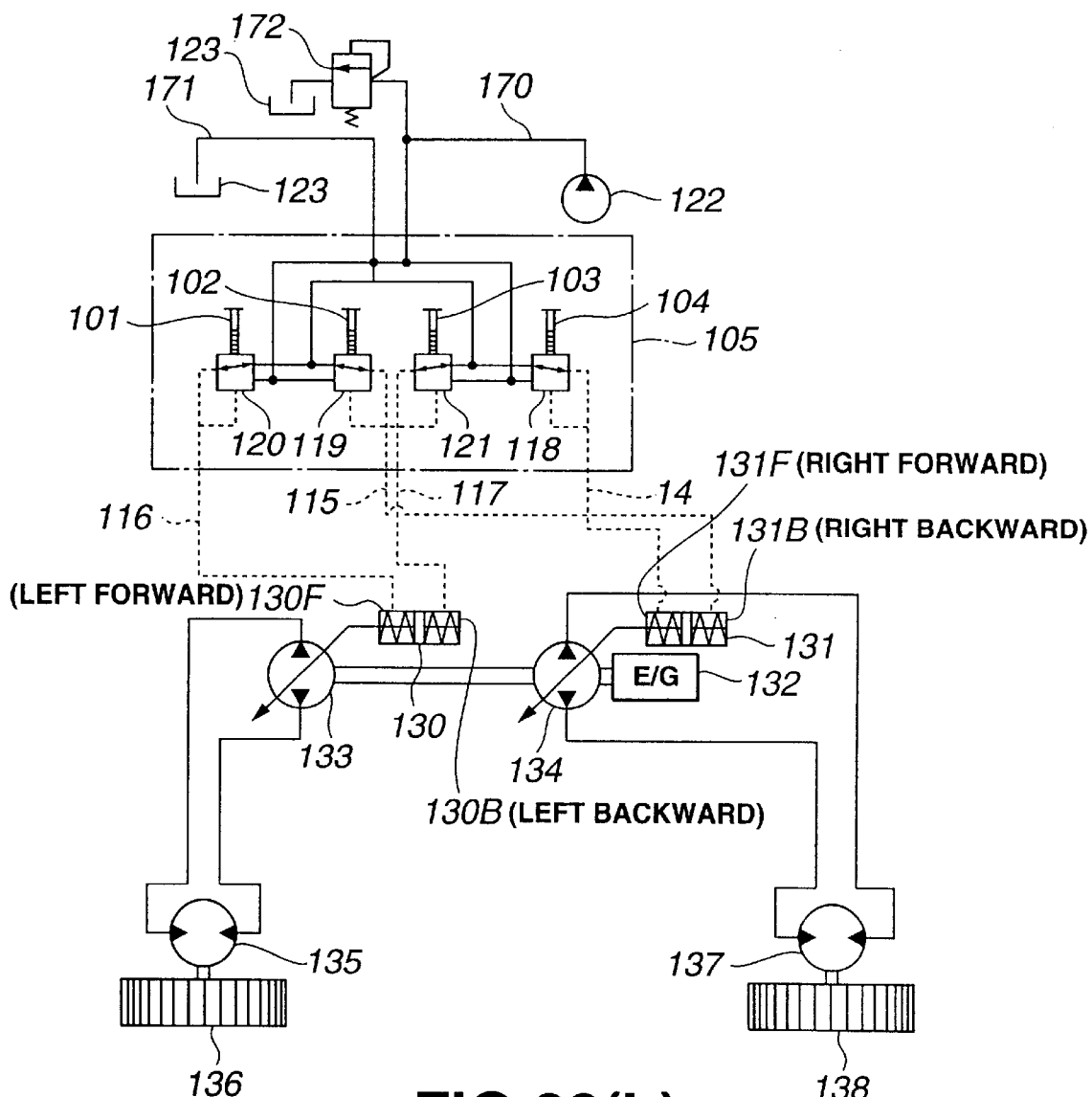

In FIG. 22(b), the operation lever apparatus 105 is diagrammed in a hydraulic circuit. FIG. 22(b) represents, by a hydraulic circuit, a first embodiment aspect of a hydraulic drive apparatus mounted in a vehicle such as a skid steer loader. FIG. 22(a) diagrams how the pistons 101, 102, 103, and 104 are deployed in the operation lever apparatus 105.

As diagrammed in FIG. 22(b), pilot pressures are supplied to the operation lever apparatus 105 from an operation lever pump 122. A tank 123 is connected to the operation lever apparatus 105. The operation lever pump 122 is driven by an engine 132.

The pistons 101, 102, 103, and 104 are provided with pressure reducing valves 120, 119, 121, and 118, respectively. That is, the set pressures of the pressure reducing valves 120, 119, 121, and 118 are made larger by the depression of the pistons 101, 102, 103, and 104, respectively.

Input ports of the pressure reducing valves 120, 119, 121, and 118 are respectively connected by a line 170 to the operation lever pump 122. To that line 170 is connected a relief valve 172 for restricting the pressure of the hydraulic fluid discharged into that line 170 from the operation lever pump 122 to or below a set relief pressure. The input ports of the pressure reducing valves 120, 119, 121, and 118 are also connected to the tank 123 by a line 171.

Output ports of the pressure reducing valves 120, 119, 121, and 118 are respectively connected to pilot lines 116, 115, 117, and 114.

The operation of the operation lever apparatus 105 is described next.

Let it be assumed that the operation lever 106 has been tilted in the forward direction F. When that is so, the pistons 101 and 104 are depressed by the disk plate 108.

The stroke S (displacement) of the pistons 101 and 104 will be of a size that corresponds to the amount by which the operation lever 106 is tilted.

When the piston 101 is depressed, the area of the opening in the pressure reducing valve 120 will become larger according to the stroke S thereof, and a pilot pressure corresponding to that opening area will be output to the pilot line 116. Accordingly, the pilot pressure Pp output from the pilot line 116 will be of a size that corresponds to the amount by which the operation lever 106 is tilted.

Similarly, when the piston 104 is depressed, the pilot pressure Pp output from the pilot line 114 will be of a size corresponding to the amount by which the operation lever 106 is tilted.

In FIG. 20 is plotted the relationship between the pilot pressure Pp and the stroke S of the operation lever 106. When the operation lever 106 is operated, and the pistons 101 and 104 are changed from a stroke position S0 corresponding to the neutral position to a position SF at which a maximum output Ppmax is output, the pilot pressure Pp output from the pilot lines 116 and 114 will change from the drain pressure Pp0 of the tank 123 to the discharge pressure Ppmax of the operation lever pump 122.

The description given above is for cases where the pistons 101 and 104 are displaced in response to tilting of the operation lever 106 and hydraulic signals indicating pilot pressures Pp are output from the pilot lines 116 and 114. The same applies to cases where the other pistons 102 and 103 are respectively displaced in response to tilting of the operation lever 106. Hydraulic signals indicating pilot pressures Pp are output from the pilot lines 115 and 117.

As diagrammed in FIG. 22(b), the vehicle has a left crawler 136 and a right crawler 138 deployed on the left and right sides of the vehicle. The present invention can also be applied in vehicles that employ wheels instead of crawlers. When the vehicle is equipped with wheels, the running body hydraulic motors become steering motors which drive the wheels through gears or chains.

The left running body hydraulic motor 135 is an actuator that actuates the left crawler 136 in two directions, namely forward and backward. The right running body hydraulic motor 137 is an actuator that actuates the right crawler 138 in two directions, namely forward and backward. When the left running body hydraulic motor 135 and the right running body hydraulic motor 137 drive, respectively, the left crawler 136 and the right crawler 138 are respectively actuated. The left and right running body hydraulic motors 135 and 137 have the same stroke volume.

The operation lever apparatus 105 is connected by hydraulic lines to swash plate control cylinders 130 and 131 in left and right variable capacity hydraulic pumps 133 and 134. The left and right variable capacity hydraulic pumps 133 and 134 are connected respectively by hydraulic lines to the left and right running body hydraulic motors 135 and 137. The left and right variable capacity hydraulic pumps 133 and 134 have the same stroke volume.

The variable capacity hydraulic pumps 133 and 134 and operation lever pump 122 are driven by the engine 132.

Here, as diagrammed in FIG. 22(*a*), the forward direction of the left running body hydraulic motor 135 is associated with the piston 101 in the upper right position. The backward direction of the right running body hydraulic motor 137 is associated with the piston 102 in the lower right position. The forward direction of the left running body hydraulic motor 135 is associated with the piston 103 in the lower left position. And the forward direction of the right running body hydraulic motor 137 is associated with the piston 104 in the upper left position.

More specifically, the pilot line 116 is connected to a cylinder chamber 130F in the swash plate control cylinder 130. The pilot line 115 is connected to a cylinder chamber 131B in the swash plate control cylinder 131. The pilot line 117 is connected to a cylinder chamber 130B in the swash plate control cylinder 130. And the pilot line 114 is connected to a cylinder chamber 131F in the swash plate control cylinder 131.

Accordingly, when the pistons 101, 102, 103, and 104 are displaced, hydraulic signals Pp are generated in the pilot lines 116, 115, 117, and 114 corresponding to those displaced pistons 101, 102, 103, and 104. In response thereto, the running body hydraulic motors corresponding to those displaced pistons 101, 102, 103, and 104 will be driven, in corresponding directions of advance, by drive amounts corresponding to the amounts of such displacement.

Thus the left and right crawlers 136 and 138 can be actuated in turning directions corresponding to the tilt direction of the operation lever 106, at speeds corresponding to the amount of such tilt in the operation lever 106.

Figure 24:
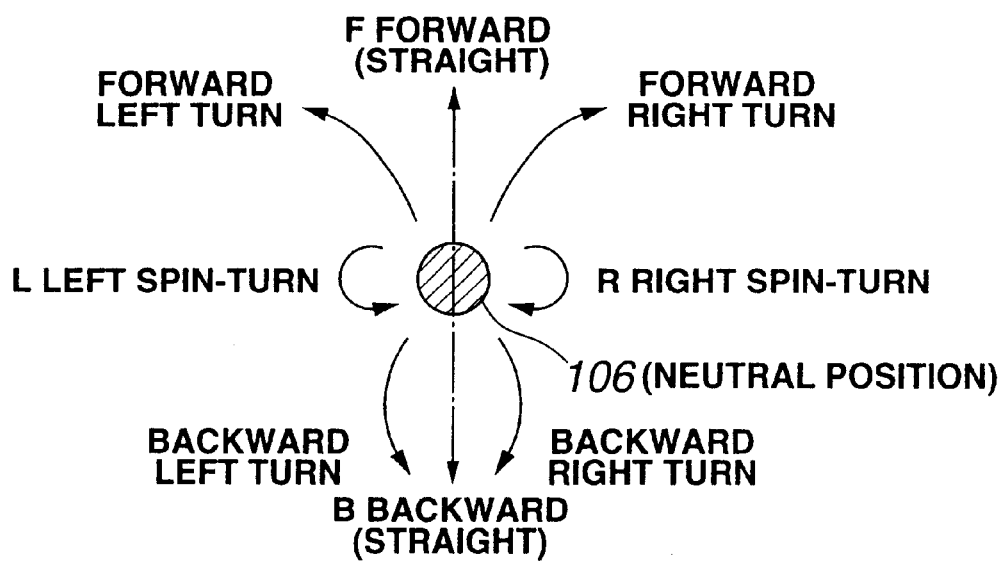
FIG. 24 is a diagram for describing the movements of a skid steer loader or other vehicle made to correspond with operation lever tilt directions.

In FIG. 24 is diagrammed an operation pattern designed primarily for vehicles such as skid steer loaders. In this figure, the arrows indicate vehicle advance directions that are made to correspond with the directions in which the operation lever 106 is tilted. The operations performed with the hydraulic circuit diagrammed in FIG. 22(*b*) are now described while referencing FIG. 24.

Let it now be assumed that the operation lever 106 has been tilted from the neutral position in the forward (straight ahead) direction F, as diagrammed in FIG. 24.

When this is the case, the pistons 101 and 104 in the operation lever apparatus 105 will be displaced with the same stroke, causing hydraulic signals Pp (pilot pressures) of the same size to be output from the pilot lines 116 and 114. The hydraulic signal Pp (pilot pressure) output from the line 116 is supplied to the cylinder chamber 130F corresponding to left running body forward in the swash plate control cylinder 130. The hydraulic signal Pp (pilot pressure) output from the pilot line 114 is supplied to the cylinder chamber 131F corresponding to right running body forward in the swash plate control cylinder 131.

As a consequence thereof, the swash plate in the left running body hydraulic pump 133 is switched to a deflection angle corresponding to forward, and the hydraulic fluid discharged from the left running body hydraulic pump 133 is input to an input port corresponding to the forward position of the left running body hydraulic motor 135. Also, the swash plate in the right running body hydraulic pump 134 is switched to a deflection angle corresponding to forward, and the hydraulic fluid discharged from the right running body hydraulic pump 134 is input to the input port corresponding to the forward position of the right running body hydraulic motor 138.

As a result, the left and right crawlers 136 and 138 are actuated to turn in the forward direction, and the vehicle moves forward (straight ahead), as indicted by the arrow in FIG. 24. The vehicle speed will correspond to the amount by which the operation lever 106 is tilted.

In FIG. 24, the pistons 102 and 103 are depressed when the operation lever 106 is tilted in the backward direction B. When, the piston 102 is depressed and a hydraulic signal Pp is generated, the right running body hydraulic motor 137 corresponding to that piston 102 for which the hydraulic signal Pp is generated is driven, in the corresponding backward direction, by a drive amount corresponding to that hydraulic signal Pp. When the piston 103 is depressed and a hydraulic signal Pp is generated, the left running body hydraulic motor 135 corresponding to that piston 103 for which the hydraulic signal Pp is generated is driven, in the corresponding backward direction, by a drive amount corresponding to that hydraulic signal Pp. As a result, the vehicle moves in backward (straight back) as indicated by the arrow in FIG. 24.

In FIG. 24, the pistons 101 and 102 are depressed when the operation lever 106 is tilted in the right spin turn direction R. When the piston 101 is depressed and a hydraulic signal Pp is generated, the left running body hydraulic motor 135 corresponding to that piston 101 for which the hydraulic signal Pp is generated is driven, in the corresponding forward direction, by a drive amount corresponding to that hydraulic signal Pp. When the piston 102 is depressed and a hydraulic signal Pp is generated, the right running body hydraulic motor 137 corresponding to that piston 102 for which the hydraulic signal Pp is generated is driven, in the corresponding backward direction, by a drive amount corresponding to that hydraulic signal Pp. As a result, the same pressure is inducted to the cylinder chamber 130F in the swash plate control cylinder 130 and the cylinder chamber 131B in the swash plate control cylinder 131, whereupon the hydraulic motors 135 and 137 drive in opposite directions at the same speed. That is, the vehicle executes a right spin turn, as indicated by the arrow in FIG. 24.

In FIG. 24, when the operation lever 106 is tilted in the left spin turn direction L, the pistons 103 and 104 are depressed. When the piston 103 is depressed and a hydraulic signal Pp is generated, the left running body hydraulic motor 135 corresponding to that piston 103 for which the hydraulic signal Pp is generated is driven, in the corresponding backward direction, by a drive amount corresponding to that hydraulic signal Pp. When the piston 104 alone is depressed and a hydraulic signal Pp is generated, the right running body hydraulic motor 137 corresponding to that piston 104 for which the hydraulic signal Pp is generated is driven, in the corresponding forward direction, by a drive amount corresponding to that hydraulic signal Pp. As a result, the same pressure is inducted to the cylinder chamber 130B in the swash plate control cylinder 130 and the cylinder chamber 131F in the swash plate control cylinder 131, whereupon the hydraulic motors 135 and 137 drive in opposite directions at the same speed. That is, the vehicle executes a left spin turn, as indicated by the arrow in FIG. 24.

In FIG. 24, moreover, when the operation lever 106 is tilted in a direction midway between the direction F and the direction R, only the piston 101 is depressed. When only the piston 101 is depressed and a hydraulic signal Pp is generated, only the left running body hydraulic motor 135 corresponding to that piston 101 for which the hydraulic signal Pp is generated is driven, in the corresponding forward direction, by a drive amount corresponding to that hydraulic signal Pp. As a result, the vehicle executes a forward right turn, as indicated by the arrow in FIG. 24.

In FIG. 24, moreover, when the operation lever 106 is tilted in a direction midway between the direction R and the direction B, only the piston 102 is depressed. When only the piston 102 is depressed and a hydraulic signal Pp is generated, only the right running body hydraulic motor 137 corresponding to that piston 102 for which the hydraulic signal Pp is generated is driven, in the corresponding backward direction, by a drive amount corresponding to that hydraulic signal Pp. As a result, the vehicle executes a backward right turn, as indicated by the arrow in FIG. 24.

In FIG. 24, moreover, when the operation lever 106 is tilted in a direction midway between the direction B and the direction L, only the piston 103 is depressed. When only the piston 103 is depressed and a hydraulic signal Pp is generated, only the left running body hydraulic motor 135 corresponding to that piston 103 for which the hydraulic signal Pp is generated is driven, in the corresponding backward direction, by a drive amount corresponding to that hydraulic signal Pp. As a result, the vehicle executes a backward left turn, as indicated by the arrow in FIG. 24.

In FIG. 24, moreover, when the operation lever 106 is tilted in a direction midway between the direction L and the direction F, only the piston 104 is depressed. When only the piston 104 is depressed and a hydraulic signal Pp is generated, only the right running body hydraulic motor 137 corresponding to that piston 103 for which the hydraulic signal Pp is generated is driven, in the corresponding forward direction, by a drive amount corresponding to that hydraulic signal Pp. As a result, the vehicle executes a forward left turn, as indicated by the arrow in FIG. 24.

The case where only the piston 101 is depressed and a turn is made is specifically called a pivot turn. A pivot turn is a turn performed when the hydraulic motor on only one side is driven while the hydraulic motor on the other side is stopped.

Figure 23A:
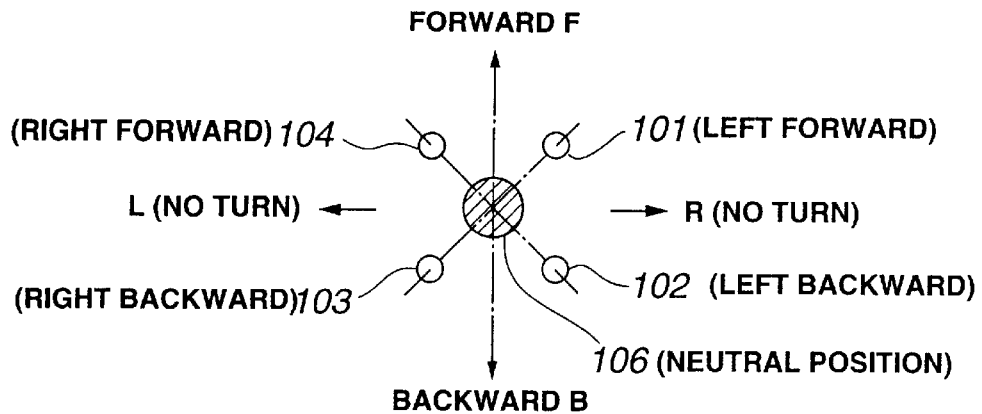
FIGS. 23(*a*) and 23(*b*) are diagrams of a hydraulic circuit in a vehicle carrying an operation lever apparatus relating to the present invention.
Figure 23B:
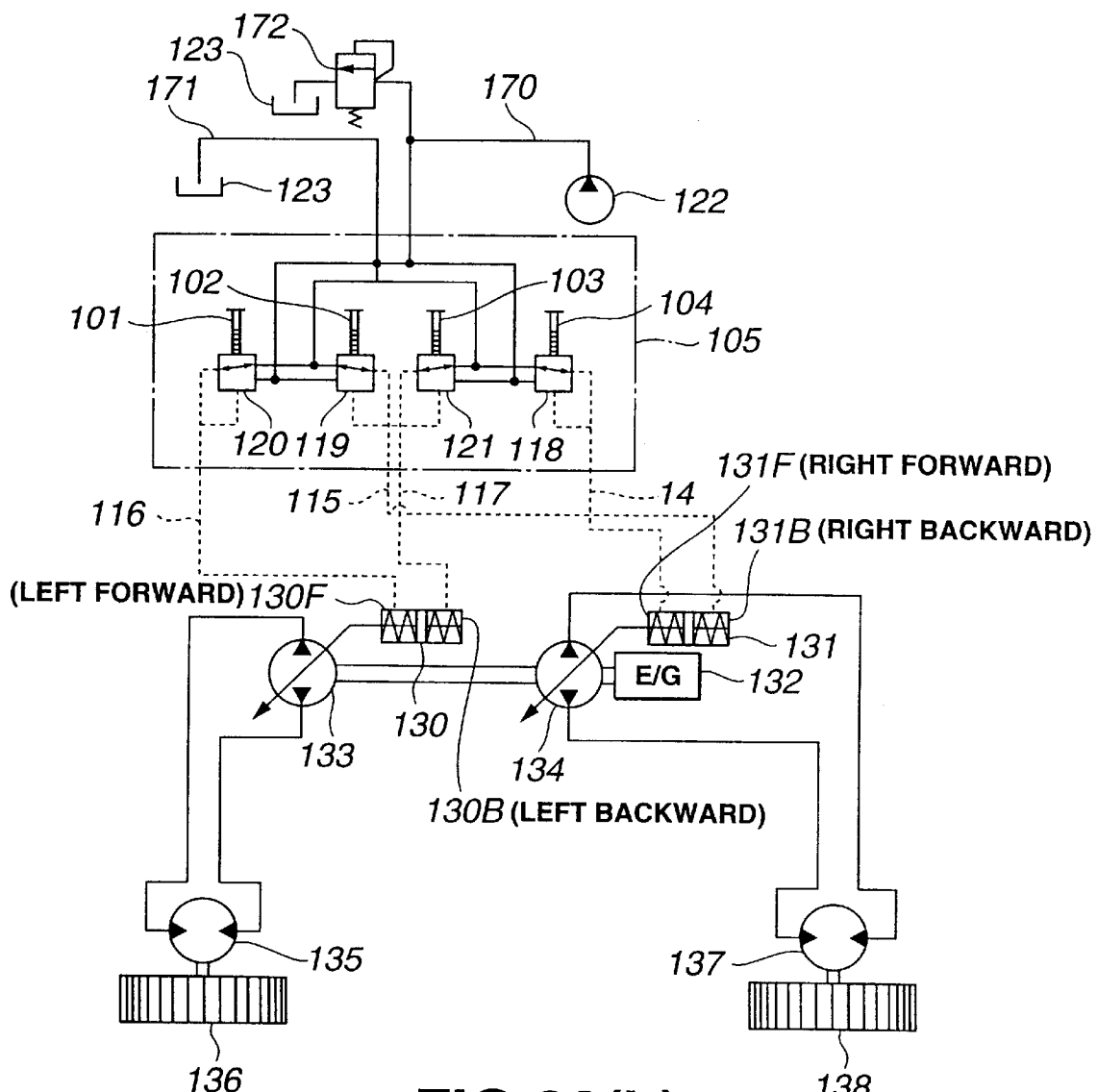

FIG. 23(b) is a diagram of a hydraulic circuit in a second embodiment aspect for a hydraulic drive apparatus mounted in a vehicle such as a bulldozer. In FIG. 23(a) is diagrammed how the pistons 101, 102, 103, and 104 are deployed in the operation lever apparatus 105.

In FIG. 23, the elements designated by the same symbols as in FIG. 22 are the same elements, and no further description thereof is given here. The operation pattern using an operation lever 106 is different in a vehicle such as a bulldozer than in a vehicle such as a skid steer loader. For that reason, there are some differences in the way connections are made between the pilot lines 116, 115, 117, and 114 in the operation lever apparatus 105, on the one hand, and the cylinder chambers in the swash plate control cylinders 130 and 131, on the other.

Specifically, unlike the hydraulic circuit diagrammed in FIG. 22(b), in the hydraulic circuit diagrammed in FIG. 23(b), the pilot line 115 is connected to the cylinder chamber 130B in the swash plate control cylinder 130, while the pilot line 117 is connected to the cylinder chamber 131B in the swash plate control cylinder 131.

Figure 25:
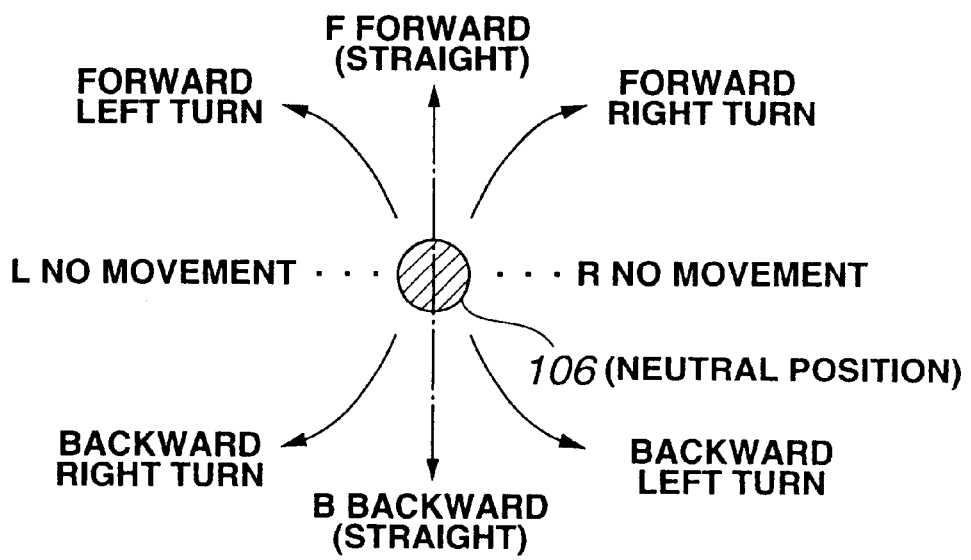
FIG. 25 is a diagram for describing the movements of a bulldozer or other vehicle made to correspond with operation lever tilt directions.

In FIG. 25 is diagrammed an operation pattern designed primarily for vehicles such as bulldozers. In this figure, the arrows indicate vehicle advance directions that are made to correspond with the directions in which the operation lever 106 is tilted. The operations performed with the hydraulic circuit diagrammed in FIG. 23(b) are now described while referencing FIG. 25.

When the operation lever 106 is tilted in the forward direction F and the pistons 101 and 104 are depressed, the vehicle moves forward (straight ahead), as indicated by the arrow in FIG. 25.

When the operation lever 106 is tilted in the backward direction B and the pistons 102 and 103 are depressed, the vehicle moves in backward (straight back).

Moreover, when the operation lever 106 is tilted in the right direction R and the pistons 101 and 102 are depressed, the same pressure is inducted to both the cylinder chamber 130F and the cylinder chamber 130B in the swash plate control cylinder 130. This causes the swash plate in the hydraulic pump 133 to assume the neutral position. Accordingly, the vehicle stops moving.

When the operation lever 106 is tilted in the left direction L and the pistons 103 and 104 are depressed, the vehicle stops moving just as when the operation lever 106 is tilted in the right direction R.

When the operation lever 106 is tilted in a direction midway between the direction F and the direction R, and only the piston 101 is depressed, the vehicle executes a forward right turn.

When the operation lever 106 is tilted in a direction midway between the direction R and the direction B, and only the piston 102 is depressed, the vehicle executes a backward right turn.

When the operation lever 106 is tilted in a direction midway between the direction B and the direction L, and only the piston 103 is depressed, the vehicle executes a backward left turn.

And when the operation lever 106 is tilted in a direction midway between the direction L and the direction F, and only the piston 104 is depressed, the vehicle executes a forward left turn.

Let it now be assumed that, as diagrammed in FIGS. 24 and 25, the operation lever 106 is tilted in a direction midway between the forward direction F and the right direction R, and that the vehicle is making a "forward right turn."

If at this time the operator removes his or her hand from the operation lever 106, the operation lever 106 will be held in a tilted position in the forward direction F component. Thus the pistons 101 and 104 for the forward direction F component will hold their displaced conditions, and the hydraulic signal outputs of the corresponding pilot lines 116 and 114 will be held. Thus the vehicle, for its part, will running in the "forward" direction while maintaining its current speed of running.

Thus, as based on this embodiment aspect, the vehicle can be made to running in the way that the operator wishes.

When the operation lever apparatus 105 of the first embodiment aspect diagrammed in FIGS. 15 to 17 is used, the following benefits are realized.

In specific terms, let it be assumed that the operator has operated the operation lever 106 by hand, and caused the forward and backward direction F or B component in the tilt direction to be restored to the neutral position. At that time, the spring 155 in the neutral position sensing mechanism 154 will extend, the ball 156 will be pressed by the spring 155, and that ball 156 will slide into the slot 152b formed in the support shaft 152. In order to operate the operation lever 106 from the neutral position to a position other than the neutral position, it is necessary to move the operation lever 106 with sufficient operating force to cause the spring to contract. Therefore the operator can sense that the operation lever 106 has been "positioned in the neutral position."

As a consequence, it will no longer be necessary, when the operator returns the operation lever 106 by hand to the neutral position, for the operator to drop his or her eyes to the operation lever 106 or to verify that the operation lever 106 is now positioned in the neutral position by turning his or her attention to the movement of the running bodies (crawlers 136 and 138) of the vehicle. The work load on the operator is also reduced because there is no longer any necessity to concentrate only on the operation of the operation lever 106.

Let it be next assumed that the operator has operated the operation lever 106 by hand and restored the forward and backward direction F or B component in the tilt direction to the neutral position. At this time, the tip of the rod 157a in the neutral position detection switch 157 will slide into the slot 152c formed in the support shaft 152. Therefore the rod 157a will extend. When the rod 157a extends, an electrical signal indicating that the operation lever 106 is in the neutral position is output from the neutral position detection switch 157 over the electrical signal line 159. It is assumed here that the electrical signal line 159 is connected to the starting unit for the engine 132. It is further assumed that the engine start control system is configured so that engine starting is disallowed when no neutral position signal is being input to the starting unit over the electrical signal line 159.

When the engine start control system is configured in this way, the engine 132 will not start, even when the engine 132 start switch is operated, if the operation lever 106 is not positioned in the neutral position. Consequently, it is possible to avoid the situation of the vehicle making a sudden departure contrary to the wishes of the operator by operating the engine 132 start switch despite the fact that the operation lever 106 is not positioned in the neutral position. But this is not limited to the engine 132. Sudden departures of the vehicle may also be avoided by preventing some drive source other than the engine 132 from being actuated.

In this embodiment aspect, it is assumed that the operation lever apparatus 105 is an operation lever apparatus for controlling vehicle running. However, the present invention is not limited thereto or thereby, and can be applied also in cases where an operation lever apparatus is made to control the drive of working members.

Moreover, although the way in which the. pistons 101 to 104 are deployed either in the operation lever apparatus of the first embodiment aspect diagrammed in FIGS. 15 to 17 or in the operation lever apparatus 105 in the second embodiment aspect diagrammed in FIG. 18 and FIG. 19 is herein made the deployment configuration diagrammed in FIG. 21, that deployment configuration may be made the same as conventionally, as diagrammed in FIG. 27.

Figure 29:
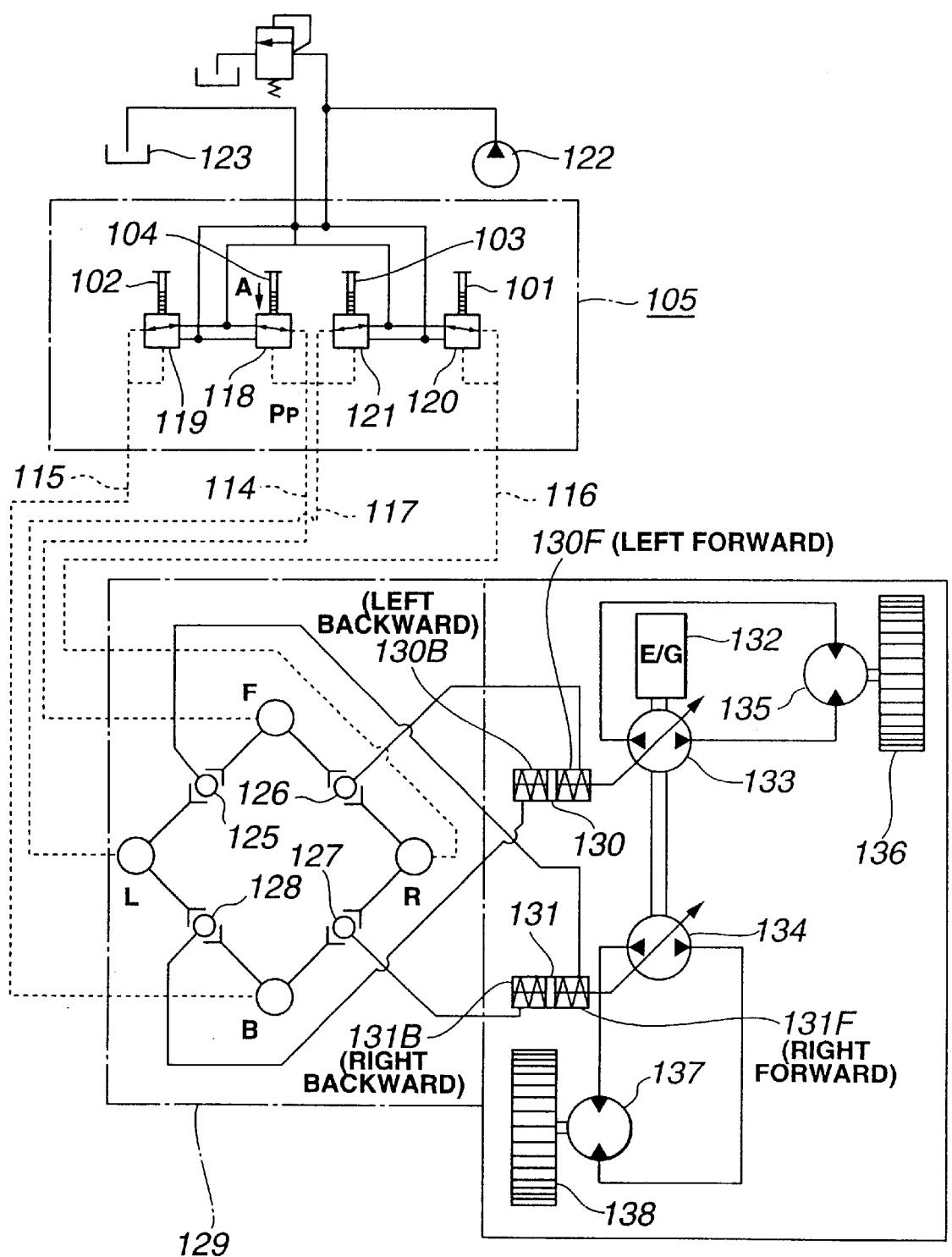
FIG. 29 is a diagram of a hydraulic circuit in a vehicle carrying a conventional operation lever apparatus.
Figure 30:
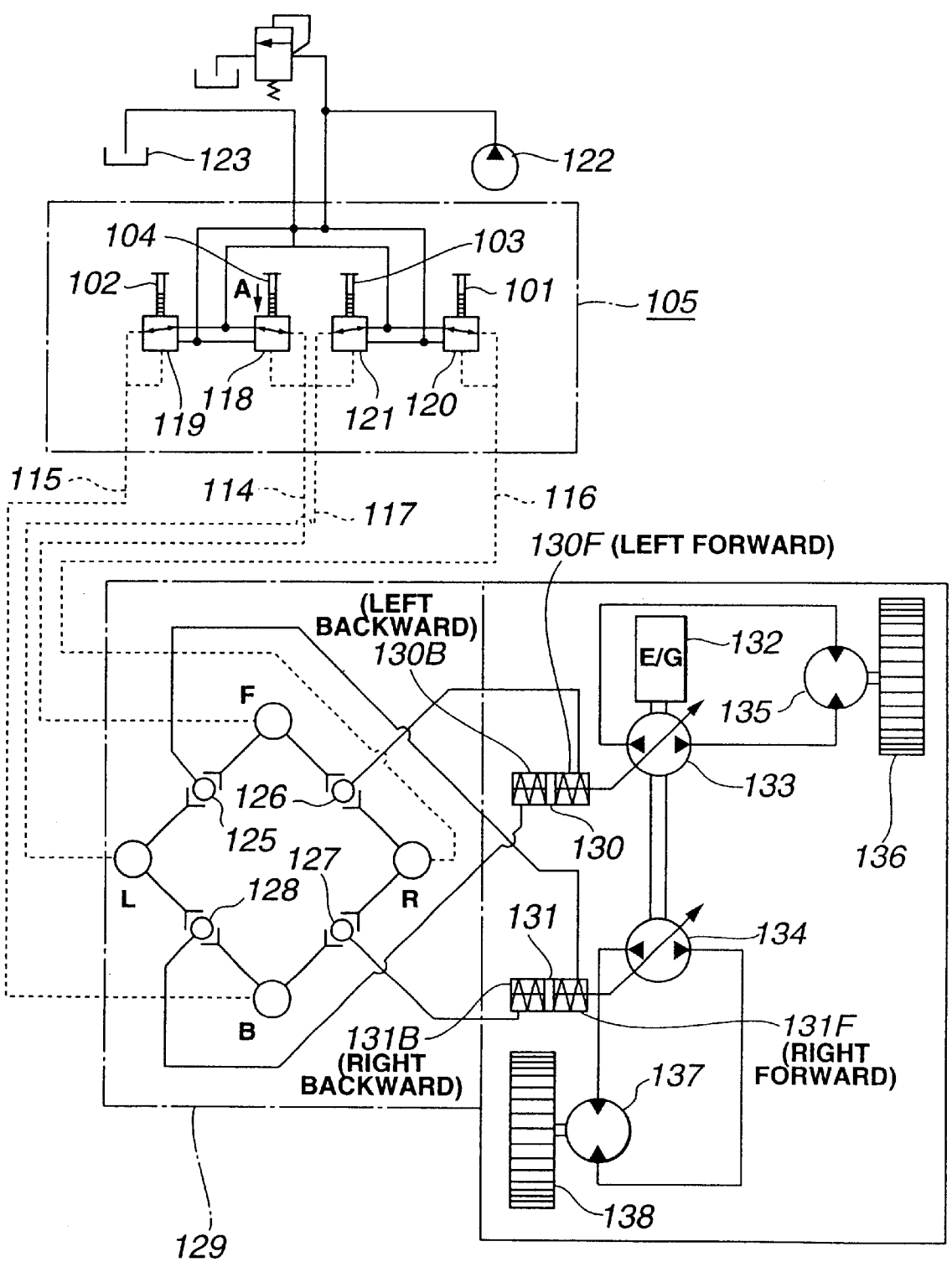
FIG. 30 is a diagram of a hydraulic circuit in a vehicle carrying a conventional operation lever apparatus.

In FIG. 29 and FIG. 30 are diagrammed vehicle hydraulic circuits for cases where the way in which the pistons 101 to 104 are configured in the operation lever apparatus 105 is made the deployment configuration diagrammed in FIG. 27. FIG. 29 corresponds to FIG. 22(b), and FIG. 30 corresponds to FIG. 23(b). In what follows, descriptions of configurational elements common to FIG. 22(b) or FIG. 23 (b) are omitted in the interest of expediency.

The hydraulic circuit diagram given in FIG. 29 is now described. The hydraulic drive apparatus diagrammed in FIG. 29 is primarily for installation in a vehicle such as a skid steer loader.

In FIG. 29, a drive signal generator circuit 129 is configured by shuttle valves 125, 126, 127, and 128 that compare hydraulic signals output from two adjacent pistons as diagrammed in FIG. 27(a) and output a signal for the larger pressure.

The pilot line 114 is connected to an input port F for the shuttle valves 125 and 126, the pilot line 115 to the input port B for the shuttle valves 127 and 128, the pilot line 116 to the input port R for the shuttle valves 126 and 127, and the pilot line 117 to the input port L for the shuttle valves 125 and 128.

The output port of the shuttle valve 125 is connected to the cylinder chamber 131F in the swash plate control cylinder 131. The output port of the shuttle valve 126 is connected to the cylinder chamber 130F of the swash plate control cylinder 130. The output port of the shuttle valve 127 is connected to the cylinder chamber 131B of the swash plate control cylinder 131. And the output port of the shuttle valve 128 is connected to the cylinder chamber 130B of the swash plate control cylinder 130.

Variable capacity hydraulic pumps 133 and 134 and the operation lever pump 122 are connected to the engine 132.

Accordingly, when the pistons 101, 102, 103, and 104 are displaced, hydraulic signals Pp are generated in pilot lines 116, 115, 117, and 114 corresponding to those displaced pistons 101, 102, 103, and 104, and, in response thereto, the running body hydraulic motors corresponding to those displaced pistons 101, 102, 103, and 104 are driven, in a corresponding direction of advance, and by a drive amount corresponding to the amounts of those displacements.

Thus the left and right crawlers 136 and 138 can be actuated in turning directions corresponding to the direction the operation lever 106 is tilted in, at speeds corresponding to the amounts by which the operation lever 106 is tilted.

Operations conducted with the hydraulic circuit diagrammed in FIG. 29 are now described with reference also to FIG. 24.

Let it now be assumed that the operation lever 106 has been tilted, from the neutral position, in the forward (straight ahead) direction F, as diagrammed in FIG. 24.

At this time, only the piston 104 in the operation lever apparatus 105 is displaced. Accordingly, a hydraulic signal Pp will only be output from the pilot line 114. That hydraulic signal Pp is sent to the drive signal generator circuit 129 and input to the shuttle valves 125 and 126. At that time, no pilot pressure will act on the input ports L and R, wherefore hydraulic signals Pp will be output from the shuttle valves 125 and 126. From the shuttle valve 125 is output a drive signal (pilot pressure) corresponding to the forward direction of the right running body hydraulic motor 137, and that pilot pressure is supplied to the cylinder chamber 131F corresponding to right running forward in the swash plate control cylinder 131. From the shuttle valve 126 in the drive signal generator circuit 129 is output a drive signal (pilot pressure) corresponding to the forward direction of the left running body hydraulic pump 133, and the output hydraulic fluid is supplied to the cylinder chamber 130F corresponding to left running forward in the swash plate control cylinder 130.

Consequently, the swash plate in the right running body hydraulic pump 134 is switched to a deflection angle corresponding to forward, and the hydraulic fluid discharged from the right running body hydraulic pump 134 is input to an input port corresponding to the forward position in the right running body hydraulic motor 138. Also, the swash plate in the left running body hydraulic pump 133 is switched to a deflection angle corresponding to forward, and the hydraulic fluid discharged from the left running body hydraulic pump 133 is input to an input port corresponding to the forward position in the left running body hydraulic motor 135. The same applies to the pressures output from the shuttle valves 125 and 126. The pressures output from the left and right running body hydraulic pumps 133 and 134 become the same, and the pressures input to the left and right running body hydraulic motors 135 and 137 become the same. Accordingly, the left and right running body hydraulic motors 135 and 137 turn at the same speed.

As a result, the left and right crawlers 136 and 138 are actuated in the forward direction at the same speed, and the vehicle moves forward (straight ahead), as indicated by the arrow in FIG. 24.

Similarly, in FIG. 24, when the operation lever 106 is tilted in the backward direction B, the vehicle moves in backward (straight back).

When the operation lever 106 is tilted in the right spin turn direction R, the vehicle executes a right spin turn.

When the operation lever 106 is tilted in the left spin turn direction L, the vehicle executes a left spin turn.

When the operation lever 106 is tilted in a direction midway between the direction F and the direction R, the vehicle executes a forward right turn.

When the operation lever 106 is tilted in a direction midway between the direction R and the direction B, the vehicle executes a backward right turn.

When the operation lever 106 is tilted in a direction midway between the direction B and the direction L, the vehicle executes a backward left turn.

And when the operation lever 106 is tilted in a direction midway between the direction L and the direction F, the vehicle executes a forward left turn.

Next, a hydraulic drive apparatus installed primarily in vehicles such as bulldozers is diagrammed in FIG. 30.

In FIG. 30, the elements designated by the same symbols as in FIG. 29 are the same elements, and no further description thereof is given here. An operation pattern corresponding to FIG. 30 is diagrammed in FIG. 25.

The points of difference with the hydraulic circuit diagrammed in FIG. 29 are as follows. In the hydraulic circuit diagrammed in FIG. 30, the output port of the shuttle valve 125 is connected to the cylinder chamber 130F in the swash plate control cylinder 130, and the output port of the shuttle valve 126 is connected to the cylinder chamber 131F in the swash plate control cylinder 131.

Accordingly, when the operation lever 106 is tilted in the forward direction F, the vehicle moves forward (straight ahead), as indicated by the arrow in FIG. 25.

When the operation lever 106 is tilted in the backward direction B, the vehicle moves in backward (straight back).

When the operation lever 106 is tilted in the right direction R, the vehicle stops moving.

When the operation lever 106 is tilted in the left direction L, the vehicle stops moving.

When the operation lever 106 is tilted in a direction midway between the direction F and the direction R, the vehicle executes a forward right turn.

When the operation lever 106 is tilted in a direction midway between the direction R and the direction B, the vehicle executes a backward left turn.

When the operation lever 106 is tilted in a direction midway between the direction B and the direction L, the vehicle executes a backward right turn.

And when the operation lever 106 is tilted in a direction midway between the direction L and the direction F, the vehicle executes a forward left turn.

In this embodiment aspect, the operation lever 106 is held by friction force. Instead of that, however, the operation lever 106 may be held by applying a lifting force to the piston or pistons on the opposite side from the piston or pistons being depressed by the operation of tilting the operation lever 106 (for example, if in FIG. 22(a) the pistons 101 and 104 are being depressed, then the pistons 102 and 103 on the opposite side). One conceivable method of applying a lifting force to the pistons would be to cause hydraulic fluid to act on the opposite-side pistons (the pistons 102 and 103, for example).

In this embodiment aspect, moreover, the operation force for the operation lever 106 is changed when the ball 156 in the neutral position sensing mechanism 154 slides into the slot 152b formed in the support shaft 152. Instead of that, however, when the operation lever 106 is positioned in the neutral position, the operation force for the operation lever 106 when positioned in the neutral position may be changed by causing hydraulic fluid to act on the pistons for the holding direction components, respectively (for example, in FIG. 22(a), if the holding direction component is the forward and backward directions F and B, then the pistons (12 and 13) on the opposite side from those pistons (11 and 14)).

In this embodiment aspect, furthermore, the tilted position is held for the forward and backward direction F and B component, of the forward and backward direction F and B component and the left and right direction L and R component for the operation lever 106. However, the operation lever apparatus 105 may be configured so that the tilted position is held for the left and right direction L and R component.

A description is next given for a lever holding force release apparatus for releasing the function for holding the tilted position of the operation lever 106 described in the foregoing.

Figure 31:
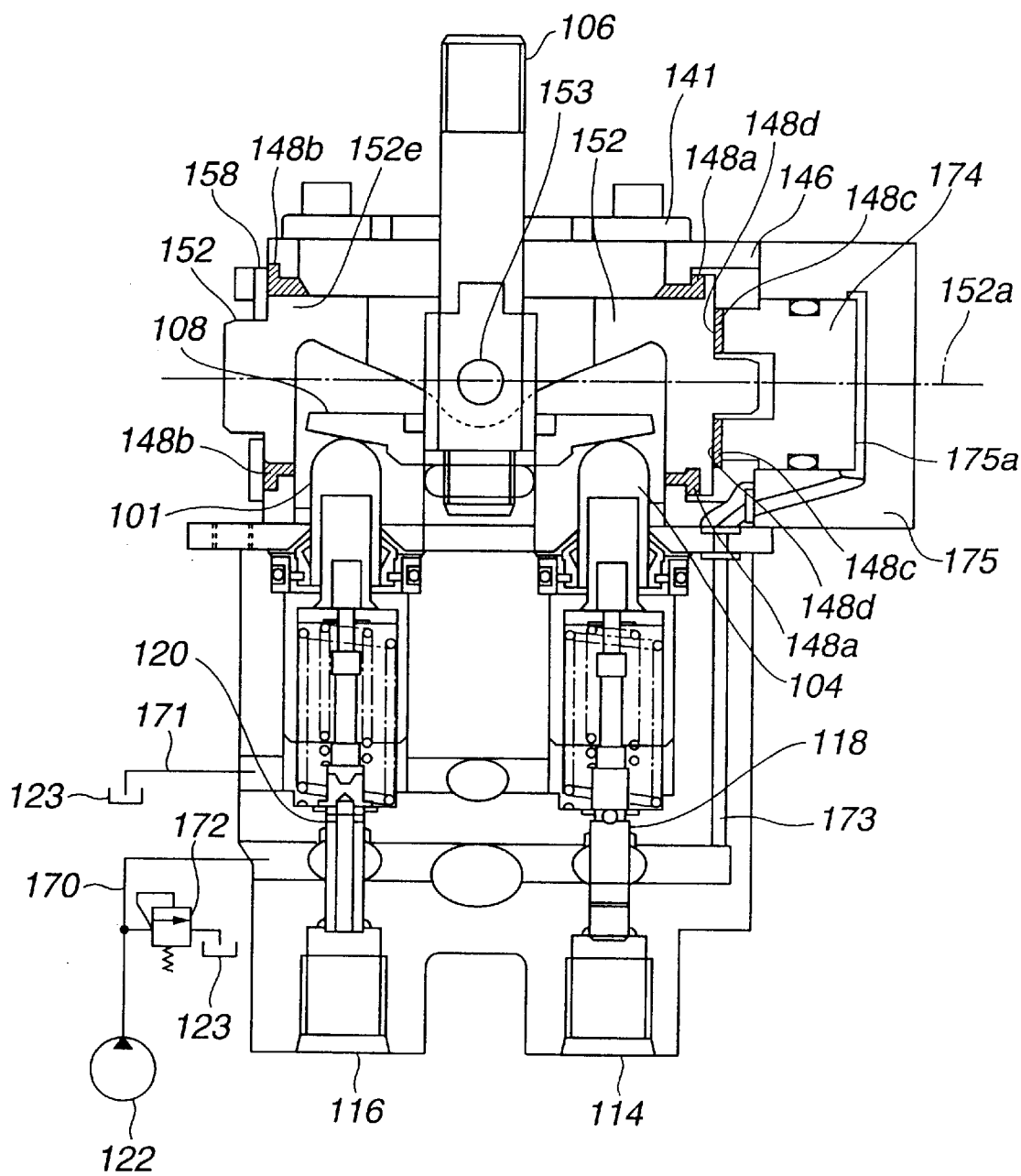
FIG. 31 is a diagram of the configuration of a first example of a lever holding force release apparatus.

FIG. 31 is a configuration diagram of a first example of a lever holding force release apparatus. This FIG. 31 assumes an operation lever apparatus 105 like the operation lever apparatus 105 in the first embodiment aspect diagrammed in FIGS. 15 to 17. FIG. 31 is a diagram that corresponds with FIG. 17(a). In FIG. 31, when the operation lever 106 is operated in directions perpendicular to the plane of the diagram, the vehicle runs in the forward and backward directions F and B. When the operation lever 106 is tilted on the side looking at the diagram, the pistons 101 and 104 are depressed, and the vehicle runs forward.

In what follows, configuring elements that are the same as those in FIGS. 15 to 17 are assumed to be configuring elements that have the same function, and, in the interest of expediency, are not further described here.

As diagrammed in FIG. 31, a roughly columnar support shaft 152 is deployed inside the casing 146 of the operation lever apparatus 105. Sliding members 148a and 148b are deployed between the casing 146 and the support shaft 152. Those sliding members 148a and 148b partially cover the outer circumferential surface 152e of the support shaft 152.

The support shaft 152 is a forward and backward direction component turning shaft that turns when the operation lever 106 is tilted in the forward and backward direction component F and B. The support shaft 152 is deployed in the casing 146 so that it can freely turn about a center of turning that is the center axis 152a thereof.

One end of a piston 174 comes up against one end surface of the support shaft 152, with the sliding member 148c therebetween. The piston 174 is accommodated inside a cylinder 175 so that it can slide freely. The cylinder 175 is attached to the side of the casing 146.

The other end of the piston 174 faces a hydraulic chamber 175a in the cylinder 175. This hydraulic chamber 175a is connected to a line 173. That line 173 is in turn connected to a line 170. That line 170 is connected to a discharge port in the operation lever pump 122.

Accordingly, when the engine 132 is operated, and hydraulic fluid is discharged from the operation lever pump 122 in response thereto, hydraulic fluid is supplied to the hydraulic chamber 175a via the lines 170 and 173. Thus pressure from the hydraulic fluid will act on one end of the piston 174 facing the hydraulic cylinder 175a, and a pressing force will be generated toward the left in the drawing. This pressing force pushes the sliding member 148c against the support shaft 152. A sliding resistance is therefore produced between the sliding surface 148d of the sliding member 148c and the outer circumferential surface 152e of the support shaft 152 that is in contact with that sliding surface 148d. Thus a holding force is generated that holds the operation lever 106 in the tilted position. The pressing force generated at the piston 174 varies according to the size of the pressure inside the hydraulic chamber 175a, and according thereto also the sliding resistance between the sliding member 148c and the support shaft 152, and the holding force on the operation lever 106 described earlier, change as well.

The hydraulic circuit for the operation lever apparatus 105 is the same as that diagrammed in FIG. 22(*b*).

The operation of this lever holding force release apparatus is now described.

When the engine 132 is running, the operation lever pump 122 is being driven. Hydraulic fluid is thus discharged from the operation lever pump 122 and hydraulic fluid is supplied via the lines 170 and 173 to the hydraulic chamber 175a of the cylinder 175. The pressure of that hydraulic fluid therefore acts against the one end of the piston 174 facing the hydraulic chamber 175a, and a pressing force is generated toward the left in the drawing. The sliding member 148c is pushed against the support shaft 152 by that pushing force. Thus a sliding resistance is produced between the sliding surface 148d of the sliding member 148c and the outer circumferential surface 152e of the support shaft 152 that is in contact with that sliding surface 148d.

When the operation lever 106 is operated so as to tilt, the support shaft 152 turns about its center axis 152a by an amount of revolution corresponding to the forward and backward direction F or B in the tilt direction. And the support shaft 153 turns by an amount of revolution corresponding to the left and right direction L or R component in the tilt direction.

Let it now be assumed that the operator has removed his or her hand from the operation lever 106. Friction forces produced by the sliding members 148a, 148b, and 148c then act in a direction opposite to that of the restoring turning force on the operation lever 106, wherefore the support shaft 152 will stop at the point in time when it was released. Meanwhile, at the point in time when the operation lever 106 was released, the support shaft 153 will turn due to the restoring turning force on the operation lever 106.

Therefore, at the point in time when the operation lever 106 was released, the forward and backward direction F or B component in the tilt direction will be held at the tilted position, and the left and right direction L or R component in the tilt direction will be restored to the neutral position. Thus the piston or pistons for the forward and backward direction F or B component will remain displaced as is, and hydraulic signal output will be held. The displacement in the piston or pistons for the left and right direction L or R will return to 0, however, and the hydraulic signal output will become 0.

The pressure inside the hydraulic chamber 175a of the cylinder 175 is determined according to a set relief pressure in the relief valve 172. Accordingly, the size of the pressure inside the hydraulic chamber 175a can be varied according to the relief pressure set in the relief valve 172, and, in accord therewith, the pushing force produced at the piston 174 can be varied, the sliding resistance can be varied, and the holding force on the operation lever 106 can be varied.

When the engine 132 is stopped, on the other hand, hydraulic fluid will no longer be discharged from the operation lever pump 122 having the engine 132 as its drive source. Thus the supply of hydraulic fluid to the hydraulic chamber 175a of the cylinder 175 will cease, and the pressure inside the hydraulic chamber 175a will become a low pressure. Thus the piston 174 will no longer produce a pressing force, and the condition wherein the sliding member 148c is being pushed against the support shaft 152 will be released. As a result, the sliding resistance between the sliding surface 148d of the sliding member 148c and the outer circumferential surface of the support shaft 152 in contact with that sliding surface 148d is diminished. In other words, the friction force acting opposite to the restoring turning force on the operation lever 106 is diminished. The friction force applied to the operation lever 106 becomes smaller than the restoring turning force applied to the same operation lever 106, wherefore the support shaft 152 returns to the original turning position. That is, the operation lever 106 returns to the neutral position from the tilted position. Thus the holding force on the operation lever 106 is released. As a consequence, the displacement in the piston or pistons for the forward and backward direction F or B component returns to 0, wherefore the hydraulic signal output becomes zero.

Thus, even if the engine 132 is stopped with the operation lever 106 held in a tilted position, when the engine 132 is restarted, the operation lever 106 will return automatically to the neutral position and the hydraulic signal will be released to 0. Consequently, the vehicle will not make a sudden departure when the engine 132 is restarted. In other words, it is possible to avoid situations where the vehicle suddenly begins moving in a direction of advance corresponding to the direction the operation lever was tilted in when the engine 132 was stopped the previous time.

When restarting the engine 132, moreover, there is no longer any need for the operator to return the operation lever 106 to the neutral position by hand, wherefore operability is significantly improved.

In the example configuration diagrammed in FIG. 31, a sliding member 148c is interposed between the piston 174 and the support shaft 152. However, the support shaft 152 may be pressed against directly by the piston 174 without interposing the sliding member 148c. When that is the case, sliding resistance is produced between the end surface of the piston 174 and the outer circumferential surface 152e of the support shaft 152 that is in contact with that end surface. In this case also, the pressing force produced at the piston 174 varies according to the size of the pressure inside the hydraulic chamber 175a, and, in correspondence therewith, the sliding resistance between the piston 174 and the support shaft 152 varies, and the holding force on the operation lever 106 varies.

A second example of a lever holding force release apparatus wherein part of the apparatus diagrammed in FIG. 31 has been modified is described with reference to FIG. 32.

In what follows, configuring elements that are the same as those in FIG. 31 are assumed to be configuring elements that have the same function, and, in the interest of expediency, are not further described here.

Figure 32:
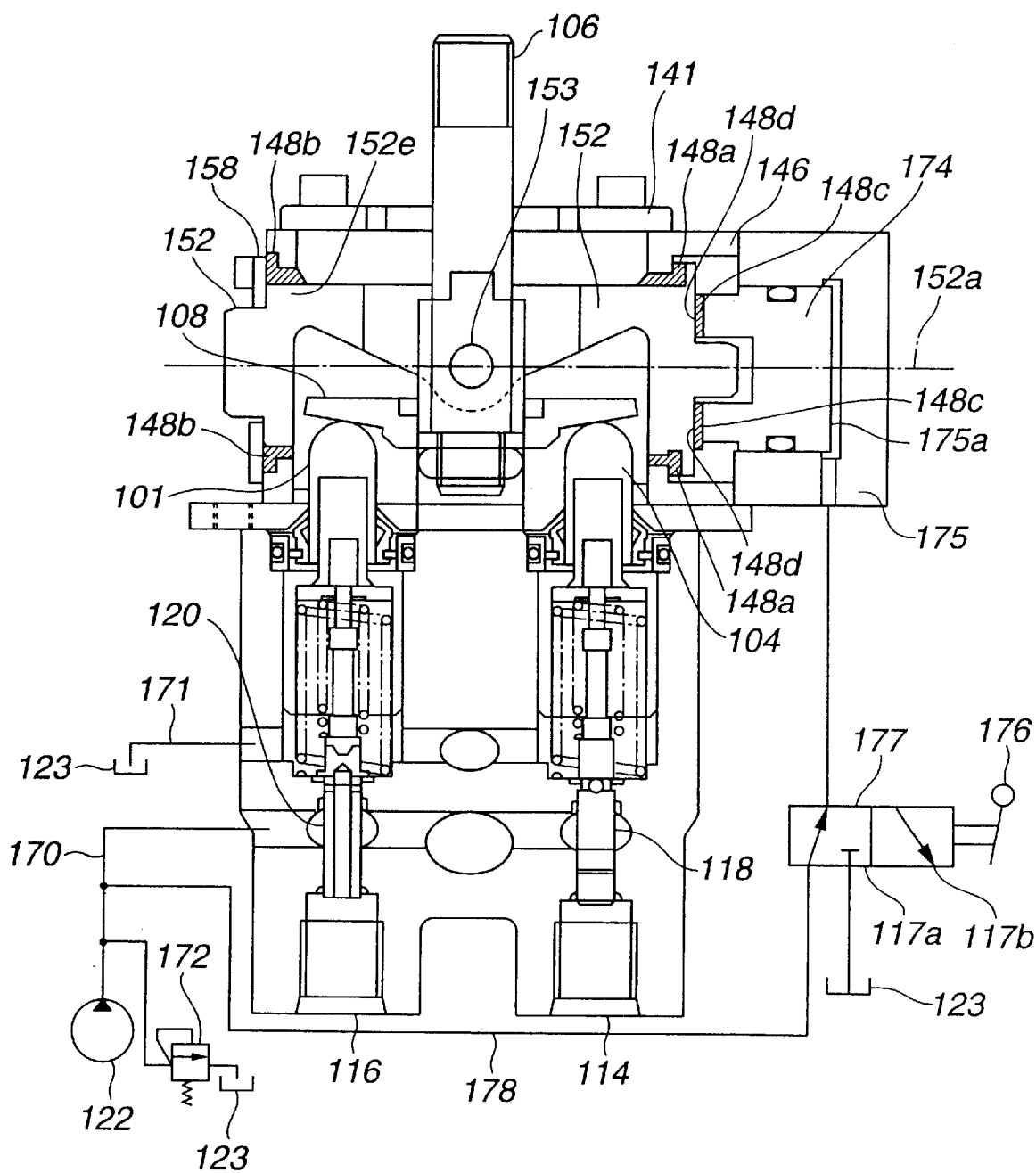
FIG. 32 is a diagram of the configuration of a second example of a lever holding force release apparatus.

As diagrammed in FIG. 32, the hydraulic chamber 175a in the cylinder 175 is connected to a line 178. That line 178 is connected via the line 170 to the discharge port of the operation lever pump 122.

A switching valve 177 is deployed in the line 178. The valve position of this switching valve 177 is switched by operating the holding force release lever 176. When the switching valve 177 is switched to the valve position 177a (holding position 177a), on the left side in the drawing, hydraulic fluid discharged from the operation lever pump 122 passes through the switching valve 177 and is supplied to the hydraulic chamber 175a of the cylinder 175. And when the switching valve 177 is switched to the valve position 177b (release position 177b), on the right side in the drawing, the hydraulic fluid discharged from the operation lever pump 122 is cut off by the switching valve 177, whereupon hydraulic fluid is no longer supplied to the hydraulic chamber 175a in the cylinder 175.

The operation of the lever holding force release apparatus is now described.

When the engine 132 is running, the operation lever pump 122 is driven. If the holding force release lever 176 is then operated so that the switching valve 177 is switched to the holding position 177a, on the left side in the drawing, the hydraulic fluid discharged from the operation lever pump 122 passes through the switching valve 177 and is supplied to the hydraulic chamber 175a of the cylinder 175. Consequently, a pressing force will be produced at the piston 174, and the operation lever 106 will be held in the position it was tilted in when released by the operator, with respect to the forward and backward direction F or B component in the tilt direction. Thus the piston or pistons for the forward and backward direction F or B component remain displaced as is, and hydraulic signal output is held. Meanwhile, the displacement in the piston or pistons for the left and right direction L or R returns to 0, and the hydraulic signal output becomes 0.

When the holding force release lever 176 is operated and the switching valve 177 is switched to the release position 177b, on the right side in the drawing, the hydraulic fluid discharged from the operation lever pump 122 is cut off by the switching valve 177, whereupon hydraulic fluid is no longer supplied to the hydraulic chamber 175a in the cylinder 175. Consequently, no pressing force will be produced at the piston 174, and the operation lever 106 will be returned from the tilted position to the neutral position, at the point in time when released by the operator, with respect to the forward and backward direction F or B in the tilt direction of the operation lever 106. In other words, the holding force on the operation lever 106 is released. Thus the displacement in the piston or pistons for the forward and backward direction F or B returns to 0, wherefore the hydraulic signal output also goes to 0.

Thus, according the example configuration diagrammed in FIG. 32, the holding function can be released by operating the holding force release lever 176, even when the engine 132 is running. Therefore, even if the engine is running, it is possible to release the holding function according to the job situation.

When, on the other hand, the engine 132 stops, hydraulic fluid ceases being discharged from the operation lever pump 122 which has the engine 132 as its drive source. Thus hydraulic fluid is no longer supplied to the hydraulic chamber 175a in the cylinder 175, irrespective of the switching position of the switching valve 177, and the pressure inside the hydraulic chamber 175a becomes a low. Thus a pressing force is no longer produced at the piston 174. Consequently, the operation lever 106 is returned to the neutral position from the position it was tilted in at the point in time when it was released by the operator, with respect to the forward and backward direction F or B component in the direction of tilt of the operation lever 106. In other words, the holding force on the operation lever 106 is released and the hydraulic signal output goes to 0.

Thus, as in the example configuration diagrammed in FIG. 31, when the engine 132 is restarted, the operation lever 106 is automatically returned to the neutral position, and situations wherein the vehicle makes a sudden departure can be avoided. When restarting the engine 132, furthermore, there is no need for the operator to return the operation lever 106 to the neutral position by hand, wherefore operability is significantly improved.

It should be noted here that it is preferable, in terms of what the operator feels, that the holding force on the operation lever 106 be constant. In actual practice, however, the holding force on the operation lever 106 will vary according to the load on the engine 132, making the operations seem odd to the operator.

More specifically, when the load on the engine 132 increases and the engine 132 rpm increases, the hydraulic fluid flow volume discharged from the operation lever pump 122 becomes large. In response thereto, the actual relief pressure in the relief valve 172 rises. As a consequence, the pressure inside the lines 170 and 178 connecting to the hydraulic chamber 175a in the cylinder 175 rises and the pressing force produced at the piston 174 increases. This causes the holding force on the operation lever 106 to increase, giving the operator the sensation that "the operation lever 106 has become stiff." Nothing can be done about this variation in the holding force on the operation lever 106 with the example configurations diagrammed in FIG. 31 and FIG. 32.

An example configuration of a lever holding force release apparatus wherewith the variation in holding force on the operation lever 106 can be suppressed and the holding force made constant irrespective of engine load is now described.

Figure 33:
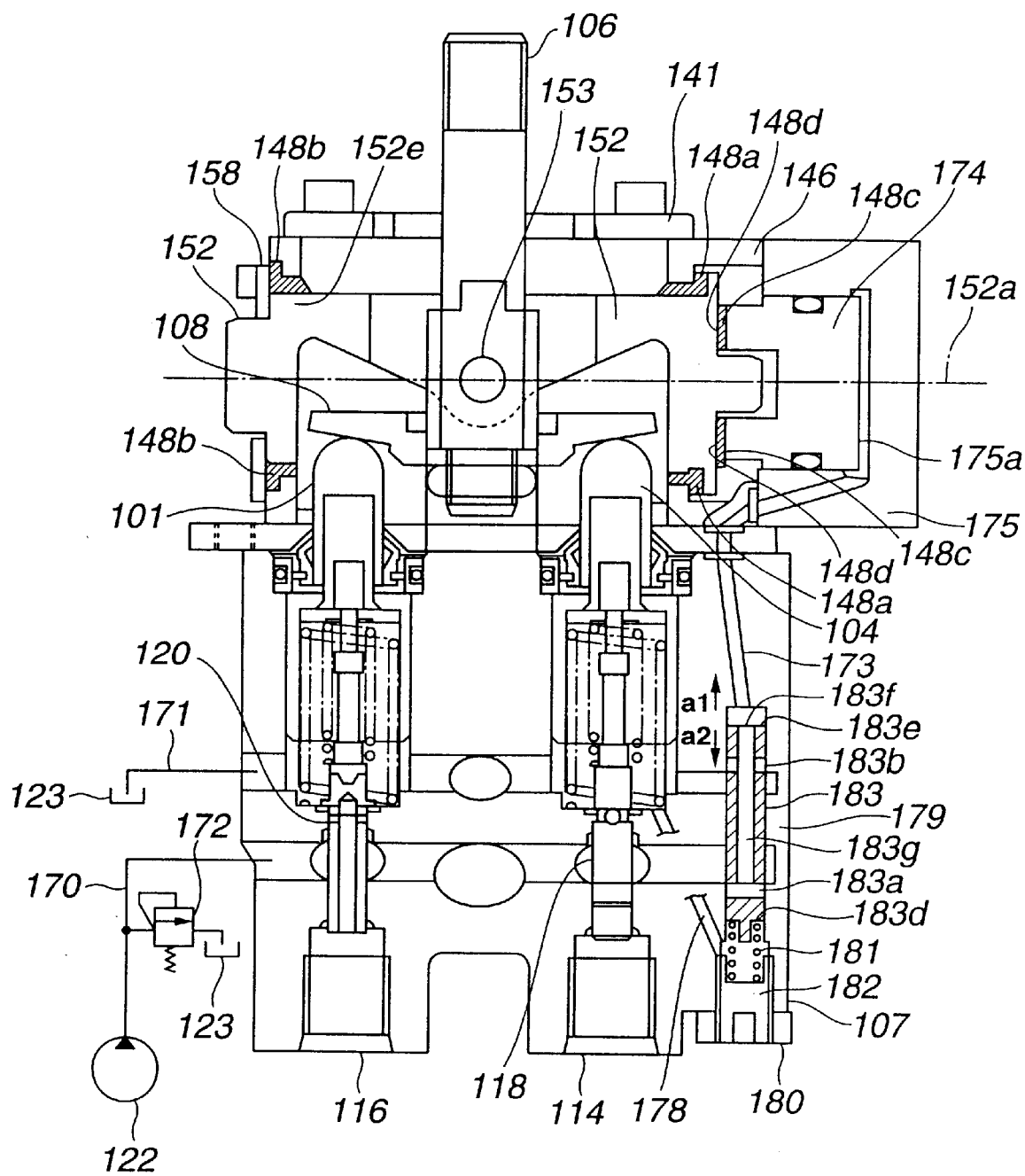
FIG. 33 is a diagram of the configuration of a third example of a lever holding force release apparatus.

In FIG. 33 is diagrammed a third example of a lever holding force release apparatus wherein part of the apparatus diagrammed in FIG. 31. has been modified. In what follows, configuring elements that are the same as those in FIG. 31 are assumed to be configuring elements that have the same function, and, in the interest of expediency, are not further described here.

As diagrammed in FIG. 33, a pressure reducing valve 179 is deployed between the line 170 and the line 173. This pressure reducing valve 179 reduces the pressure of the hydraulic fluid input from the line 170 to a set pressure, outputs that hydraulic fluid, and regulates the lever holding force to a constant value.

The pressure reducing valve 179 is deployed in the main apparatus body 107 of the lever apparatus 105. This pressure reducing valve 179 comprises a spool 183, a spring 181 that exerts a spring force on the spool 183, an adjustment bolt 182 for setting the spring force of the spring 181, and a lock nut 180 for securing the adjustment bolt to the main apparatus body 107.

A hydraulic fluid passageway 183g is formed in the spool 183 along the longitudinal dimension thereof. This hydraulic fluid passageway 183g is connected to the line 173 through an opening 183f formed in one end surface 183e of the spool 183. Openings 183a and 183b are formed in the side surface of the spool 183. These openings 183a and 183b and the hydraulic fluid passageway 183g are connected. The opening 183a is formed at a position corresponding to the line 170, while the opening 183b is formed at a position corresponding to the line 171.

One end of the spring 181 is in contact with the other end surface 183d of the spool 183. The other end of the spring 181 is in contact with the adjustment bolt 182. The end surface 183d of the spool faces the line 178. The line 178 is connected to the line 171. The adjustment bolt 182 is screwed into the main apparatus body 107. The head of the adjustment bolt 182 is secured to the main apparatus body 107 by the lock nut 180.

The operation of the pressure reducing valve 179 is described next.

When the engine 132 is running, the operation lever pump 122 is being driven. Thus hydraulic fluid discharged from the operation lever pump 122 is sent into the line 173 through the pressure reducing valve 179.

Now, when the head of the adjustment bolt 182 is turned, and the position wherein the adjustment bolt 182 is screwed into the main apparatus body 107 is adjusted, the spring force exerted on the spool 183 by the spring 18:1 is varied. When the spring force is set to a desired value by adjusting the adjustment bolt 182, the adjustment bolt 182 is then secured to the main apparatus body 107 by the lock nut 180. Thus the setting of the holding force on the operation lever 106 is concluded.

Let it now be assumed that the spring force of the spring 181 is greater than the force produced by the hydraulic fluid inside the line 173. When that is the case, the spool 183 moves in the a1 direction indicated in FIG. 33. The opening 183a in the spool 183 therefore communicates with the line 170, and the hydraulic fluid discharged from the operation lever pump 122 passes through the opening 183a, the internal passageway 183g, and the opening 183f to be input into the line 173. The pressure on the hydraulic fluid inside the line 173 therefore increases, and the pressure on the hydraulic fluid inside the line 173 increases.

Accordingly, the force produced by the hydraulic fluid inside the line 173 becomes greater than the spring force of the spring 181. Thereupon the spool 183 is moved in the a2 direction in FIG. 33. The opening 183b in the spool 183 therefore communicates with the line 171, and the hydraulic fluid inside the line 173 passes through the opening 183f, the internal passageway 183g, the opening 183b, and the line 171 to be discharged into the tank 123. Thus the pressure on the hydraulic fluid inside the line 173 decreases.

The movement of the spool 183 between the a1 direction and the a2 direction is repeated, and the movement of the spool 183 stops at the point in time when the spring force of the spring 181 coincides with the hydraulic fluid inside the line 173. At that time, the pressing force produced at the piston 174 is determined at a force which corresponds to the spring force of the spring 181.

In this manner, therefore, the pressing force produced at the piston 174 can be made a constant value that accords with the spring force of the spring 181, and the holding force on the operation lever 106 can be made constant, irrespective of the load on the engine 132.

Figure 34:
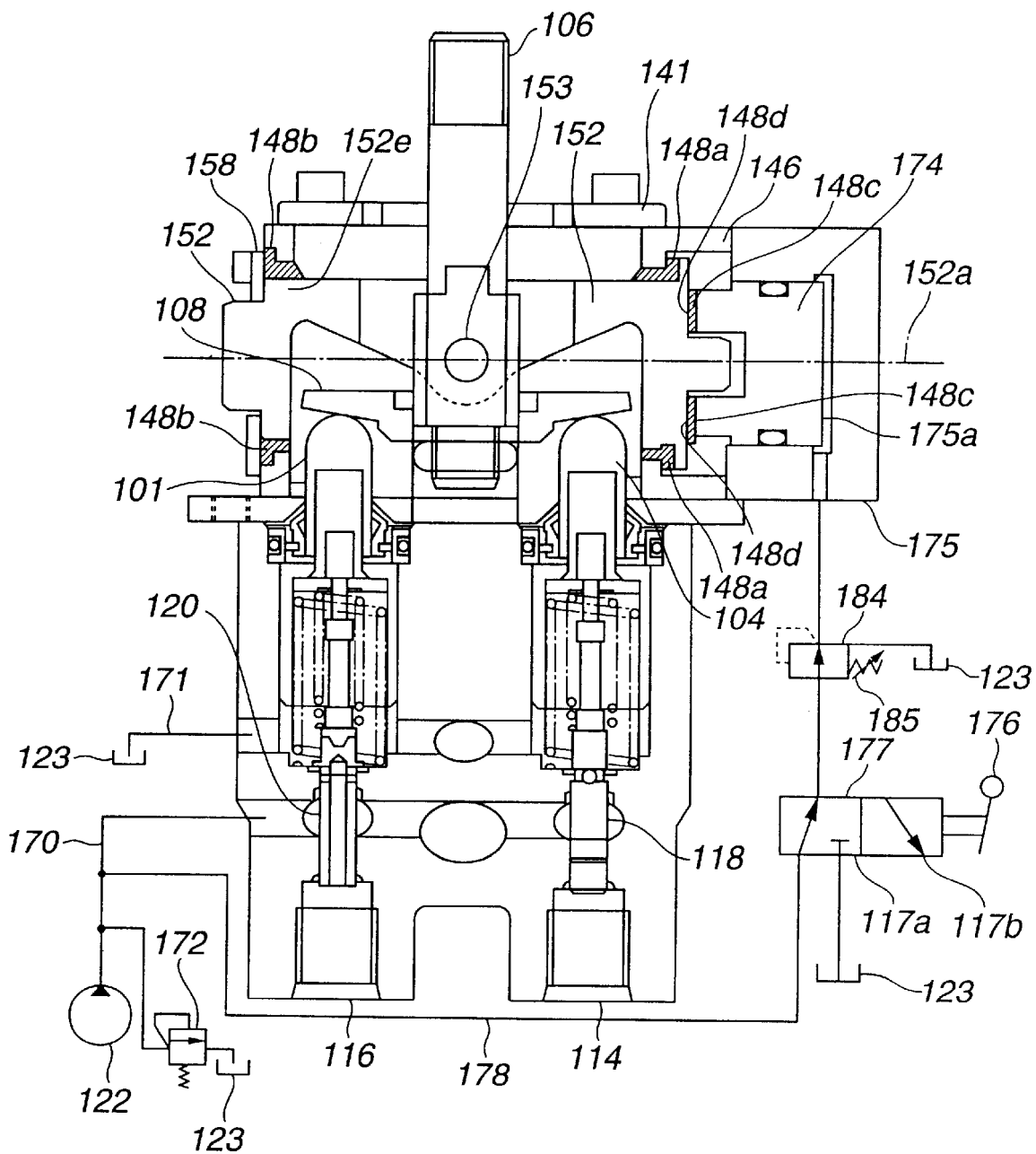
FIG. 34 is a diagram of the configuration of a fourth example of a lever holding force release apparatus.

In FIG. 34 is diagrammed a fourth example of a lever holding force release apparatus wherein part of the apparatus diagrammed in FIG. 32 has been modified. In what follows, configuring elements that are the same as those in FIG. 32 are assumed to be configuring elements that have the same function, and, in the interest of expediency, are not further described here.

With the fourth example diagrammed in FIG. 34, the holding force on the operation lever 106 can be made constant, irrespective of the load on the engine 132, as with the third example diagrammed in FIG. 33.

As diagrammed in FIG. 34, a pressure reducing valve 184 is deployed in the line 178 between the hydraulic chamber 175a of the cylinder 175 and the switching valve 177. This pressure reducing valve 184 reduces the pressure on the hydraulic fluid that has passed through the switching valve 177 to a set pressure, outputs that hydraulic fluid to the hydraulic chamber 175a, and regulates the lever holding force to a constant value. The pressure set in the pressure reducing valve 184 can be adjusted by varying the spring force set in a spring 185.

Accordingly, as with the third example diagrammed in FIG. 33, the pressing force produced at the piston 174 can be made a constant value that accords with the spring force set in the pressure reducing valve 184, and the holding force on the operation lever 106 can be made constant, irrespective of the load on the engine 132.

In the third example diagrammed in FIG. 33 and the fourth example diagrammed in FIG. 34, a pressure reducing valve 179 or pressure reducing valve 184 is deployed in the line 178 or the line 173 connected to the piston 174, and the lever holding force is made constant. A similar holding force adjustment mechanism may be deployed on the piston 174 side, however, and the lever holding force made a constant value.

Figure 35:
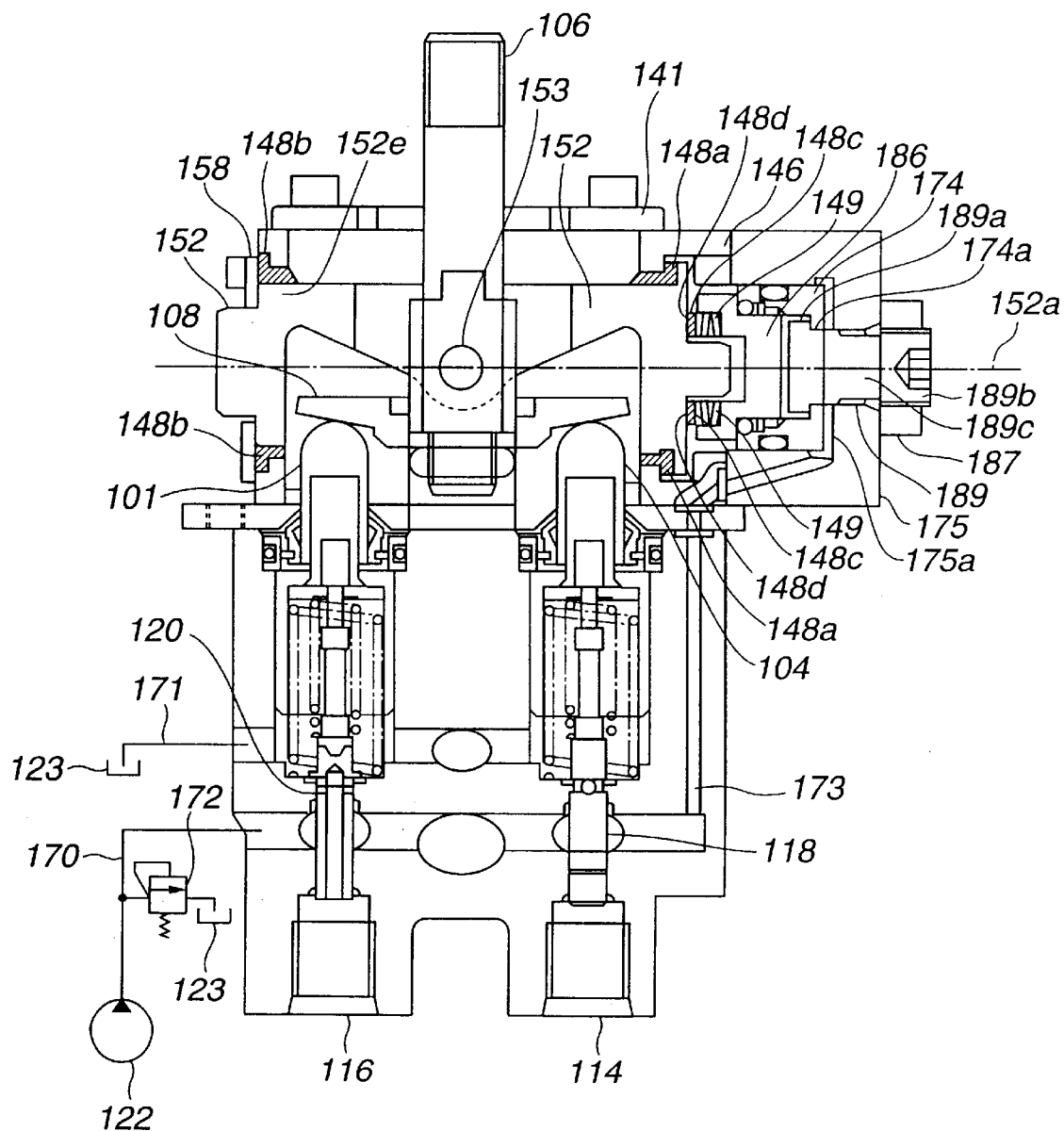
FIG. 35 is a diagram of the configuration of a fifth example of a lever holding force release apparatus.

In FIG. 35 is diagrammed a fifth example of a lever holding force release apparatus wherein part of the apparatus diagrammed in FIG. 31 has been modified. In what follows, configuring elements that are the same as those in FIG. 31 are assumed to be configuring elements that have the same function, and, in the interest of expediency, are not further described here.

With the fifth example diagrammed in FIG. 35, as with the third example diagrammed in FIG. 33, the holding force on the operation lever 106 can be made constant irrespective of the load on the engine 132.

As diagrammed in FIG. 35, one end of the spring 149 comes up against one end surface of the support shaft 152, with the sliding member 148c interposed therebetween. Instead of a coil spring 149, some other type of spring may be used. When the spring 149 is displaced, a spring force is produced according to the displacement position. The force wherewith the sliding member 148c presses against the support shaft 152 varies according to the spring force of the spring 149. When the pressing force of the sliding member 148c against the support shaft 152 changes, the sliding resistance between the sliding member 148 and the support shaft 152 also changes.

The other end of the spring 149 comes up against an adjustment member 186 for adjusting the spring force. This adjustment member 186 is screwed to the piston 174 and formed integrally therewith. The piston 174 is accommodated in the cylinder 175 so that it can freely slide. The cylinder 175 is attached to the side of the casing 146. The other end of the piston 174 faces the hydraulic chamber 175a in the cylinder 175.

When the pressure of the hydraulic fluid inside the hydraulic chamber 175a acts on the piston 174, the piston 174 moves to the left, as diagrammed in FIG. 35. The position to which the piston 174 moves is restricted by the position in which the adjustment bolt 189 is screwed in.

The adjustment bolt 189 is screwed into the cylinder 175. The head 189b of that adjustment bolt 189 is secured to the cylinder 175 by the lock nut 187.

A stopper 189a having a diameter larger than the shaft diameter of the adjustment bolt 189 is formed on the adjustment bolt 189 on the opposite end from the head 189b. In the piston 174 is formed an opening 174a having an inner diameter that accords with the diameter of the shaft 189c of the adjustment bolt 189. The shaft 189c of the adjustment bolt 189 is inserted into this piston opening 174a, and the piston 174 moves, freely sliding in relation to the adjustment bolt 189. The position to which the piston 174 moves is restricted by that piston 174 coming up against the stopper 189a of the adjustment bolt 189.

The operation of the holding force adjustment mechanism is next described.

When the engine 132 is running, the operation lever pump 122 is being driven. The hydraulic fluid discharged from the operation lever pump 122 is therefore supplied to the hydraulic chamber 175a in the cylinder 175 via the lines 170 and 173.

When the head 189b of the adjustment bolt 189 is then turned, and the position in which it is screwed into the cylinder 175 is adjusted, the restricted position of the piston 174, as it is restricted by the stopper 189a on the adjustment bolt 189, changes. When the restricted position of the piston is set to a desired value by adjusting the adjustment bolt 189, the adjustment bolt 189 is secured to the cylinder 175 by the lock nut 187. Thus the setting of the holding force on the operation lever 106 is concluded.

Let it now be assumed that the force of the hydraulic fluid inside the hydraulic chamber 175a is larger than the spring force of the spring 149. When that is the case, the piston 174 is moved to the left as diagrammed in the drawing. The piston 174 moves integrally with the adjustment member 186. When the adjustment member 186 moves, the spring 149 is displaced.

The final position of movement of the piston 174 is restricted by the stopper 189a on the adjustment bolt 189. Thus the spring 149 is finally displaced to a position that corresponds with the piston restriction position. A spring force is produced by the spring 149 that corresponds with the final displacement position. This spring force causes a sliding resistance to be produced between the sliding member 148 and the support shaft 152, and that sliding resistance provides a holding force for holding the operation lever 106.

As a result, a holding force is obtained at the operation lever 106 that corresponds with the position in which the adjustment bolt 189 is screwed in. Thereupon, if the force of the hydraulic fluid inside the hydraulic chamber 175a is greater than the spring force of the spring 149, a constant holding force corresponding to the spring force of the spring is obtained at the operation lever 106, even when the pressure inside the hydraulic chamber 175a varies. In other words, the holding force on the operation lever 106 can be made constant irrespective of the load on the engine 132.

Figure 36:
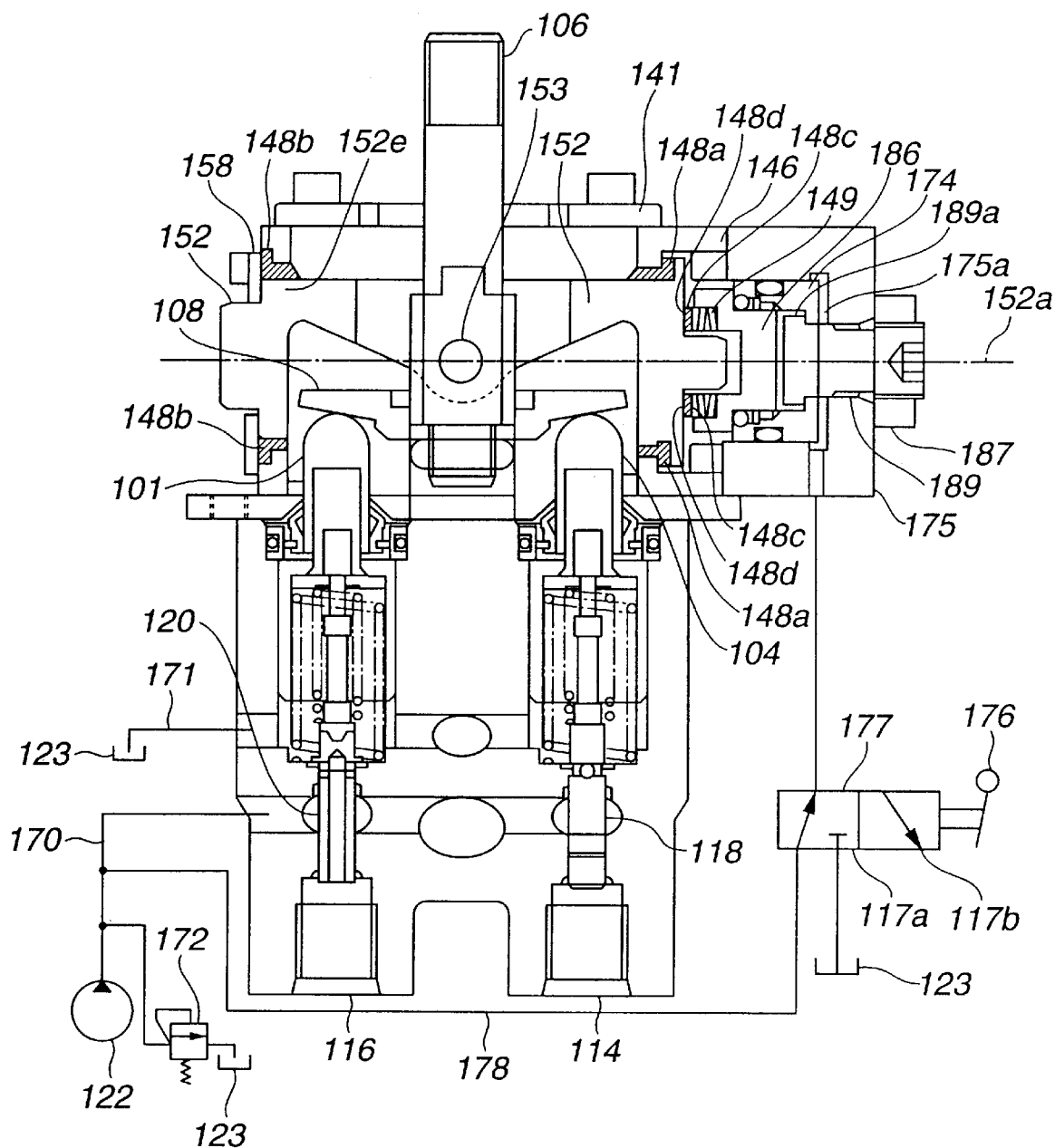
FIG. 36 is a diagram of the configuration of a sixth example of a lever holding force release apparatus.

In FIG. 36 is diagrammed a sixth example of a lever holding force release apparatus wherein a switching valve 177 is provided as in the second example diagrammed in FIG. 32. In the operation lever apparatus 105 diagrammed in FIG. 36, the holding force on the operation lever 106 is released by the switching valve 177. However, the holding force on the operation lever 106 may be released by making an adjustment with the adjustment bolt 189 so that the operation lever holding force becomes 0.

In the sixth example diagrammed in FIG. 36, as in the fifth example diagrammed in FIG. 35, a holding force adjustment apparatus configured by a spring 149, adjustment member 186, and adjustment bolt 189, etc., is deployed on the piston 174 side.

Based on this sixth example, diagrammed in FIG. 36, as in the second example, diagrammed in FIG. 32, it is possible to release the holding function according to the job situation, even when the engine is running. And as in the fifth example, diagrammed in FIG. 35, moreover, the holding force on the operation lever 106 can be made constant, irrespective of the load on the engine, so long as the force produce by the hydraulic fluid inside the hydraulic chamber 175a is greater than the spring force of the spring 149.

Now, in construction equipment, a safety lock lever is provided to prevent improper operation of working members and running bodies resulting from improper operations of the operation lever. When the safety lock lever is operated to the locking side, for example, the running bodies (left and right crawlers 136 and 138) will not be actuated even when the operation lever 106 is operated.

A seventh example is next described wherein a holding force release lever that doubles as a safety lock lever is deployed.

Figure 37:
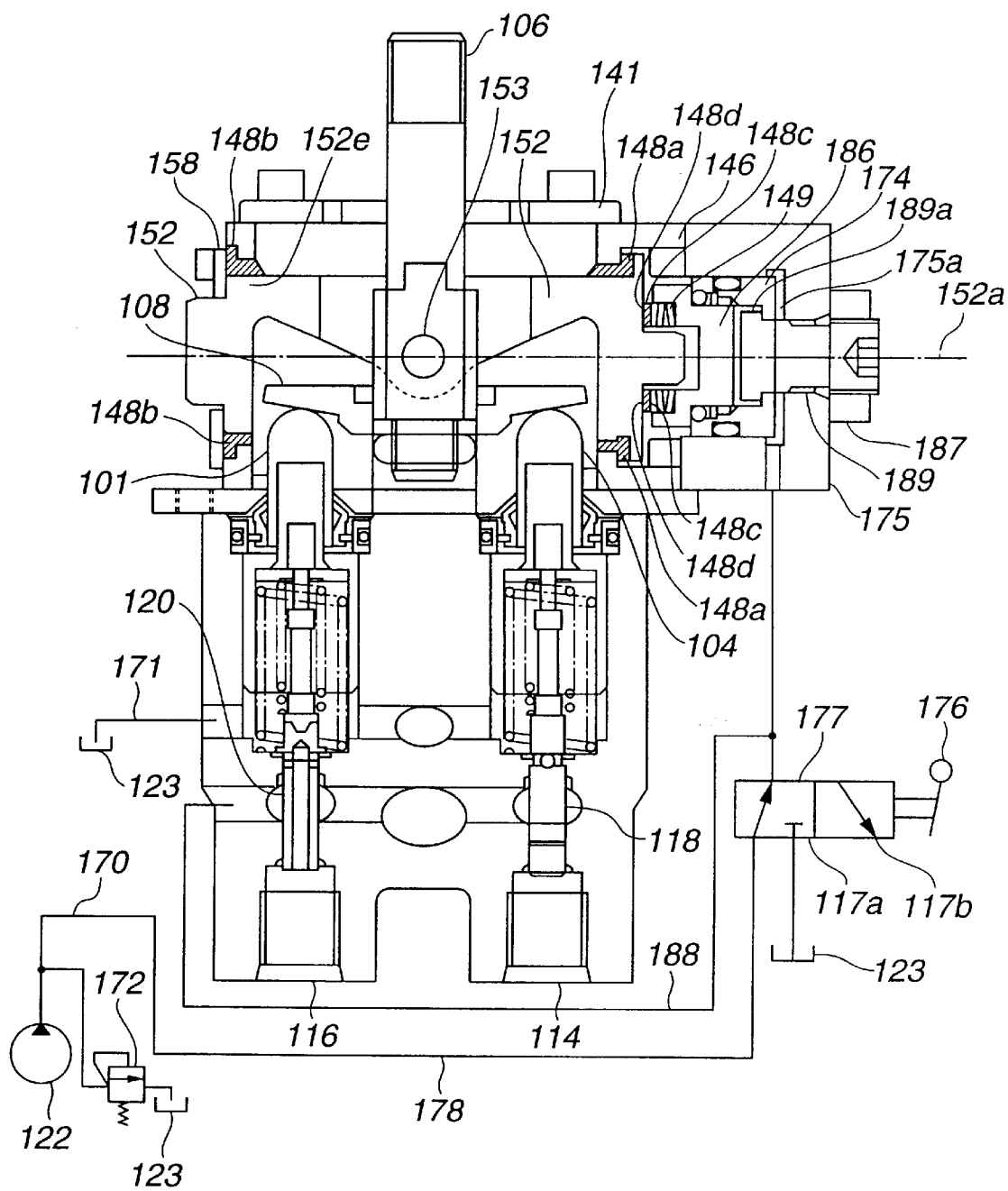
FIG. 37 is a diagram of the configuration of a seventh example of a lever holding force release apparatus.

In FIG. 37 is diagrammed this seventh example, wherein the configuration of the lines in the sixth example diagrammed in FIG. 36 is partially modified.

As diagrammed in FIG. 37, the hydraulic chamber 175a in the cylinder 175 is connected to the discharge port of the operation lever pump 122 via the line 178 and the line 170. The switching valve 177 is deployed in the line 178. Unlike FIG. 36, however, the input ports for pressure reducing valves 118 to 121 are connected to the discharge port of the operation lever pump 122 via a line 188, the switching valve 177, the line 178, and the line 179.

The operation of the lever holding force release apparatus is next described.

When the holding force release lever 176 is operated and the switching valve 177 is switched to the holding position 177a on the left side, as diagrammed, hydraulic fluid discharged from the operation lever pump 122 passes through the switching valve 177 and is supplied to the hydraulic chamber 175a of the cylinder 175. Simultaneously therewith, hydraulic fluid discharged from the operation lever pump 122 passes through the switching valve 177 and is supplied to the input ports of the pressure reducing valves 118 to 121. That is, the safety lock lever is operated to the non-locking side as the holding force is applied to the operation lever 106. Thereupon, the running bodies (left and right crawlers 136 and 138) are actuated in response to the operations of the operation lever 106.

When, on the other hand, the holding force release lever 176 is operated and the switching valve 177 is switched to the release position 177b on the right side, as diagrammed, the hydraulic fluid discharged from the operation lever pump 122 is cut off, so that hydraulic fluid is no longer supplied to the hydraulic chamber 175a in the cylinder 175. Simultaneously therewith, hydraulic fluid discharged from the operation lever pump 122 is also cut off by the switching valve 177, so that hydraulic fluid is no longer supplied to the input ports of the pressure reducing valves 118 to 121. That is, the holding force being exerted on the operation lever 106 is released. Simultaneously therewith, the safety lock lever is operated to the locking side. Thereupon the running bodies (left and right crawlers 136 and 138) will not be actuated even when the operation lever 106 is operated.

Based on the seventh example diagrammed in FIG. 37 and described in the foregoing, the holding force release lever 176 can be made to double as a safety lock lever, and the number of parts can be reduced.

With the lever holding force release apparatuses diagrammed in FIGS. 31 to 37, a holding force is exerted on the operation lever 106, or that holding force is released, in response to a hydraulic signal. As far as the present invention is concerned, however, the holding force may be applied to the operation lever 106, or that holding force may be released, in response to an electrical signal.

Figure 28:
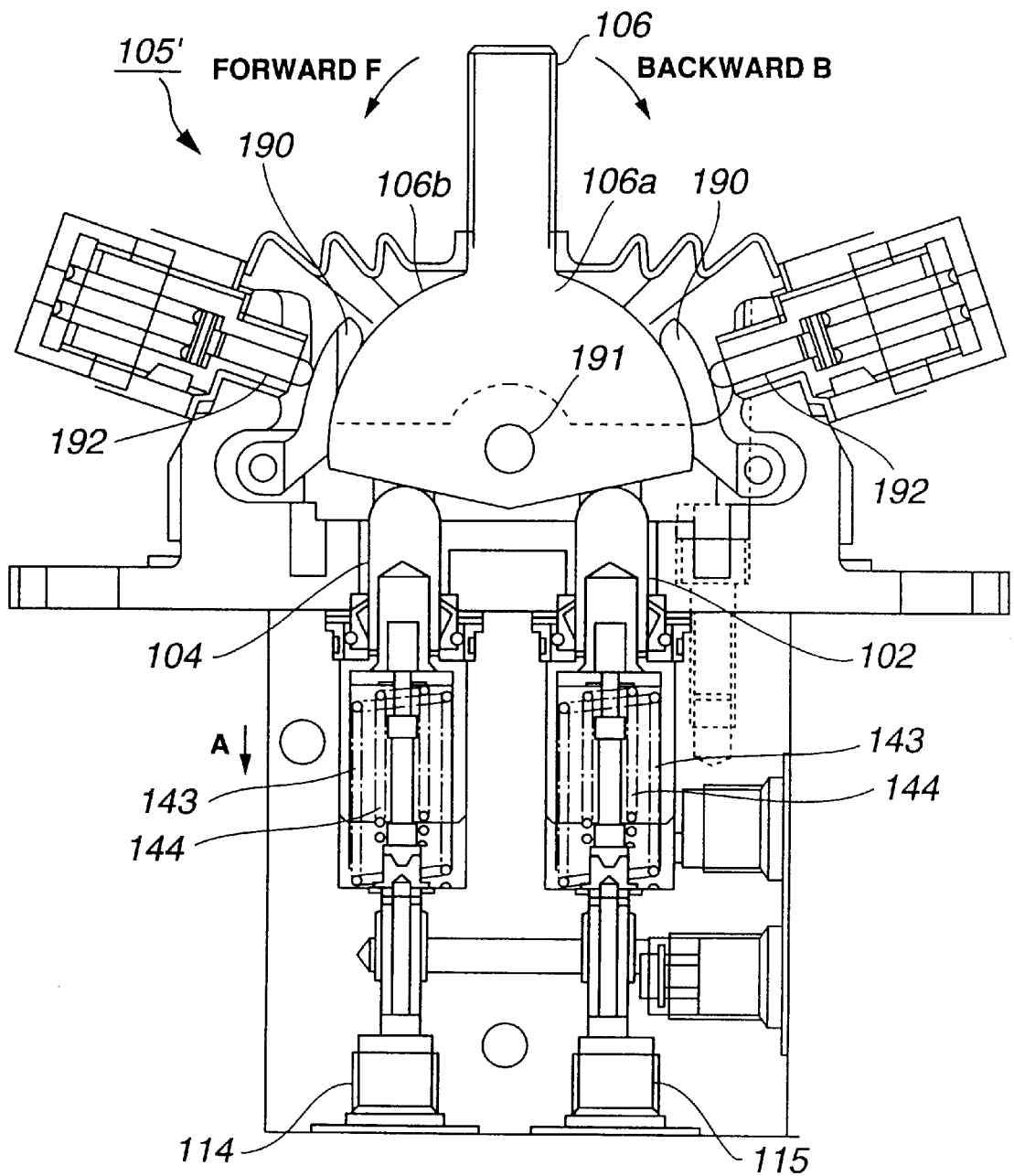
FIG. 28 is a cross-sectional view representing the configuration of a conventional operation lever apparatus.

In the embodiment aspects described in the foregoing, moreover, first to seventh examples of a lever holding force release apparatus are described for cases where the application is for an operation lever apparatus 105 capable of being operated in components in two direction as, namely in the forward and backward direction and in the left and right direction. However, as far as the present invention is concerned, the first to seventh examples of the lever holding force release apparatus may be applied to an operation lever apparatus 105' capable of being operated only in the single directional component diagrammed in FIG. 28.

What is claimed is:

1. An operation pattern device for altering operation patterns of first and second operation apparatuses in a vehicle, which comprises:
    the first and second operation apparatuses outputting operation direction signals for independently driving left and right running bodies of the vehicle in travel directions; and
    a switch that switches the first and second operation apparatuses between:
    a first operation pattern that causes an operation direction signal output from one of the first and second operation apparatuses to correspond to the travel directions of the left and right running bodies of the vehicle, and
    a second operation pattern that causes an operation direction signal output from the first operation apparatus to correspond to a travel direction of the left running body of the vehicle, and an operation direction signal output from the second operation apparatus to correspond to a travel direction of the right running body of the vehicle.

2. The operation pattern altering device according to claim 1, wherein the operation direction signals are hydraulic signals, a bridge circuit in which four shuttle valves are connected in a ring is provided, and the switch switches between:
    the first operation pattern that passes the operation direction hydraulic signal output from one of the first and second operation apparatuses through the four shuttle valves in the bridge circuit to act on ports corresponding to the travel directions of the left and right running bodies of the vehicle, and
    the second operation pattern that causes the operation direction hydraulic signal output from the first operation apparatus to act directly on a port corresponding to the travel direction of the left running body of the vehicle, and causes the operation direction hydraulic signal output from the second operation apparatus to act directly on a port corresponding to the travel direction of the right running body of the vehicle.

3. The operation pattern altering device according to claim 2, further comprising two actuators wherein: the switching means switches between
    the first operation pattern that causes the operation direction signal output from one of the first and second operation apparatuses to correspond to the travel directions of the left and right running bodies of the vehicle and causes a operation direction signal output from another one of the first and second operation apparatuses to correspond to drive directions of the two actuators, and
    the second operation pattern that causes the operation direction signal output from the first operation apparatus to correspond to the travel direction of the left and right running bodies of the vehicle and to a drive direction of one of the two actuators, and causes the operation direction signal output from the second operation apparatus to correspond to the travel direction of the right running body of the vehicle and to the drive direction of another one of the two actuators.

4. The operation pattern altering device according to claim 1, further comprising two actuators, wherein the switch switches between:
    the first operation pattern that causes the operation direction signal output from one of the first and second operation apparatuses to correspond to the travel directions of the left and right running bodies of the vehicle, and causes a operation direction signal output from another one of the first and second operation apparatuses to correspond to drive directions of the two actuators, and
    the second operation pattern that causes the operation direction signal output from the first operation apparatus to correspond to the travel direction of the left running body of the vehicle and to a drive direction of one of the two actuators, and causes the operation direction signal output from the second operation apparatus to correspond to the travel direction of the right running body of the vehicle and to a drive direction of another one of the two actuators.

5. An operation pattern altering device for altering operation patterns of two operation apparatuses in a vehicle, which comprises:
    the two operation apparatuses outputting operation direction signals as hydraulic signals for independently driving two actuators in drive directions; and
    a switch that switches the two operation apparatuses between:
    a first operation pattern that passes an operation direction hydraulic signal output from one of the two operation apparatuses through a bridge circuit, in which four shuttle valves are connected in a ring, to act on ports corresponding to drive directions of the two actuators, and
    a second operation pattern that causes an operation direction hydraulic signal output from one of the two operation apparatuses to act directly on a port corresponding to a drive direction of one of the two actuators, and causes an operation direction hydraulic signal output from another one of the two operation apparatuses to act directly on a port corresponding to a drive direction of another one of the two actuators.

6. The operation pattern altering device according to claim 5, wherein the switching means comprises:
    input port for inputting the operation direction hydraulic signal output from the one of the two operation apparatuses;
    output ports that are connected to ports corresponding to the drive directions of the two actuators; and
    a piston having a first position in which the input port communicates with the output ports through the shuttle valves in the bridge circuit, and a second position in which the input port directly communicates with the output ports.

7. The operation pattern altering device according to claim 6, wherein the piston is cylindrical in shape, and a rotational position thereof in relation to a body changes in response to a rotating operation.

8. The operation pattern altering device according to claim 7, wherein the input port and the output ports are provided on one of the body and the piston, and another one of the body and the piston is actuated so as to assume either the first position or the second position.

9. The operation pattern altering device according to claim 6, wherein the input port and the output ports are provided on one of a body and the piston, and another one of the body and the piston is actuated so as to assume either the first position or the second position.

\* \* \* \* \*